(12) United States Patent
Aryal et al.

(10) Patent No.: US 12,514,935 B2
(45) Date of Patent: Jan. 6, 2026

(54) NANOCARRIER SYSTEMS FOR IMAGING AND DELIVERY OF ACTIVE AGENTS

(71) Applicant: Kansas State University Research Foundation, Manhattan, KS (US)

(72) Inventors: Santosh Aryal, Manhattan, KS (US); Arunkumar Pitchaimani, Genoa (IT); Tuyen Dt Nguyen, Houston, TX (US)

(73) Assignee: Kansas State University Research Foundation, Manhattan, KS (US)

(*) Notice: Subject to any disclaimer, the term of this patent is extended or adjusted under 35 U.S.C. 154(b) by 1141 days.

(21) Appl. No.: 17/296,379

(22) PCT Filed: Nov. 26, 2019

(86) PCT No.: PCT/US2019/063319
§ 371 (c)(1),
(2) Date: May 24, 2021

(87) PCT Pub. No.: WO2020/112822
PCT Pub. Date: Jun. 4, 2020

(65) Prior Publication Data
US 2022/0031869 A1 Feb. 3, 2022

Related U.S. Application Data

(60) Provisional application No. 62/772,265, filed on Nov. 28, 2018.

(51) Int. Cl.
| | | |
|---|---|---|
| *A61K 49/18* | (2006.01) | |
| *A61K 9/1271* | (2025.01) | |
| *A61K 31/704* | (2006.01) | |
| *A61K 47/69* | (2017.01) | |
| *A61P 35/00* | (2006.01) | |

(52) U.S. Cl.
CPC ........ *A61K 49/1812* (2013.01); *A61K 9/1271* (2013.01); *A61K 31/704* (2013.01); *A61K 47/6911* (2017.08); *A61K 47/6923* (2017.08); *A61K 47/6937* (2017.08); *A61P 35/00* (2018.01)

(58) Field of Classification Search
CPC .............. A61K 49/1812; A61K 9/1271; A61K 31/704; A61K 47/6911; A61K 47/6923; A61K 47/6937; A61K 47/6901; A61K 47/6929; A61K 49/1878; A61K 49/1896; A61P 35/00

See application file for complete search history.

(56) References Cited

U.S. PATENT DOCUMENTS

| | | | |
|---|---|---|---|
| 2013/0129636 A1 | 5/2013 | Kamaly et al. | |
| 2023/0043255 A1* | 2/2023 | von Maltzahn | ........ C12N 15/88 |

FOREIGN PATENT DOCUMENTS

| | | | | |
|---|---|---|---|---|
| WO | 2010042876 | | 4/2010 | |
| WO | WO-2014153114 A1 * | | 9/2014 | ........... A61K 38/177 |

OTHER PUBLICATIONS

Pitchaimani et al., Biomaterials 160 (2018) 124-137. (Year: 2018).*
International Search Report and Written Opinion in corresponding PCT/US2019/063319, dated Feb. 26, 2020.
Pitchaimani, et al., "Biomimetic Natural Killer Membrane Camouflaged Polymeric Nanoparticle for Targeted Bioimaging", Adv. Funct. Mater, 2019, 29, 1806817.
Nguyen, "Engineering nanoparticles using chemical and biological approaches for tumor targeted delivery", Thesis, Kansas State University, April 2019, retrieved from: https://krex.k-state_edu/dspace/handle/2097/39466.
Vijayan, et al., "Cell Membrane-Camouflaged Nanopariicles: A Promising Biomimetic Strategy for Cancer Theragnoslics", Polymers, 2018, 10, 983.
Zhang, et al., "Human cytotoxic T-lymphocyte membrane-camouflaged nanoparticles combined with low-dose irradiation: a new approach to enhance drug targeting in gastric cancer", International Journal of Nanomedicine, 2017, 12, pp. 2129-2142.

* cited by examiner

*Primary Examiner* — Robert S Cabral
(74) *Attorney, Agent, or Firm* — Hovey Williams LLP; Crissa A. Cook

(57) ABSTRACT

Synthetic nanocarrier constructs and related compositions comprising a lipid-based bilayer membrane infused with one or more NK-92 cell membrane proteins, which encapsulates a liquid receiving interior space or coats at least a portion of a solid core. Methods of targeted delivery of an active/diagnostic/imaging agent to a specific cell type or a region of a patient by administering a plurality of nanocarrier constructs to the patient. MRI imaging methods and novel MRI contrast agent constructs are also disclosed.

20 Claims, 46 Drawing Sheets

NANOCARRIER SYSTEMS FOR IMAGING AND DELIVERY OF ACTIVE AGENTS

CROSS-REFERENCE TO RELATED APPLICATIONS

The present application is the U.S. National Stage of International Patent Application No. PCT/US2019/063319, filed Nov. 26, 2019, which claims the priority benefit of U.S. Provisional Patent Application Ser. No. 62/772,265, filed Nov. 28, 2018, entitled NANOCARRIER SYSTEMS FOR IMAGING AND DELIVERY OF ACTIVE AGENTS, each of which is incorporated by reference in its entirety herein.

BACKGROUND OF THE INVENTION

Field of the Invention

The present invention relates to nanocarriers comprising a membrane or coating with natural killer (NK) cell membrane surface proteins.

Description of Related Art

Biomimetic nanocarrier systems are a continuing area of interest for targeted imaging and drug delivery. Inspired by nature, these systems show promising biomedical applications, not only as a biocompatible methodology in nanotechnology, but also it mimics the function of natural biological materials. The biomimetic approach has already proven the advantages of transforming natural materials into functional materials ranging from drug delivery to biosensors, for example, application of nanomaterials in cancer theranostics. The advantages of incorporating biological materials with synthetic materials include biocompatibility, resistivity, cellular interaction, enhanced circulation half-life, and cellular retention.

In the field of drug delivery, biomimetic nanoparticles (NPs) provide an endogenous milieu for safer delivery of cargos thereby reducing the toxicity of various organic and inorganic NPs. Biomimetic nanoconstructs play a prominent role in reducing the acceleration of immune response, which is the major clinical pitfall during the administration of various organic and inorganic NPs for biomedical ailments. In recent years, biomimetic and synthetic nanostructures are combined to develop novel properties to improve biomedical application.

For diagnostics and imaging, bioimaging modalities such as MRI have advantages with excellent spatial resolution and soft-tissue contrast for diagnosis and monitoring the therapeutic response. The most common MRI contrast agents are gadolinium (Gd)-based contrast agents (GBCA) (25-30% of MR scan includes GBCA). Specific examples of GBCA include Gd-BOPTA (gadobenate dimeglumine, Multihance®), GdDTPA (gadopentetate dimeglumine, Magnevist®), Gd-EOB-DTPA (gadoxetic acid disodium, Eovist®), MS325® (gadofosveset trisodium, Ablavar®), etc. Despite advances in cancer bioimaging, early detection and targeted bioimaging using MRI are highly challenging in most tumor types. This is due to the lack of targeting moiety, short residence time and free distribution to the extracellular spaces upon injection.

Natural Killer (NK) cells are large granular lymphocytes belongs to the innate immune system, whose major function is to provide host defense against microbial infections and tumor invasion by immunosurveillance of cell surfaces for the presence of an abnormal expression of Major Histocompatibility Complex (MHC) Class I molecules and cell stress markers. In peripheral blood mononuclear cells, NK-cells contribute about 5-20%. Unlike T-cells and B-cells, NK cells have the ability to target cancer cells directly via inhibitory and activating receptors on its cell surface and also can kill cancer cells without prior sensitization. Its mechanism of cytotoxicity involves the release of membrane disrupting protein (perforin) and a proteolytic enzyme (granzyme), which cause lysis of target cells. Various mechanisms of NK cells in targeting tumor include perforin/granzyme mediated cytotoxicity, death receptor-mediated apoptosis, and interferon-$\gamma$ effector function. Several studies have proved that NK cells are capable of eliminating tumors in vitro and in vivo. Among various transformed NK cell lines, NK-92 cells are an immortalized cell line derived from a 50-year-old male patient with non-Hodgins lymphoma and characterized by permanent IL-2 dependency. NK-92 is further characterized by the presence of CD56 bright receptors and the activated receptors like NKG2-D, NKp30, and NKp44 on its surface for cytolytic functions. Unlike primary NK cells, NK-92 cells do not have inhibitory receptors (KIR receptors), thus showing superior cytotoxic activity against a broad range of tumors targets compared to primary NK cells.

SUMMARY OF THE INVENTION

The present invention is broadly concerned with synthetic nanocarrier constructs comprising a lipid-based bilayer membrane infused with one or more NK-92 cell membrane proteins (e.g., surface receptor proteins derived from NK-92 membrane fragments). The constructs are either hollow, liquid-filled constructs (vesicles) or solid-core nanoparticles with a bilayer membrane coating. Active agents, imaging agents, and/or detectable moieties can be encapsulated within or conjugated to the membrane.

Also described herein are methods for targeted delivery of an active/diagnostic/imaging agent to a specific cell type or a region of interest of a patient. The methods generally comprise administering a plurality of nanocarrier constructs according to various embodiments to the patient.

Diagnostic and/or therapeutic compositions are also disclosed, which comprise a plurality of nanocarrier constructs according to various embodiments, optionally dispersed in a pharmaceutically-acceptable carrier or excipient.

The present disclosure also concerns MRI imaging methods for detecting cancerous or precancerous tissue or cancer cells in a mammal. The methods generally comprise (a) administering to the mammal a plurality of nanocarrier constructs according to various embodiments which at least one MR imaging contrast agent, wherein the nanocarrier constructs accumulate in cancerous or precancerous tissue or cancer cells in the mammal; (b) locating the nanocarrier constructs in a region of interest in the mammal suspected of having said cancerous or precancerous tissue or cancer cells; (c) transmitting radio frequency pulses to the region of interest; and (d) acquiring MR image data of the region of interest which comprises $T_1$ data.

Also described herein are novel MRI contrast agent nanocarrier constructs that comprise a synthetic nanocarrier construct comprising a lipid-based bilayer membrane infused with one or more NK-92 cell membrane proteins and at least one contrast imaging agent.

DETAILED DESCRIPTION

Figure 1A:
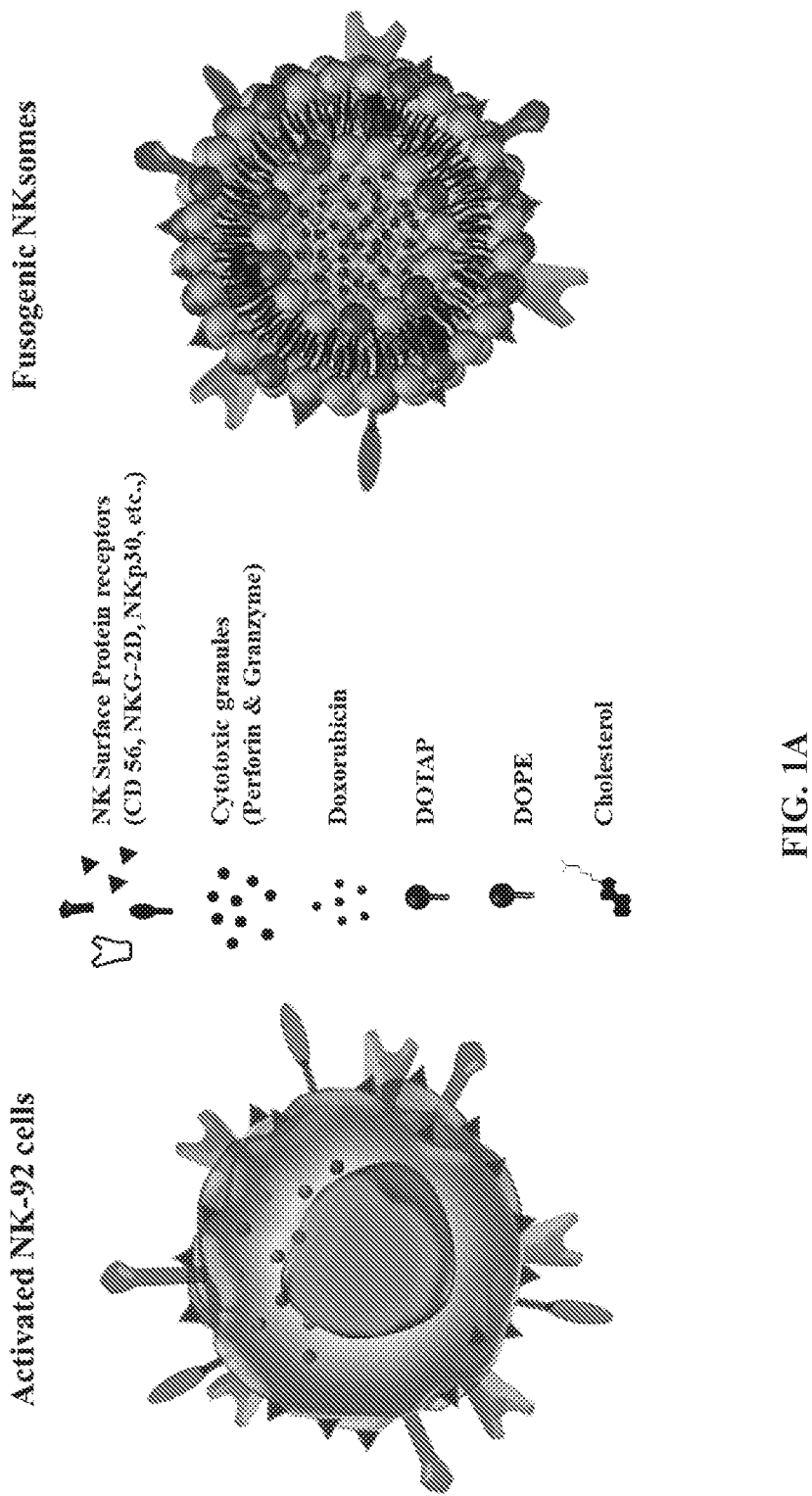
FIG. 1A. Schematic illustration of activated NK cells (NK-92 cells) and NK-92 cell membrane-derived fusogenic liposomes for targeted tumor therapy.

In more detail, described herein are nanocarrier constructs comprising a lipid-based bilayer membrane infused with one or more NK-92 cell membrane proteins. The lipid-based bilayer membrane comprises a plurality of lipids having respective hydrophilic heads and two hydrophobic tails. Such lipids will spontaneously (or automatically) self-assemble into a bilayer morphology. The membrane is preferably heterogenous comprising at least two different lipids.

In some embodiments, the membrane coats a solid core. In other embodiments, the membrane encloses a hollow liquid-receiving space.

NK-92 cell membrane proteins that can be incorporated into the lipid-based bilayer membrane include surface protein receptors, such as CD56, NKG2-D, NKp30, NKp44, CD16, and the like. The infusion of NK-92 cell membrane can be driven by electrostatic and/or hydrophobic interaction of the NK-92 cell membrane components (protein and NK-92 membrane phospholipid fragments) with the lipid bilayer components. The infused NK-92 membrane phospholipid becomes a part of the lipid bilayer, meanwhile the NK-92 cell membrane proteins can locate at the exterior surface of the lipid bilayer (facing the external environment), in the middle of the lipid bilayer, or at the interior surface the lipid bilayer (facing the core). The membrane can be permeable, non-permeable, or semi-permeable, and is preferably semi-permeable. Exemplary lipids for use in forming the membrane include natural phospholipids and modified phospholipids, such as phosphoethanolamines, phosphatidylcholines, phosphoglycerols, phosphatidic acids, Sphingolipids, Sphingomyelin, and the like, such as 1,2-dioleoyl-3-trimethylammonium-propane (DOTAP), 1,2-dioleoyl-sn-glycero-3-phosphoethanolamine (DOPE), L-α-phosphatidylcholine (Egg-PC), 1,2-Distearoyl-sn-glycero-3-phosphoglycerol (DSPG), 1,2-Distearoyl-sn-glycero-3-phosphoethanolamine (DSPE), DSPE conjugated 1,4,7,10-Tetraazacyclododecane-1,4,7,10-tetraacetic acid-Gd (DSPE-DOTA-Gd), and combinations thereof. Preferably, the membrane is heterogeneous, comprising at least two different lipids. Other membrane constituents can include cholesterol, oleic acid, hydrophobic drug molecules, imaging agents, detectable moieties, and the like. The nanocarriers have an average particle size of at least 100 nm, but less than 1,000 nm, preferably less than 500 nm, and more preferably less than about 150 nm. As used herein, the "particle size" refers to the maximum surface-to-surface dimension of the body, such as the diameter in the case of substantially spherical bodies.

In one or more embodiments, the lipid bilayer membrane encapsulates a liquid-receiving interior space (i.e., hollow core), similar to a liposome. Thus, nanocarriers in such embodiments are substantially spherical vesicles having at least one lipid bilayer, and a hollow core capable of trapping active agents and other molecules in their liquid-filled interior space. In such embodiments, hydrophobic residues of the lipids face inward defining the inner "core" of the vesicle membrane bilayer, while the hydrophilic heads face outward from the core of the membrane bilayer towards the internal and external vesicle environments and thereby define the interior and exterior surfaces of the membrane. In other words, the hollow core of the vesicle is filled with liquid (e.g., aqueous solutions such as normal (n.) saline (~0.9% NaCl), phosphate buffered saline (PBS), and/or sterile water (DAW), oil-in-water or water-in-oil emulsions) in which the active agents/molecules are dispersed, such that the liquid and active agents/molecule are entrapped by the lipid-based bilayer membrane infused with one or more NK-92 cell membrane proteins. Such nanocarrier vesicles are also referred to herein as "NKsomes" in some embodiments of the invention. Advantageously, NKsomes are designed to provide biomimetic cloaking of the synthetic nanocarrier and encapsulated active agent using a membrane camouflage. The NKsomes are characterized by NK cell membrane-associated targeting proteins on the membrane surface, which have been derived from NK cell membrane fragments.

With its excellent biocompatibility, NKsomes show a higher affinity towards cancer/tumor cells than normal cells, and exhibit enhanced tumor homing efficiency in vivo with an extended plasma residence time of 18 h. The NKsomes are also fusogenic, meaning they will fuse with the target (tumor) cells and release their payload (i.e., the contents of their liquid core) directly into the fused cells. Thus, NKsomes are particularly useful for targeted tumor therapy and delivery of chemotherapeutic agents in a targeted manner, with minimal off-target effects.

In one or more alternative embodiments, the lipid bilayer membrane encapsulates or coats at least a portion of a solid nanoparticle core. That is, each nanoparticle is individually encapsulated or coated by a corresponding membrane. The term "nanoparticle" as used herein refers to submicron-sized colloidal particles. In general, such nanoparticles will have a particle size of at least 100 nm, but less than 1,000 nm, preferably less than 500 nm, and more preferably less than about 150 nm. In one or more embodiments, the nanoparticles are polymeric nanoparticles, which may be formed from a single polymer, copolymers, or mixtures of two or more polymers. Non-limiting examples of polymers that can be used for the nanoparticles include poly(glycolic acid), poly(lactic acid), poly(lactic-co-glycolic acid), poly(caprolactone), poly(ortho esters), poly(alkyl cyanoacrylates), poly(sebacic acid), poly(adipic acid), poly(terphthalic acid), poly(γglutamic acid), poly(L-lysine), poly(β-amino esters), poly(phosphoesters), polycarbonates, polyvinylpyrrolidone ethylcellulose, poloxamer, polyamidoamine, polyglycerol, sodium pyrrolidone carboxylate, chitosan, and the like.

In one or more embodiments, metal nanoparticles can be used for the nanoparticle core. Exemplary metal nanoparticles comprise a metal or metal alloy of one or more metals selected from the group consisting of iron, gold, manganese, oxides thereof, and combinations thereof.

Thus, nanocarriers in such embodiments are substantially spherical particles having at least one lipid bilayer membrane as a coating, and a solid nanoparticle core, wherein active agents can be encapsulated/conjugated with the nanoparticle and/or the NK-infused lipid-based membrane. As with NKsomes, these nanoparticle carriers are characterized by NK cell membrane-associated targeting proteins on the bilayer membrane surface, such that these coated nanoparticle carriers have a high affinity towards cancer/tumor cells and enhanced tumor homing efficiency (i.e., are tumor trophic).

Further, in one or more embodiments, the membrane can further include one or more contrast media, imaging agents, or detectable moieties (e.g., dyes) for imaging and/or diagnostics, such as gadolinium, fluorescent dyes (e.g., Near infrared dye (NIR-dye) of different colors, such as Alexa Fluor®, Cy®, and IR® Dyes), radioactive isotopes (e.g., Copper-64, fluorine-18 (FDG-18), Technetium-99, zirconium (Zr-95, Zr-88, Zr-89), iodinated contrast agents), and the like. The contrast agents can be pre-conjugated to the lipids used to form the bilayer membrane, such that they will be integrally formed with the bilayer membrane, and be present on the interior and/or exterior surfaces of the membrane (i.e., at the hydrophilic heads). These moieties can be attached to the hydrophilic component of a membrane lipid, which will preferably predominately occupy the outer layer of the bilayer membrane, thus presenting the moiety on the exterior surface of the membrane after formation. Imaging agents can also be conjugated to the membrane surface after formation around the nanoparticle core. When the appropriate contrast agent is used, the magnetic properties of the coated nanoparticles can be tunable from $2.1 \pm 0.17$ to $5.3 \pm 0.5$ mM$^{-1}$s$^{-1}$ (e.g., under 14.1 T) by adjusting the concentration of imaging agent on the surface of the nanocarriers. The current data was obtained using 14.1 T, but it will be appreciated that various magnetic strengths may be used, depending upon the particular MRI machine. The coated nanoparticle nanocarriers have a circulation half-life of about 9.5 h, and a high biodistribution in tumor tissues (10% of injected dose).

Active agents that can be encapsulated and/or conjugated to the nanocarriers in various embodiments include both hydrophobic and hydrophilic agents. Examples include among other things, drugs (small molecule compounds, macromolecules) and other therapeutic molecules such as antibiotics, bioactive compounds, nutraceuticals, enzymes and other proteins and peptides, DNA and RNA (e.g., recombinant nucleic acids, RNA oligomers, DNA plasmids), prodrugs, and the like. Chemotherapeutic agents and other anticancer agents are particularly suited for use in the invention.

Non-limiting examples of active agents include:

| Hydrophobic compounds (water insoluble) | Hydrophilic compounds (water soluble) |
|---|---|
| Anticancer drugs | |
| Paclitaxel | Doxorubicin |
| Retinoic acid | Daunorubicin |
| Docetaxel | Edelfosine |
| Cisplatin | Gemcitabine |
| Etoposide | Vincristine |
| Curcumin | Oxiplatin |
| Etoposide | Irinotecan |
| Methotrexate | Temsirolimus |
| 5-Fluorouracil | carmustine |
| | Carboplatin |
| Antibiotics | |
| Cephalosporins | Penicillins |
| Quinolones | Tetracyclines |
| Macrolides | Lincomycins |
| Sulfonamides | Glycopeptides |
| Carbapenems | Aminoglycosides |
| Biologics | |
| Proteins | |
| Nucleic acids | |
| Various classes of peptides | |
| Aptamers | |
| Cells and cellular components such as: extracellular vesicles/exosomes from immune cells, diseased cells, or healthy cells of various types, such as stromal cells. | |

Excipients and other carriers or liquid solutions may also be included inside the vesicle nanocarriers, along with adjuvants (e.g., alum, aluminum hydroxide, aluminum phosphate, calcium phosphate hydroxide, detergents, such as Quil A, and other saponins, mineral oils, squalene, Freund's complete or incomplete adjuvants), and the like. Other than therapeutics, various bioimaging contrast agents (MRI contrast agents, such as Gd-based agents) can also encapsulated/conjugated within the synthetic nanoparticles aiming to prolong circulation half-life and enhance tumor accumulation.

These nanocarriers can be used in pharmaceutically acceptable compositions for delivering the active/diagnostic/imaging agents and can be administered intravenously, subcutaneously, intramuscularly, orally, intraperitoneally, or via inhalation to a subject. Methods of targeting delivery of an active/diagnostic/imaging agents to a specific cell type or a region of a patient are also contemplated herein. In one or more embodiments, the composition comprises an effective amount of nanocarrier dispersed in a pharmaceutically-acceptable carrier or excipient. A pharmaceutically-acceptable carrier or excipient would naturally be selected to minimize any degradation of the nanocarrier and to minimize any adverse side effects in the subject, cells, or tissue, as would be well known to one of skill in the art. Pharmaceutically-acceptable ingredients include those acceptable for veterinary use as well as human pharmaceutical use. Exemplary carriers and excipients include aqueous solutions such as n. saline, PBS, and/or DAW, oil-in-water or water-in-oil emulsions, and the like. As used herein, an "effective" amount refers to the amount of the nanocarrier that will elicit the biological or medical response of a tissue, system, animal, or human that is being sought by a researcher or clinician, and in particular elicit some desired therapeutic/diagnostic/imaging effect. One of skill in the art recognizes that an amount may be considered effective even if the condition is not totally eradicated but improved partially.

In certain embodiments, the nanocarrier may further be administered in combination with additional secondary agents, including anti-inflammatory agents, immunomodulators, and antimicrobial agents, such as antivirals, antibiotics, anti-fungals, anti-parasitics, and the like.

In one or more embodiments, nanocarrier vesicles can be prepared by hydrating NK-92 membrane fragments with selected lipids in a suitable buffer or solvent system, along with any imaging agents or detectable moieties, and/or active agents followed by extrusion through a membrane filter. The protocol can be optimized by first forming a lipid thin film, followed by hydration. Further, the solution can be sonicated to homogeneously intermix the components before extrusion. It will be appreciated that the imaging agents and/or detectable moieties could also be conjugated to the vesicle surface after extrusion if desired. Likewise, certain active agents could also be conjugated to the vesicle surface after extrusion if desired. In one or more embodiments, NK-92 cell membrane fragments are obtained from activated NK-92 cells (i.e., NK-92 cells that have been stimulated, such as with cytokines, IFN-γ, IL-2, IL-4, IL5, IL-6, IL8, IL-10, IL-17, TGF-β, and TNF-α, and the like). In one or more embodiments, methods of the invention involve ex vivo expansion and activation of the NK-92 cells. Methods for expansion and activation of NK cells are described in the literature. The cells are first lysed and the membrane fragments isolated, such as by gradient centrifugation. Isolated membrane fragments can be lyophilized for storage until use and/or suspended in buffer. The NK-92 cell membrane fragments are then mixed with the other components (e.g., lipids, active agents, etc.) for extrusion. Alternatively, the NK-92 cell membrane fragments can be co-extruded with pre-formed liposomes (which have already been loaded with active agents and/or imaging agents) to integrate the NK-92 cell membrane fragments (and associated NK-92 membrane proteins) in the lipid bilayer.

In one or more embodiments, solid-core nanocarriers can be prepared by hydrating NK-92 membrane fragments with selected lipids and nanoparticles in a suitable buffer or solvent system, along with any imaging agents or detectable moieties, and/or active agents followed by extrusion through a membrane filter. As noted, polymeric and/or metal nanoparticles can be used. The NK-92 membrane fragments can be isolated as described above. The lipids can be conjugated with active agents and/or imaging agents before extrusion. Alternatively, these agents can be conjugated onto the solid-core nanocarrier surface after extrusion. Alternative methods for forming lipid bilayers for nanovesicles and/or solid core nanocarriers include sonication, thin film evaporation, hydration, nanoemulsion, extrusion, and the like.

Additional advantages of the various embodiments of the invention will be apparent to those skilled in the art upon review of the disclosure herein and the working examples below. It will be appreciated that the various embodiments described herein are not necessarily mutually exclusive unless otherwise indicated herein. For example, a feature described or depicted in one embodiment may also be included in other embodiments, but is not necessarily included. Thus, the present invention encompasses a variety of combinations and/or integrations of the specific embodiments described herein.

As used herein, the phrase "and/or," when used in a list of two or more items, means that any one of the listed items can be employed by itself or any combination of two or more of the listed items can be employed. For example, if a composition is described as containing or excluding components A, B, and/or C, the composition can contain or exclude A alone; B alone; C alone; A and B in combination; A and C in combination; B and C in combination; or A, B, and C in combination. The present description also uses numerical ranges to quantify certain parameters relating to various embodiments of the invention. It should be understood that when numerical ranges are provided, such ranges are to be construed as providing literal support for claim limitations that only recite the lower value of the range as well as claim limitations that only recite the upper value of the range. For example, a disclosed numerical range of about 10 to about 100 provides literal support for a claim reciting "greater than about 10" (with no upper bounds) and a claim reciting "less than about 100" (with no lower bounds).

EXAMPLES

The following examples set forth methods in accordance with the invention. It is to be understood, however, that these examples are provided by way of illustration and nothing therein should be taken as a limitation upon the overall scope of the invention.

Example 1

Figure 1B:
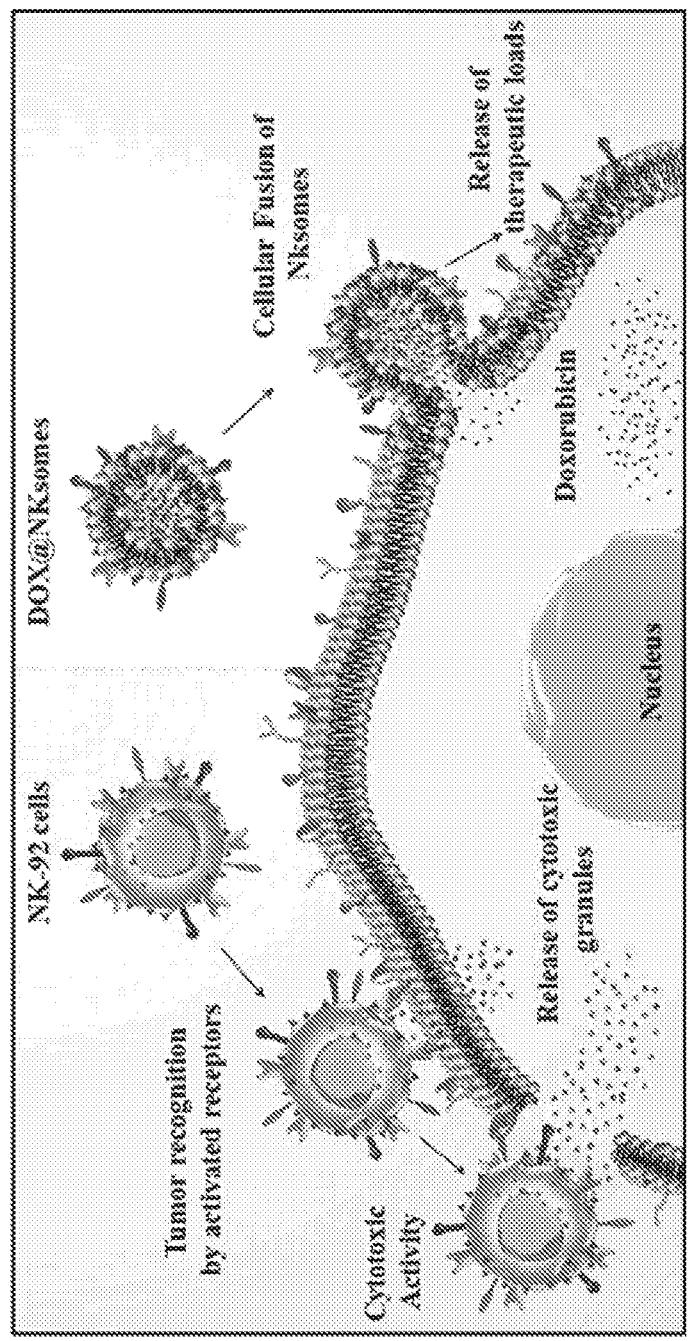
FIG. 1B. NK cells recognize tumor cells by their overexpressed surface stress markers and can induce its antitumor potential by releasing cytotoxic granules. In NKsomes, doxorubicin (DOX)-loaded NK cell membrane-camouflaged liposomes can recognize tumor cells with the help of NK cell markers and fused with the tumor cells more efficiently than normal cells and shows its anti-tumor potential by the releasing the chemotherapeutic drug, DOX.

Natural Killer Cell Membrane Infused Biomimetic Liposomes for Targeted Tumor Therapy In the present study, we designed the biomimetic nanoconstructs made up of NK cell membrane infused fusogenic liposomes (NKsome) for targeted drug delivery to the tumor as demonstrated in the proposed mechanism (FIG. 1). An activated NK cell membrane with receptor proteins was isolated from the NK-92 cells (ATCC CRL-2407) and membrane extruded with the fusogenic liposome to form "NKsomes." In vitro tumor targeting ability of the fusogenic NKsome was investigated against normal human osteoblast (NHost) and Human breast cancer cells (MCF-7). Further, the chemotherapeutic drug, doxorubicin (DOX) was encapsulated into the aqueous core of NKsome and investigated its tumor homing ability and anti-tumor efficacy against MCF-7 induced solid tumor model in NU/NU mice.

1. Materials and Methods
1.1. Chemicals and Antibodies

Lipids 1,2-dioleoyl-sn-glycero-3-phosphoethanolamine (DOPE) and 1,2-dioleoyl-3-trimethylammonium-propane (chloride salt) (DOTAP), were purchased from Avanti Polar Lipid Inc. (Alabaster, AL, USA). Cholesterol was purchased from Fisher. Chemotherapeutic Drug, DOX was purchased from LC Laboratories (Woburn, MA, USA). Primary antibodies like NKG2-D, NKp30 and Pan-cadherin were purchased from Santa Cruz Biotechnology. NCAM (CD56) and Secondary HRP-linked anti-mouse IgG antibody were procured from Cell Signaling. Fluorophore tagged antibodies like FITC Mouse anti-Human CD56, PE-Cy™7 Mouse Anti-Human CD314/NKG2D and Alexa Fluor® 647 Mouse Anti-Human CD337 (NKp30) and APC Mouse IgG1, κ Isotype Control were purchased from BD Bioscience. All other reagents and chemicals were of analytical grade.

1.2. Cell Lines and Tumor Models

Human Natural Killer cells, NK-92 (ATCC® CRL-2407™) were procured from ATCC, Manassas, USA, and the cells were maintained in Alpha Minimum Essential medium without ribonucleosides or deoxyribonucleosides supplemented with 2 mM L-glutamine, 1.5 g/l sodium bicarbonate, 0.02 mM folic acid, 0.1 mM 2-mercaptoethanol, 0.2 mM inositol, 200 U/ml recombinant IL-2 and 12.5% horse serum and 12.5% fetal bovine serum. Normal Human Osteoblast cells, NHost was procured from Lonza, Inc and maintained in OGM® Bullet Kit supplemented with 10% (v/v) fetal bovine serum (FBS) and penicillin/streptomycin (100 ug/ml) and maintained at 37° C. in 5% $CO_2$ environment. The human breast cancer cell line MCF-7 (ATCC® HTB-22™) was procured from ATCC, Manassas, USA, and the cells were maintained in Dulbecco's Modified Eagle's Medium (DMEM) supplemented with 10% (v/v) fetal bovine serum (FBS) and penicillin/streptomycin (100 ug/ml) and maintained at 37° C. in 5% $CO_2$ environment. Human peripheral blood monocyte THP-1 cells were gifted by Dr. Massaki Tamura, Kansas State University, USA and maintained in RPMI medium with 10% (v/v) fetal bovine serum (FBS) and penicillin/streptomycin (100 ug/ml) and maintained at 37° C. in 5% $CO_2$ environment.

Six-week-old female NU/NU nude mice were procured from Charles River Laboratories International, Inc and used for the study after 10 days acclimatization. All animal experiments and protocols were approved by Institutional Animal Care and Use Committee (IACUC) and Institutional Biosafety Committee (IBC), Kansas State University, Manhattan. For tumor models, $1 \times 10^6$ MCF-7 cells in saline were injected subcutaneously into the hind rear flank region of the mice and the tumor growth were monitored periodically.

1.3. Extraction of NK Membranes (NKM)

Natural killer cell, NK-92 cells were grown to 80% confluence in multiple T-75 culture flask (~$3 \times 10^8$ cells) and harvested, washed in 1×PBS thrice by centrifuging at 500 g for 5 min. The purified cell pellet was suspended in Homogenization buffer (10 mM Tris-HCl, 1 mM KCl, 25 mM Sucrose, 1 mM $MgCl_2$, 2 mM PMSF, 200 µg/mL Trypsin-chymotrypsin Inhibitor, 10 µg/mL DNase and 10 µg/mL RNase) and homogenized in ice for 5 min (20 s pulse and 30 s in between pulses). The homogenized mixture was collected under the ice-cold condition and pooled over the discontinuous sucrose gradient (55%, 40% and 30% (w/v) sucrose in 0.85% saline) in polycarbonate tubes. The sampled gradients were ultra-centrifuged in a Beckman SW 27 rotor at 28,000 g for 30 min at 4° C. The membrane fraction at 30% to 40% interface was collected in a clean tube. For purification, collected membrane fractions were diluted with an excess of normal saline and ultracentrifuged in a Beckman SW 27 rotor at 28,000 g for 1 h at 4° C., and analyzed for protein characterization using the dot-blot technique. The isolated membranes were lyophilized, weighed, quantified for the protein concentration by rehydrated in PBS (pH 7.4) and stored at 4° C.

1.4. Preparation of Fusogenic NKsomes

Fusogenic NKsomes were prepared using a standard liposome fabrication membrane extrusion technique. In brief, cationic fusogenic liposome was prepared using DOTAP:DOPE:cholesterol dispersed in chloroform (molar ratio of 47:44:9) using thin-film hydration technique. The evaporated dried film was hydrated with 1×PBS (pH 7.4) and incubated at 40° C. for 30 min, mixed vigorously and further sonicated to obtain a clear suspension of lipids. The liposomal suspensions were further extruded with polycarbonate membrane filter with different pore sizes (1 µm and 200 nm), and the fusogenic liposome (bare liposome) was stored at 4° C. For NKsomes, bare liposome was further extruded with 200 nm, in the presence of varying concentration of isolated NK membrane (NKM) to make the overall protein:lipid ratio of 1:1000, 1:500 and 1:100 (by weight) namely NKsomes-A, NKsomes-B, and NKsomes-C, respectively, and purified using Sephadex G-50 column (GE healthcare).

TABLE 1

Weight ratios of NKsome formulations.

| Formulation | Mohr ratio (%) | | | Protein:Lipid ratio (by weight) |
| --- | --- | --- | --- | --- |
| | DOPE | DOTAP | Cholesterol | |
| Bare LIPO | 47 | 44 | 9 | 0:1 |
| NKsomes A | 47 | 44 | 9 | 1:100 |
| NKsomes B | 47 | 44 | 9 | 1:500 |
| NKsomes C | 47 | 44 | 9 | 1:1000 |

The purified NKsomes are stored at 4° C. until use. The conventional anionic liposome was prepared using DSPG: DSPG-PEG-succinyl:cholesterol in the molar ratio of 55:40: 15 for control experiments. For Rhodamine labelled-experiments, 20 µg of L-α-Phosphatidylethanolamine-N-(lissamine rhodamine B sulfonyl) (Ammonium Salt) (Egg Liss Rhod PE) was included in the NKsome formulation.

1.5. Characterization of Fusogenic NKsomes

The hydrodynamic size and zeta potential of the bare and DOX encapsulated NKsomes were characterized by Dynamic light scattering analysis (Malvern ZSP). The surface morphology of the liposome was studied using Transmission electron microscope (FEI Technai G2 Spirit BioTWIN). Fourier transform infrared spectroscopic analysis of the lyophilized NKsomes samples was analyzed using Nicolet™ iS™ 50 FT-IR Spectrometer (Thermo Fisher). Protein quantification in all samples was done using Bradford Assay. For SDS-PAGE analysis, whole cell lysate, NKM, NKsomes samples were prepared at a protein concentration of 300 µg/mL. NKsomes were collected by centrifugation at 12,000 rpm for 15 min and redispersed in gel loading dye. All samples were heated at 90° C. for 5 min, and 20 µL of samples were loaded into wells of 4-20% Mini-PROTEAN® TGX Protein Gels and stained using Coomassie Brilliant Blue. For Western blot analysis, proteins were transferred to PVDF membrane by the wet-blot method, and the membranes were treated with primary antibodies for CD-56 (Cell Signaling), NKG2-D (Santa Cruz), NKp30 (Santa Cruz) and Pan-cadherin (Santa Cruz) along with HRP-conjugated anti-mouse IgG secondary antibody (Cell Signaling). The blotted films were further developed using SignalFire™ ECL Reagent (Cell signaling) and imaged for chemiluminescence signal under Bio-imager (Kodak). For the confocal study, 50,000 cells/well in 8-chamber slides were treated with NKsomes and conventional anionic liposomes with NKM coating (50 µg/mL) for 3 h at 37° C. After incubation, excess media was removed, washed twice and samples were further immunostained as described above and observed under Confocal Laser Scanning Microscope (Carl Zeiss, LSM-700).

1.6. Fusogenic Property of NKsomes

The fusogenic property of the NKsomes was investigated using fluorescent resonance energy transfer (FRET) study. In brief, fusogenic FRET liposome was prepared by incorporating FRET fluorophore lipids, an electron donor (l-α-Phosphatidylethanolamine-N-(4-nitrobenzo-2-oxa-1,3-diazole) (Ammonium Salt), 0.3 mole % and an electron acceptor (1-α-Phosphatidylethanolamine-N-(lissamine rhodamine B sulfonyl) (Ammonium Salt), 0.7 mole % into the NKsome formulation. For fusion study, 50 µL FRET liposome (1 mg/mL) were allowed to incubate with $5 \times 10^3$ MCF-7 cells in a 96-well plate at room temperature for 5 min, and the cell samples were analyzed spectrofluorimetrically by exciting sample at 470 nm and measuring the emission spectrum between 500 nm and 700 nm. For cellular fusion of NKsomes using fluorescent activated cell sorting (FACS), $1 \times 10^6$ MCF-7 cells grown in the T25 flask were treated with 500 µg/mL of NKsomes and incubated for 3 h. After incubation, excess media was removed, washed twice and trypsinized and samples were immunostained with FITC Mouse anti-Human CD56, PE-Cy™7 Mouse Anti-Human CD314/NKG2D and Alexa Fluor® 647 Mouse Anti-Human CD337 (NKp30) and APC Mouse IgG1, κ Isotype Control and analyzed in BD FACS Calibur. For the confocal study, NKsomes and conventionally treated cell samples were immunostained and observed under Confocal Laser Scanning Microscope (CLSM) (Carl Zeiss, LSM-700).

1.7. Drug Loading and Release Assay

For DOX encapsulation, NKsomes were prepared as described earlier, in which the dried lipid cakes were directly hydrated with calculated DOX (2.5%, 5%, 10%, 15% and 20% by total lipid weight) in PBS, incubated at 50° C. for 5 min and probe sonicated for 1 min (20 s pulse). The liposomal dispersions were further extruded in the presence of NKM (1:500) by using a Millipore membrane filters with different pore sizes (1 µm and 200 nm) and the excess unbound DOX were column purified in Sephadex G-50 column. The drug loading and encapsulation efficiency of bare liposomes and NKsomes were analyzed by measuring the DOX absorbance at 490 nm. For cumulative drug release study, DOX-loaded NKsomes (DOX@NKsome) and bare liposome were investigated in physiological (PBS, pH 7.4) and acidic (Acetate buffer, pH 5.5) condition at 37° C. In brief, 25 µg/mL of samples were placed in 12-14 kDa dialysis membrane bag and dialyzed in the 250 mL of the corresponding buffer at constant stirring (100 rpm). After regular intervals of time, 500 µL of samples were taken from the setup and added a fresh buffer of the same volume to the setup. The amount of DOX in the samples was quantified spectrofluorimetrically by measuring DOX excitation and emission of 490 nm and 580 nm.

1.8. In Vitro Targeting Assay

The targeting ability of NKsomes against human breast cancer cell MCF-7 and the normal human osteoblast cell NHost were tested using flow passage assay. In brief, $1 \times 10^6$ cells were seeded onto the cell culture treated flow cells (ibid µ-slides) and grown for 24 h at 37° C. To mimic blood flow condition, cells were then treated with Rh-labelled NKsomes and bare liposome (at the concentration of $1 \times 10^{12}$ nanoparticles suspended in the overall volume of 3 mL of respective media) and were passaged at a constant flow rate of 0.2 dyn/cm² for different flow cycles (6 cycles in 2 h). The accumulation of Rhodamine fluorescence in the cells were recorded periodically by imaging the cells in a different area under a fluorescent microscope equipped with live cell imaging. After six cycles of a flow condition, the cells were washed, fixed and immunostained with anti-CD56 for the presence of NK-membrane and observed under CLSM.

1.9. In Vitro Immunogenicity Assay

The immunogenicity of NKsomes in THP-1 cells were tested for its inflammatory response using a cytokine release assay. In brief, $7.5 \times 10^5$ THP-1 cells were seeded in 12-well plate and treated with isolated NKM (100 µg/mL), NKsomes (100 µg/mL), Free DOX (5 µg/mL), DOX@NKsomes (equivalent DOX load) and Bare liposomes (100 µg/mL) for 24 h incubation. Positive (LPS, 3 µg/mL) and negative controls were maintained for assessing pro-inflammatory cytokines in THP-1 cells. The treated cell culture supernatants were collected, centrifuged to remove cell debris, aliquot and stored at −20° C. until needed. Samples were thawed and used for analyzing pro-inflammatory cytokines, IL-1β (0.8 pg/ml), IL-6 (0.4 pg/mL) and TNF-α (0.7 pg/mL) using quantitative enzyme-linked immunosorbent assay KIT (ELISA) (R&D Systems, Inc. Minneapolis, MN) as recommended by the manufacturer. Sample fluorescence was measured at 450 nm with the wavelength correction at 540 nm using Synergy H1 hybrid microplate reader (BioTek Instruments Inc. VT).

1.10. In Vitro Anti-Cancer Effects

The in vitro cytotoxicity of DOX@NKsome and the equivalent Free DOX were investigated against MCF-7 cells and NHost using a cell cycle analysis and an MTT assay. For cell cycle analysis, $1\times10^6$ cells were treated with 5 µM of Free DOX, equivalent DOX@NKsomes and bare NKsomes (equivalent to DOX-loaded) for 12 h. After incubation, cells were harvested, fixed in 70% ethanol overnight, washed with PBS twice and then followed propidium iodide staining. Further, the samples were analyzed in FACS Calibur for cell cycle analysis.

For MTT analysis, MCF-7 cells and NHost cells were treated with NKsomes with different DOX concentration along with free DOX and bare NKsomes. In brief, $2\times10^4$ cells per well in the respective medium were seeded in a 96-well plate and incubated for 24 h. While the cell reaches 80% confluence, the media was replaced with different DOX concentration of free DOX and NKsomes (0.5, 1.5, 3, 5, 10 and 15 uM) and incubated for additional 24 h. Control cells were maintained without DOX treatment. After incubation, MTT dye was added according to the manual instruction and further incubated for 3 h. The insoluble formation crystals were solubilized using DMSO, and the absorbance was read at 590 and 630 nm using microplate reader (BioTek, Synergy H1 Hybrid reader).

1.11. Circulation Half-Life and Bio-Distribution Study.

The circulation half-life profile of NKsomes was investigated using Six-week-old immunodeficient female NU/NU nude mice (n=3). In brief, 5 mg/kg DiR-labelled NKsomes were administered intravenously via tail vein injection, and the blood samples were collected at predetermined time intervals (0.5, 1, 2, 4, 8, 12, 24, and 48 h) through the tail puncture. The blood samples were analyzed under spectrofluorometer for the quantification of DiR signals with the excitation and emission wavelength of 750 and 780 nm. For the bio-distribution study, 5 mg/kg of DiR-labeled NKsomes was administered intravenously into the MCF-7 tumor-bearing mice through tail vein injection, and after 24 h, animals were sacrificed, and the blood, heart, lung, spleen, liver, kidney and tumor were isolated. The collected organs were weighed, homogenized and quantified for the presence of DiR dye using spectrofluorometry with the excitation and emission wavelength of 750 and 780 nm. The stability of DiR in the formulation was investigated in vitro in physiological condition to assure its intactness with nanoconstruct.

1.12. In Vivo Anti-Tumor Therapy

The anti-tumor efficacy of DOX@NKsomes was determined along with free DOX and unloaded NKsomes (aka "empty" NKsomes) using MCF-7 induced solid tumor model in immunodeficient NU/NU nude mice (n=3). In brief, $1\times10^6$ MCF-7 cells in PBS was injected subcutaneously into the hind rear flank region of the mice and the tumor growth is monitored periodically. When the tumor size reached 4-5 mm, animals received 4 cycles of drug treatment at Day 1, 4, 7 and 10 [DOX@NKsomes and free DOX (equivalent DOX concentration of 5 mg/kg)] up to 3 weeks. Control groups were also maintained without any treatment and bare NKsomes (10 mg/kg). During the study, body weight and tumor volume of the animal groups were monitored periodically to assess the therapeutic effects. The tumor volume (V) was determined using V=L×W2/2, where L=length of the tumor and W=width of the tumor. At the end of the study, animals were euthanized, collected tumors and measured its size and weight. Further, the tumor tissues were embedded in OCT, cryosectioned and subjected to immunofluorescence for the qualitative accumulation of NKsomes in tumor tissues by assessing the NKM protein marker (CD 56).

1.13. Statistical Analysis

Depending on the parameters One-way and Two-way ANOVA were used for the statistical analysis. All data represent mean±standard deviation. *$P<0.001$, $P<0.01$, *$P<0.05$ were considered statistically significant.

Figure 2A:
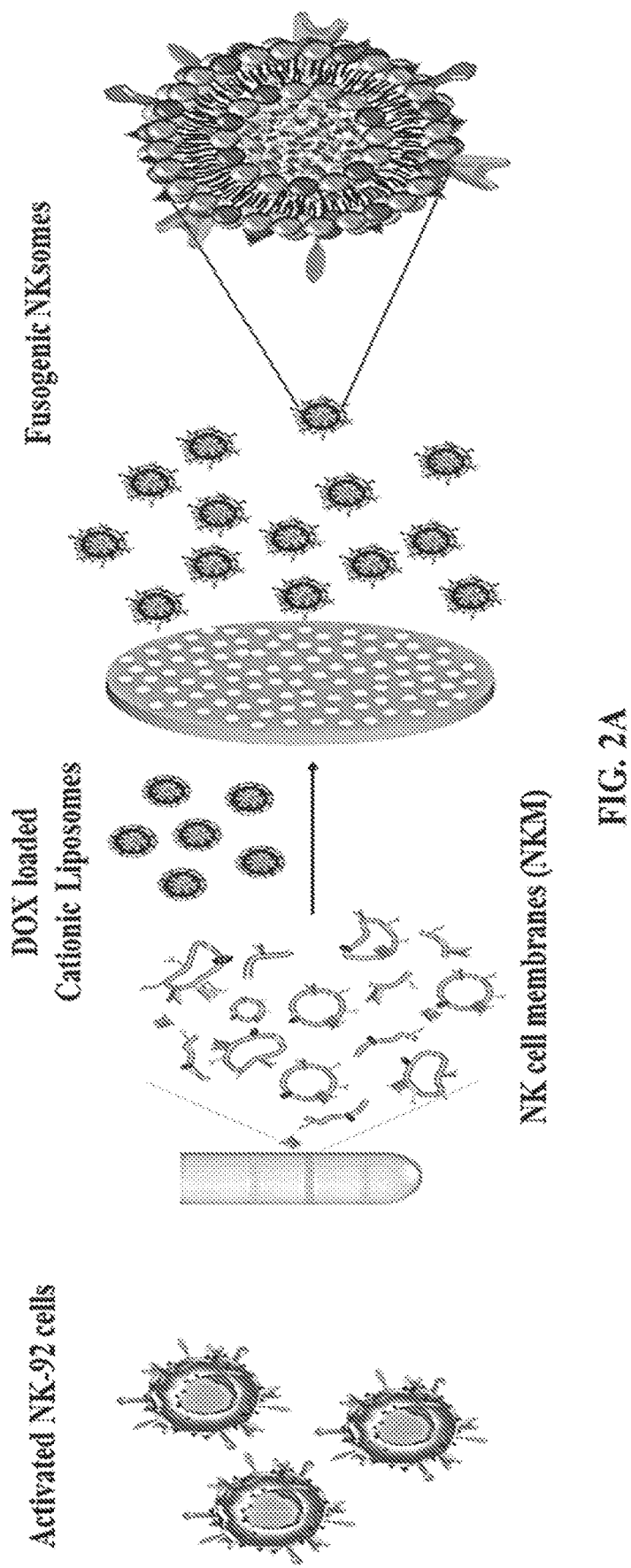
FIG. 2A. Schematic illustration of the preparation of NKsomes using sucrose density gradient centrifugation and an extrusion method.

2. Results and Discussion 2.1. Preparation and Characterization of Fusogenic NKsomes Preparation of NKsome involves the extraction of natural killer (NK) cell membrane with surface receptor proteins isolated from the activated NK-92 cells and surface infusion with synthetic liposome as illustrated in FIG. 1. The membrane extraction was carried using sucrose density gradient ultracentrifugation of the whole cell extract (FIG. 2A). The isolated NK membrane was found at the 30-40% interface of the sucrose gradient. The purified NK cell membrane (NKM) was quantified for its protein content through Bradford Assay. The average protein content in NK cell membrane extracted from $1\times10^7$ cells was found to be ~300 ug of protein. Further, to confirm the presence of integrated characteristic membrane proteins (CD56, NKG-2D, and NKp30) of NK-92 cells in isolated NKM, a Dot-blot assay was carried out. The result showed that characteristics proteins were successfully retained in the purified NKM (FIG. 2G). For NKsome preparation, fusogenic liposome was prepared using DOTAP:DOPE:Cholesterol in the molar ratio of 50:45:5 by film hydration technique following published protocols. The prepared liposome was extruded with NKM at different protein concentration in three formulations by varying the protein and lipid ratio viz.; NKsome-A 1:100, NKsome-B 1:500, and NKsome-C 1:1000, through 200 nm pore sized polycarbonate membrane filter. The assembly of NKM fuses with the cationic lipid components of the liposome driven by electrostatic interactions and thus forms stable NKsomes. To confirm the fusion of NKM with the liposomes, a FRET study was conducted by preparing FRET liposomes with fluorescence donor (L-α-phosphatidylethanolamine-N-(4-nitro-benzo-2-oxa-1,3-diazole) (egg-transphosphatidylated, chicken), (PE-NBD) and a fluorescent acceptor (L-α-phosphatidylethanolamine-N-(lissamine rhodamine B sulfonyl) (ammonium salt) (PE-RhB) as building blocks of liposome. FRET study utilizes the energy transfer mechanism to identify the molecular distance between the fluorophores. Energy transfer can occur from donor to the acceptor when they are in proximity, thus minimizes the donor energy. As expected, when NKM infused with the FRET liposomes a FRET effect was diminished. The fluorescent intensity of the donor was increased whereas that of acceptor was decreased. This is only possible when NK cell membrane fuses with the FRET liposomes and increase in the distance between two fluorophores. Further, increase in the concentration of protein induce rapid aggregation of the NKsomes, thereby affecting its stability in biological media.

Figure 2B:
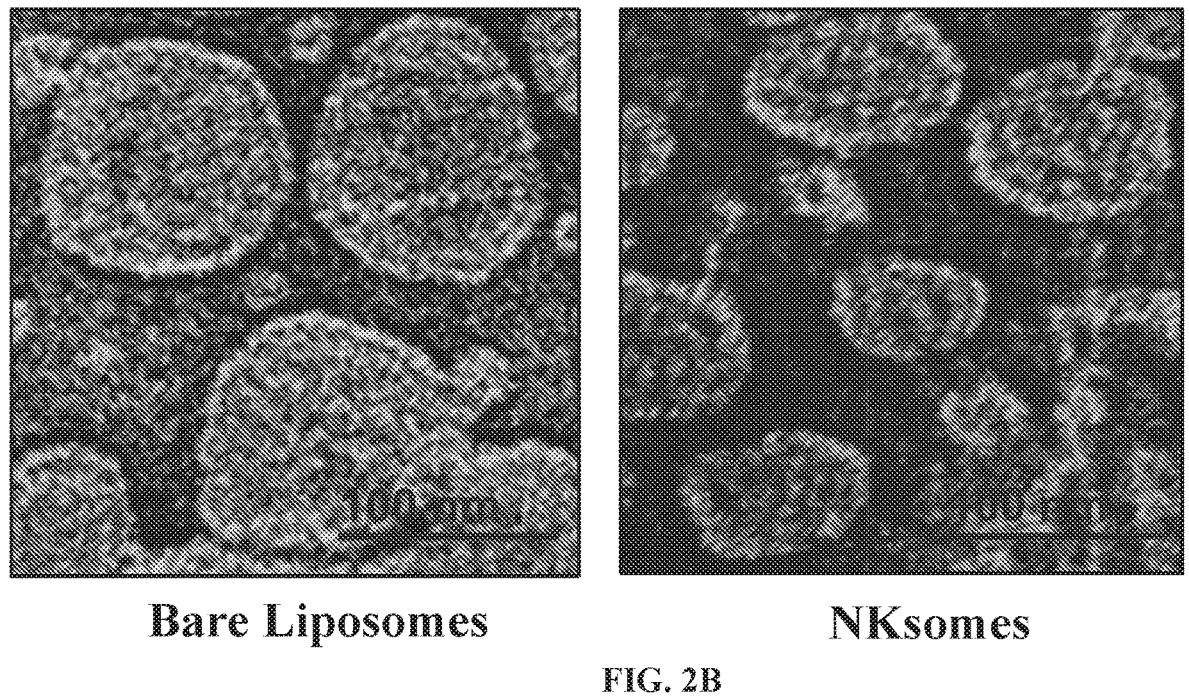
FIG. 2B. Transmission electron microscopic images of bare liposomes and NKsomes.
Figure 2C:
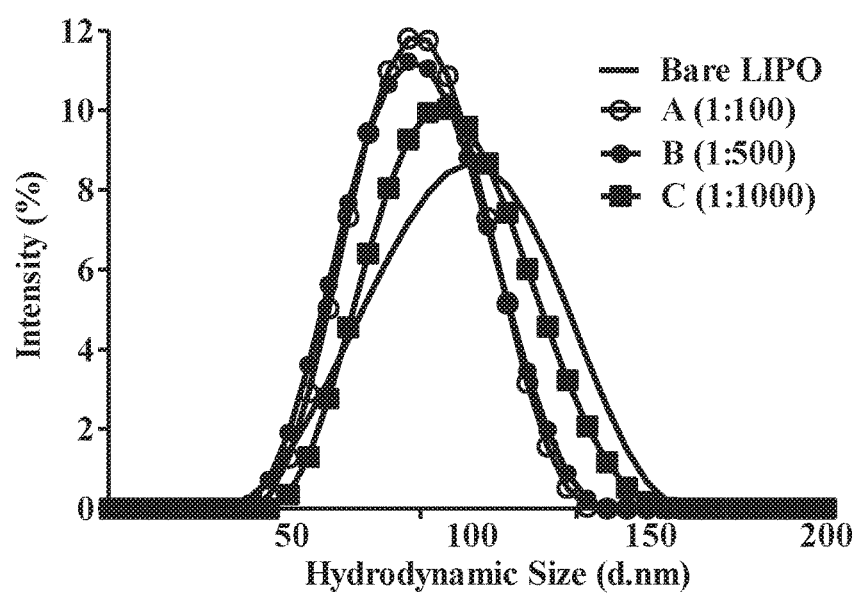
FIG. 2C. Dynamic light scattering size distribution analysis of NKsomes with different membrane:lipid ratio (1:100, 1:500 and 1:1000).
Figure 2D:
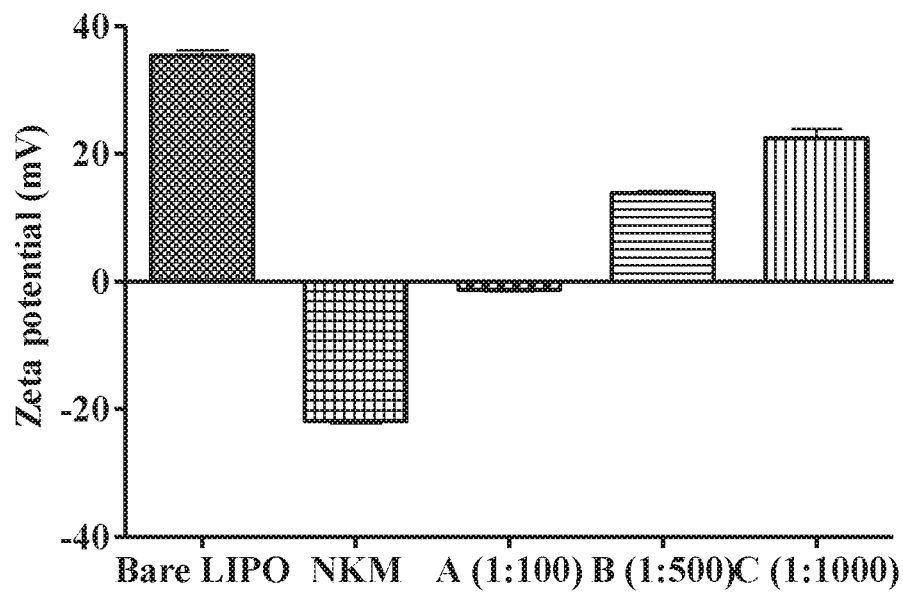
FIG. 2D. Zeta potential of isolated NK cell membrane, bare liposomes, and NKsomes with different membrane content (1:100, 1:500 and 1:1000).
Figure 2E:
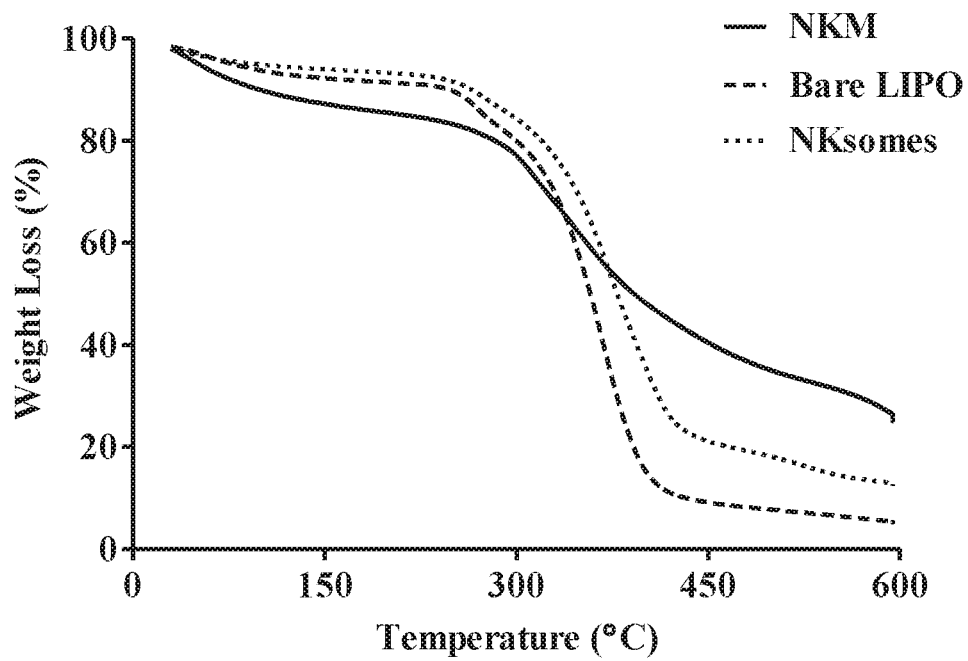
FIG. 2E. Estimation of lipid content from synthetic liposome in NKsomes (1:500) analyzed using Thermogravimetric analysis.
Figure 2F:
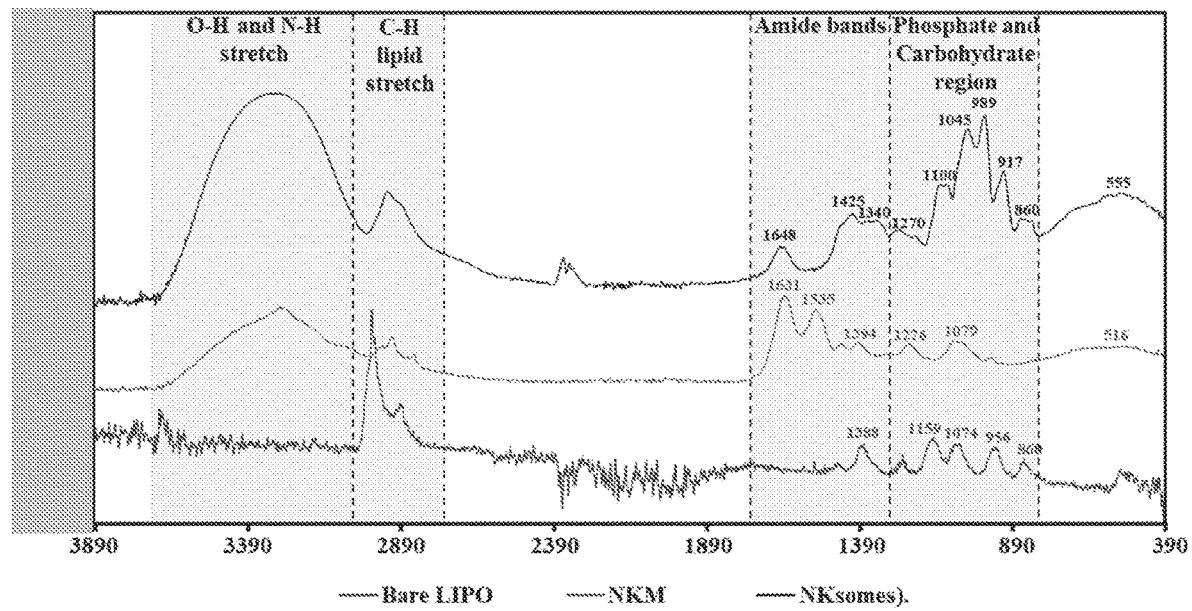
FIG. 2F. FTIR analysis of NKsomes (1:500) showing functional characterization of membrane proteins.
Figure 2G:
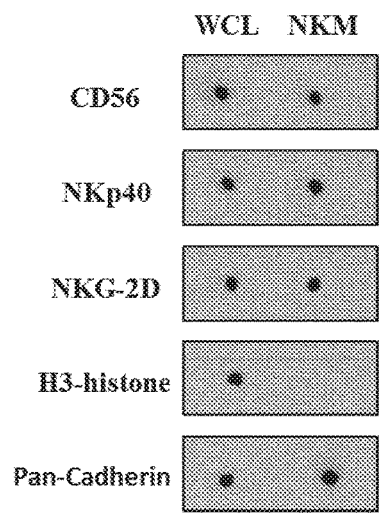
FIG. 2G. Dot-blot assay for the qualitative detection of characteristic proteins in NK-92 cell extract and the isolated NK-membranes using discontinuous sucrose gradient centrifugation. Immunoblotting confirms the retention of cellular membrane protein markers like CD-56, NKG-2D, and NKp30 and also confirms the absence of nuclear material in the isolated NKM.

Transmission electron microscopic examination shows that the bare liposome and NKsome are spherical with the average diameter of 80 and 70 nm, respectively (FIG. 2B). It is important to note that TEM size is in dry state measurement, which possibly distracted the actual size and shape. The hydrodynamic diameter is the actual diameter of NKsome under hydrated condition that was used in all in vitro and in vivo experiments, which was found to be different under various protein content viz., 85±1, 88±1, and 98±0.6 nm for NKsome-A, NKsome-B, and NKsome-C, respectively, whereas that of the bare liposome (without NKM) was 121±2 nm in diameter. These results clearly evident that the size of the NKsome was reduced with the increased protein concentration, suggested the fusogenic flexibility of liposome surface and protein and phospholipids form NKM stabilized NKsome in narrow size (FIG. 2C). The zeta potential of the isolated NKM was found to be −22±0.3 mV, whereas the zeta potential of the prepared NKsome was found to be −1.3±0.2, +14±0.3, and +22.5±1.3 mV for NKsome-A, NKsome-B, and NKsome-C, respectively, and that of bare liposome was found to be +35.4±0.8 mV. As compared to the positive zeta potential of the bare cationic liposome, the zeta potential of NKsome shows a successive reduction in cationic nature, which further confirms the successful inclusion of NKM in NKsomes (FIG. 2D). Further, the stability and functional integrity of the NKsome was tested by thermogravimetric analysis (TGA) and Fourier transform-infrared (FT-IR) spectroscopy by analyzing lyophilized NKsome samples. The TGA weight loss results under nitrogen environment show that the synthetic liposome completely decomposed at 450° C., as no residual matter left at the end of TGA analysis. Whereas, in typical NKM a significant residual protein (~35%) remained at the analyzed temperature range. In contrast, NKsome shows 15% of residual protein at the analyzed temperature range, which further confirms the inclusion of NKM into the synthetic liposome (FIG. 2E). Moreover, FT-IR spectrum shows the presence of signature amide I band and carbohydrate region of NKM in the NKsome thereby confirming the successful translocation of NKM into the NKsomes (FIG. 2F). Out of three formulations, NKsome-B shows enthusiastic colloidal stability than the other formulations. Therefore, we choose this formulation for further characterization and functional studies.

2.2. Protein Characterization of NKsomes

Figure 3A:
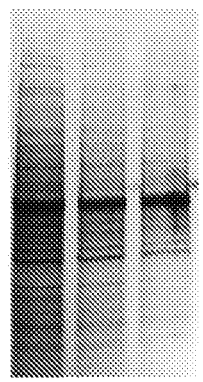
FIG. 3A. Fusogenic properties and protein characterization of NKsomes. SDS-PAGE analysis of membrane proteins isolated from NK-cell membrane and its presence in NKsomes.
Figure 3B:
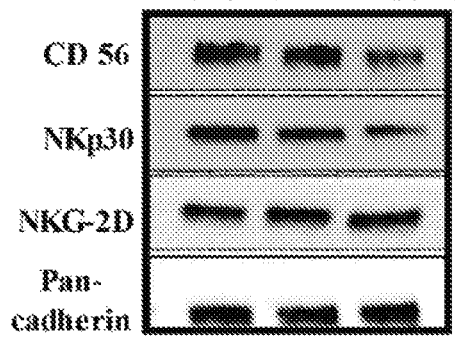
FIG. 3B. Western blot analysis of isolated NKM and NKsomes for its characteristics membrane proteins (CD 56, NKp30 & NKG-2D).

The biomimetic properties of the NKsome rely on the characteristic surface property of NK cell membrane, which is well known for its selective tumor homing ability and its role in immunosurveillance of cancer or stressed cells. This property will purely depend on the surface protein (NKG-2D, NKp30, etc.) expression on NK-cells. Although FT-IR analysis shows the presence of functional groups of these proteins, we further confirmed the presence of surface marker proteins using SDS-PAGE and western blot analysis. The SDS-PAGE reveals the total protein profiles of whole cell lysate and the isolated NKM. The protein profiles of the NKM was mostly retained in the prepared NKsome (FIG. 3A). It is well-known that the NK-92 can target cancer cells specifically through its surface receptor proteins like NKG2-D, NKp30, etc., for effective immunotherapy. Western blot was carried out to confirm the presence of signature protein receptors of NK-92 cells in NKsomes. As shown in FIG. 3B, NKG2-D, NKp30 were retained in the NKsomes along with its characteristic proteins like CD56, showing the successful translocation of signature proteins for specific targeting ability (FIG. 3B) thereby supporting the evidence obtained from FT-IR. Also, the representative transmembrane glycoprotein pan-cadherin was detected from the NKsome and served as the control (FIG. 3B).

2.3. Fusogenic Characteristics of NKsomes

Figure 3C:
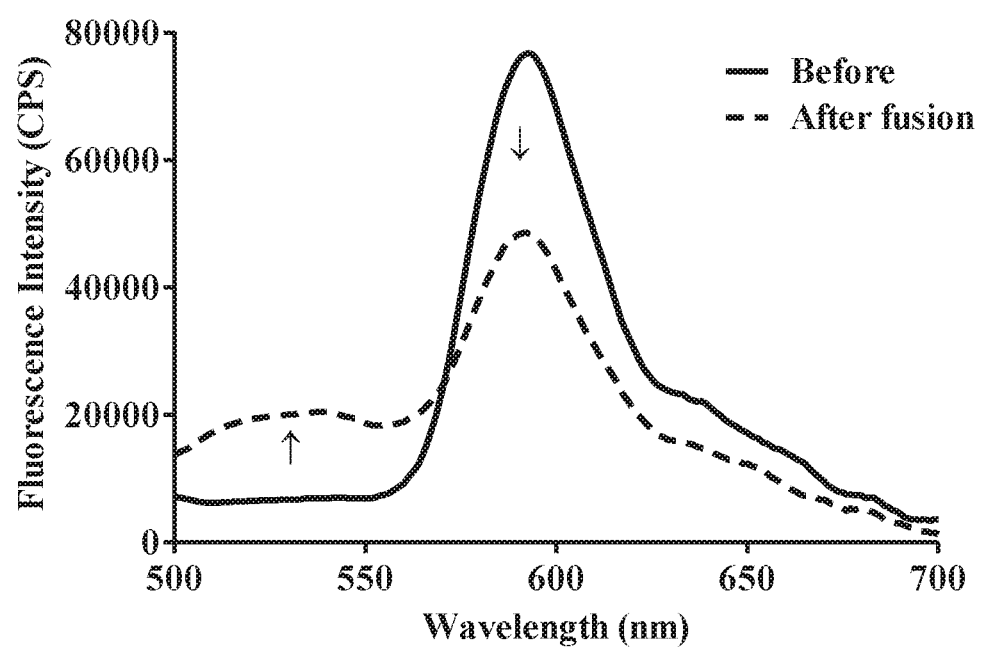
FIG. 3C. Fluorescent resonance energy transfer (FRET) study of NKM fused FRET NKsomes (NBD/RhB-labelled liposomes) with MCF-7 cells. Membrane fusion results in reduced FRET effect by increase in fluorescent recovery of donor fluorophore (NBD $\lambda em=525$ nm).

Recent progress in the area of fusogenic liposomes using neutral and positive charged lipids in combination with π electron system has greatly enhanced the transfection efficiency of biomolecules and drugs. As an alternative of endocytosis mediated cellular uptake, fusogenic liposomes are more advantageous in delivering therapeutics to the target cells by escaping lysosomal degradation process. To investigate the fusogenic property of NKsomes, NKsome-B was chosen due to its moderate cationic surface charge and robust stability in comparison to other formulations. A FRET study was conducted by preparing FRET NKsomes using PE-NBD/PE-RhB and were allowed to fuse with the MCF-7 cell at room temperature and investigated its fusogenic property. After 5 min of incubation, it was clearly evident that the fluorescent intensity of the acceptor reduced with the increase in the fluorescent intensity of donor (FIG. 3C). This confirms the fusogenic potential of NKsomes with cell membranes and thus retains its fusogenic potential even after NKM infusion. Further, the time-lapse fusion study of FRET NKsomes with MCF-7 cells showed steady increases in the fluorescent emission of donor NBD within 5 min of incubation and remains constant F1/F0 (F0=initial fluorescence intensity; F1=fluorescence intensity over time), confirmed the successful fusion of NKsomes with the cell membrane of the MCF-7.

Figure 3D:
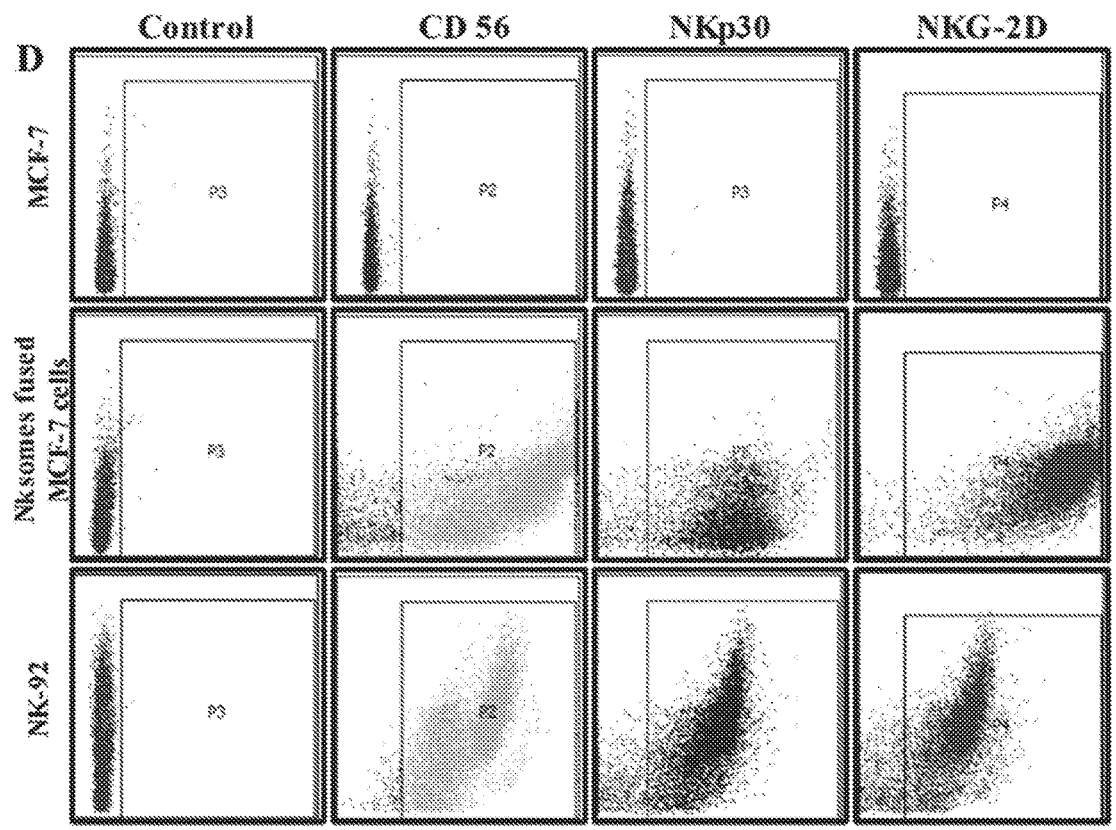
FIG. 3D. FACS analysis of immunostained MCF-7 cells for the presence of NK cells surface protein markers (CD 56, NKp30 & NKG-2D) before and after fusion with NKsomes.
Figure 3E:
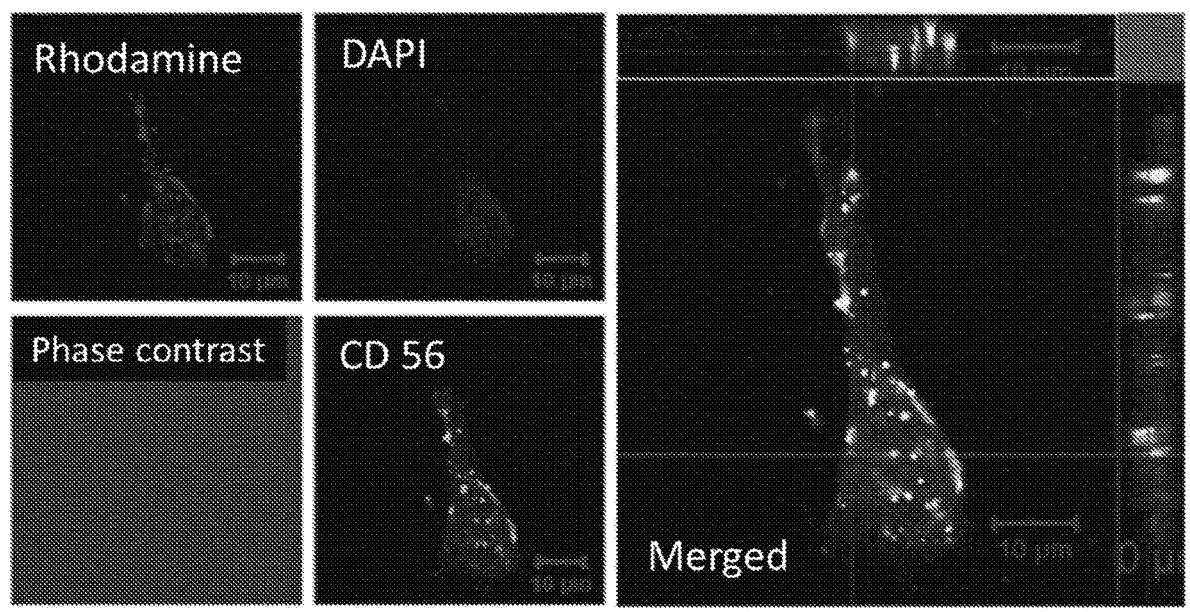
FIG. 3E. In vitro cellular fusion of RhB labelled Nksomes in MCF-7 cells after 3 h, immunostained for NK-92 cell marker (CD 56) captured in CLSM.
Figure 3F:
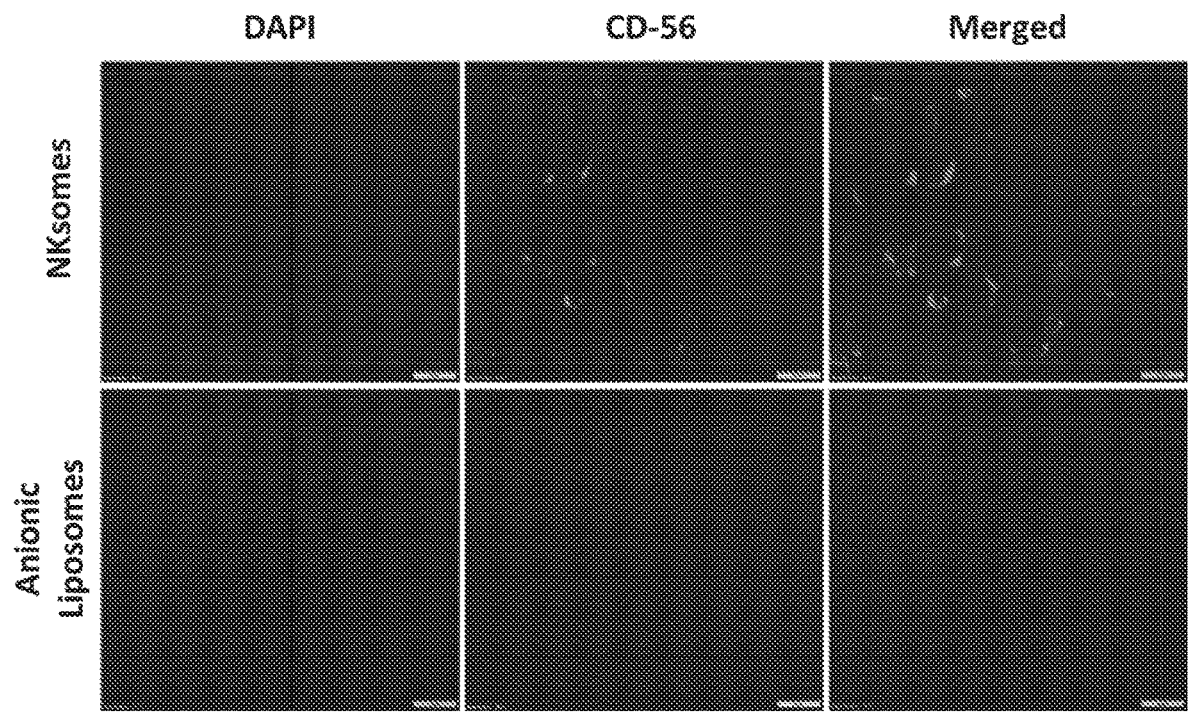
FIG. 3F. Cellular uptake of NKsomes and NKM coated anionic liposomes in MCF-7 cells after 3 h, immunostained with FITC-anti-CD56.

Further to understand the fusogenic property of NKsomes in vitro, MCF-7 cells were incubated with Rhodamine-labelled NKsome (RhB-NKsome) under cell culture condition for 3 h. After incubation, cell samples were collected and processed in FACS for the characteristic NK cell markers like NKG-2D, NKp30, and CD56. As shown in FIG. 3D, characteristic surface marker proteins NKG-2D, NKp30, and CD56 signals were identified in NKsome treated MCF-7 cells, which further confirmed the fusogenic potential of NKsome with the MCF-7 cells. FIG. 3E represents the CLSM micrographs of RhB-NKsome fused MCF-7 cells stained for anti-CD65-FITC. As shown in FIG. 3E, Rh-labelled fusogenic liposome and CD-56 markers were found intact in the NKsome fused MCF-7 cells; this further supports our proposed mechanism for drug delivery (FIG. 1). Also, Z-stack confocal images further confirmed that the NKsome was fused only on the surface of the MCF-7 cells. Whereas cells treated with NKM coated, conventional anionic liposome showed no signs of NKM accumulation in MCF-7 (FIG. 3F). With all these evidence, it was clear that the NKsomes have potential fusogenic property to proceed further with therapeutics.

2.4. Stability, Drug Loading, and Release Characteristics

Figure 4A:
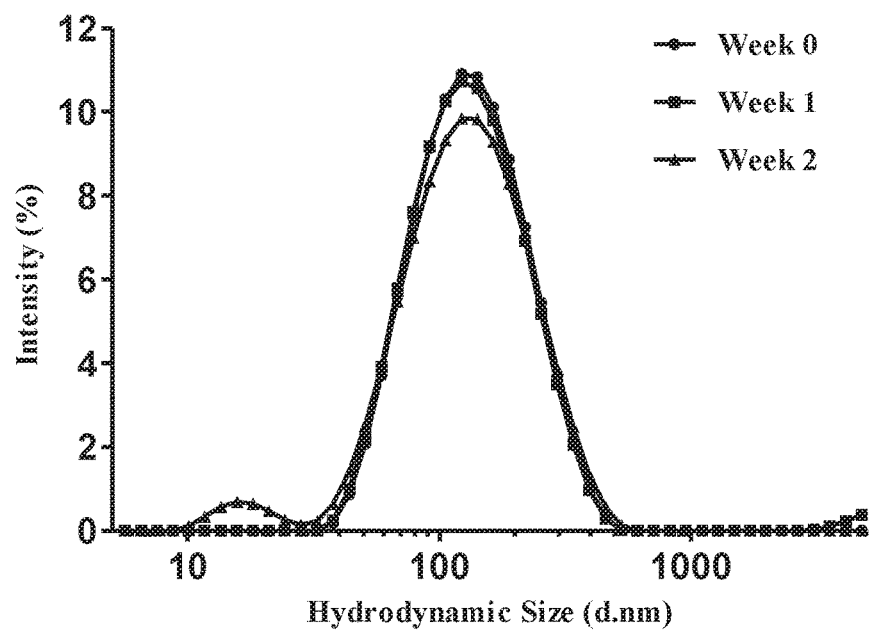
FIG. 4A. Stability and drug loading/release characteristics of NKsomes. Stability of NKsomes in PBS (pH=7) at 4° C.
Figure 4B:
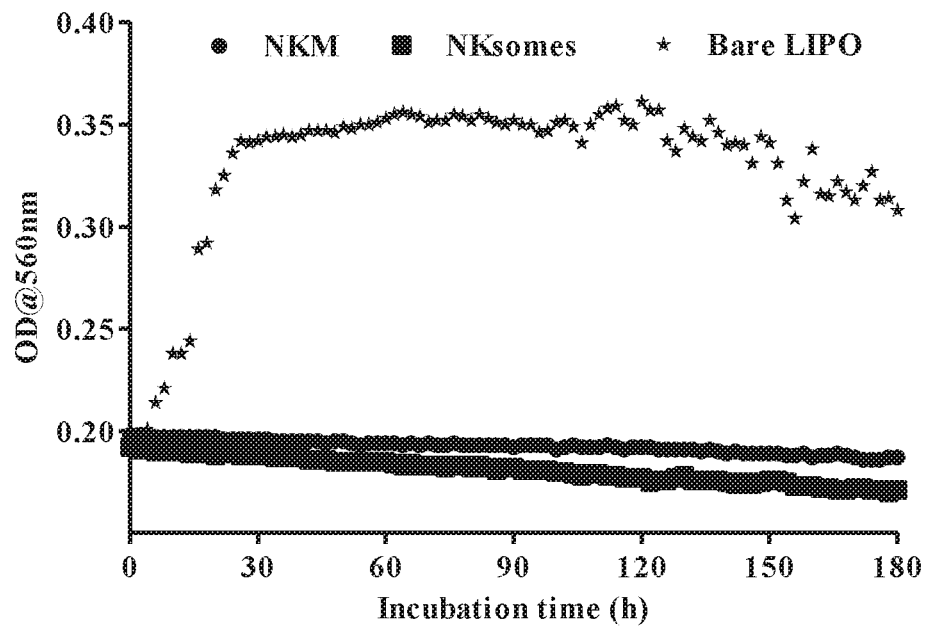
FIG. 4B. Serum stability of Bare liposomes, isolated NKM, and NKsomes in 90% FBS analyzed spectrophotometrically at 560 nm.
Figure 4C:
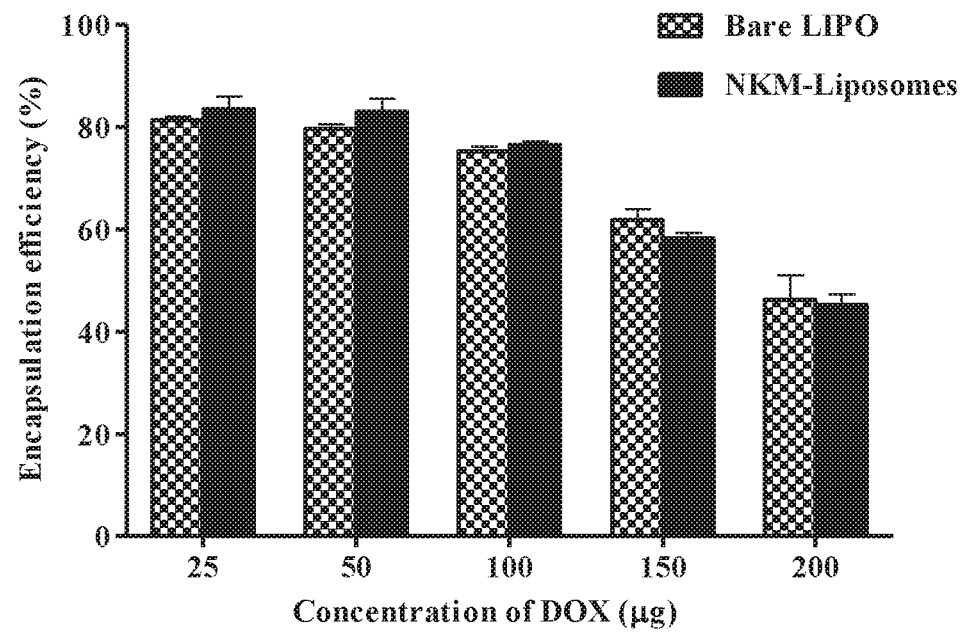
FIG. 4C. Comparative DOX loading efficiency of NKsomes and bare liposomes with various initial input concentrations of DOX (25-200 µg). Data represent mean±SD (n=3).
Figure 4D:
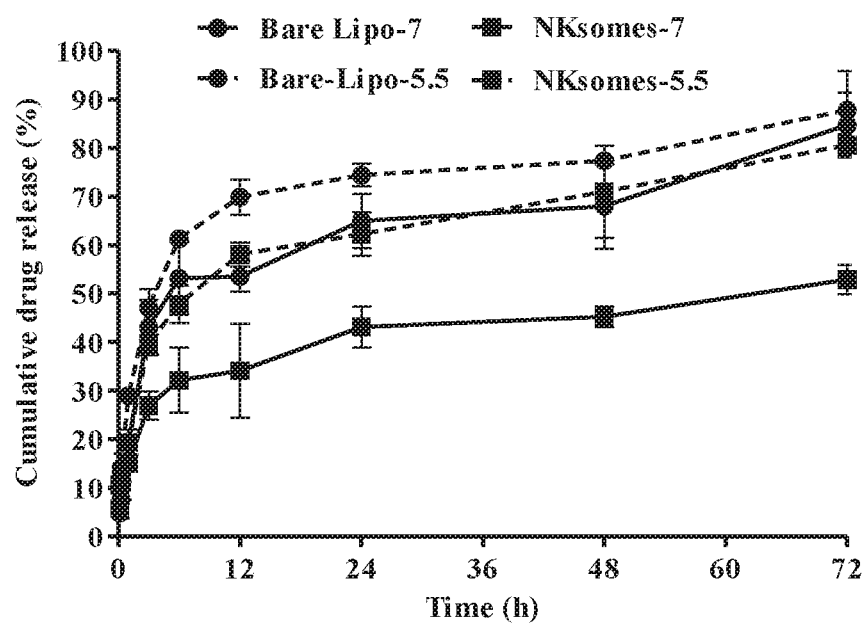
FIG. 4D. Comparative drug release characteristics of NKsomes and Bare Liposomes in PBS (pH=7) and acetate buffer (pH 5.5) after 72 h incubation.

The colloidal stability of NKsome was investigated at the physiological conditions. FIG. 4A shows the stability of NKsome-B at 4° C. The result showed the sustained hydrodynamic size of NKsomes even after two weeks. Further, its serum stability was also investigated using 90% FBS. FIG. 4B shows the serum stability of NKsomes at 37° C. for 3 h conducted following published protocols. Serum stability measures the increase in optical density (OD) of serum at 560 nm due to the rapid aggregation of particles when bound to serum proteins, which also indicate the possible protein corona formation onto the surface of the particle. The result showed that there was no significant change in the OD at 560 nm when NKsome was treated with serum, whereas the bare cationic liposome showed a higher level of aggregation as revealed by increased OD at 560 nm. Similarly, the stability of purified NKM showed no signs of aggregation under serum condition. The stability of NKsomes-A and C showed a drastic change in its hydrodynamic size due to its NKM load. Therefore, NKsomes-B formulation was optimized and used for further characteristic studies. The drug loading and release kinetics of NKsomes were compared with the bare liposome using the chemotherapeutic drug, DOX. FIG. 4C shows the comparative encapsulation efficiency of NKsome and bare liposome at different drug input concentrations (25-200 µg/mL). No significant change in the DOX loading efficiency was observed between bare liposomes and NKsomes at the tested concentration (25-200 µg/mL). The maximum DOX encapsulation efficiency of the NKsome was found to be 80±5%. DOX-loaded NKsome (DOX@NKsomes) are highly stable in physiological conditions up to two weeks. The DOX release profile from the NKsomes and bare liposome were also investigated in PBS buffer (pH 7) and acetate buffer (pH 5.5) at 37° C. (FIG. 4D). NKsome showed nearly 50% drug release even after 72 h, whereas bare liposome showed burst release of 80% at physiological pH 7. Under acidic condition (pH 5.5), NKsome showed nearly 75% drug release whereas bare liposomes show 88% drug release in 72 h. These results confirm the sustained drug release property of Nksomes under physiological pH and its differential release under acidic environment depicting its rapid release in the acidic tumor microenvironment.

2.5. In Vitro Targeting Efficacy of NKsomes

Figure 5A:
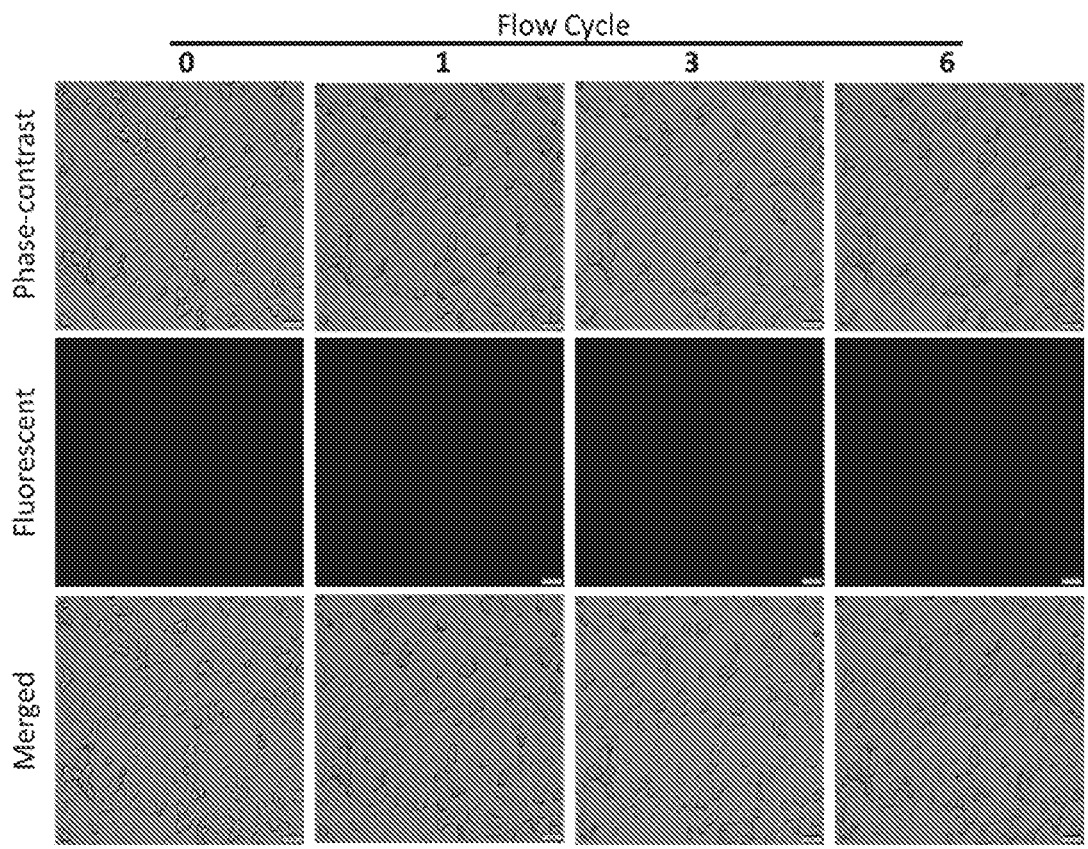
FIG. 5A. Targeting efficiency of NKsomes under flow condition to MCF-7 cells and NHost cells. Flow passage analysis of RhB-labeled NKsomes under flow with MCF-7 cells and its time-dependent fluorescent accumulation.
Figure 5B:
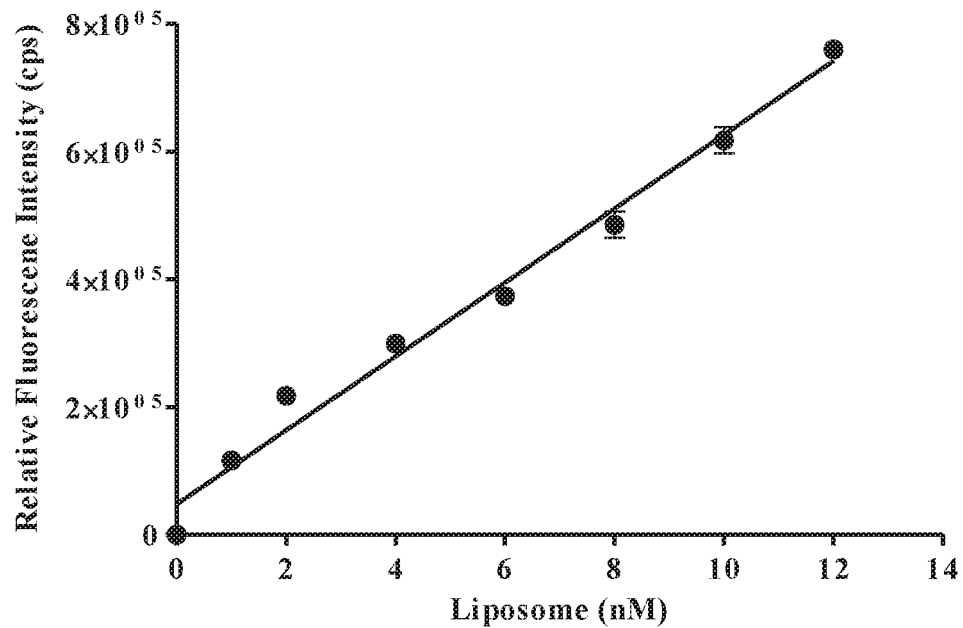
FIG. 5B. Concentration-dependent fluorescence of RhodamineB-labeled NKsomes in aqueous condition.
Figure 5C:
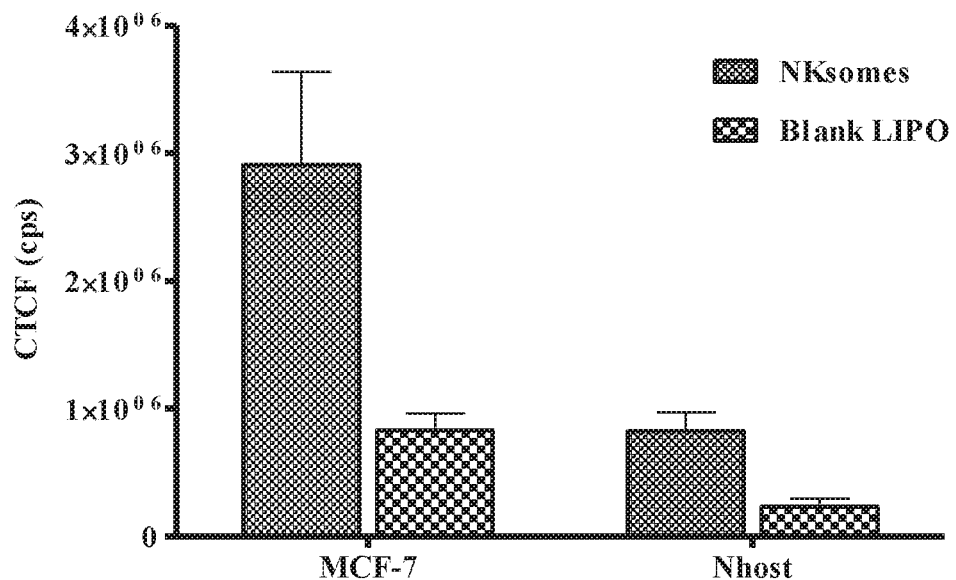
FIG. 5C. Differential cellular fusion of NKsomes and Bare liposomes with MCF-7 and NHost cells under flow condition.
Figure 5D:
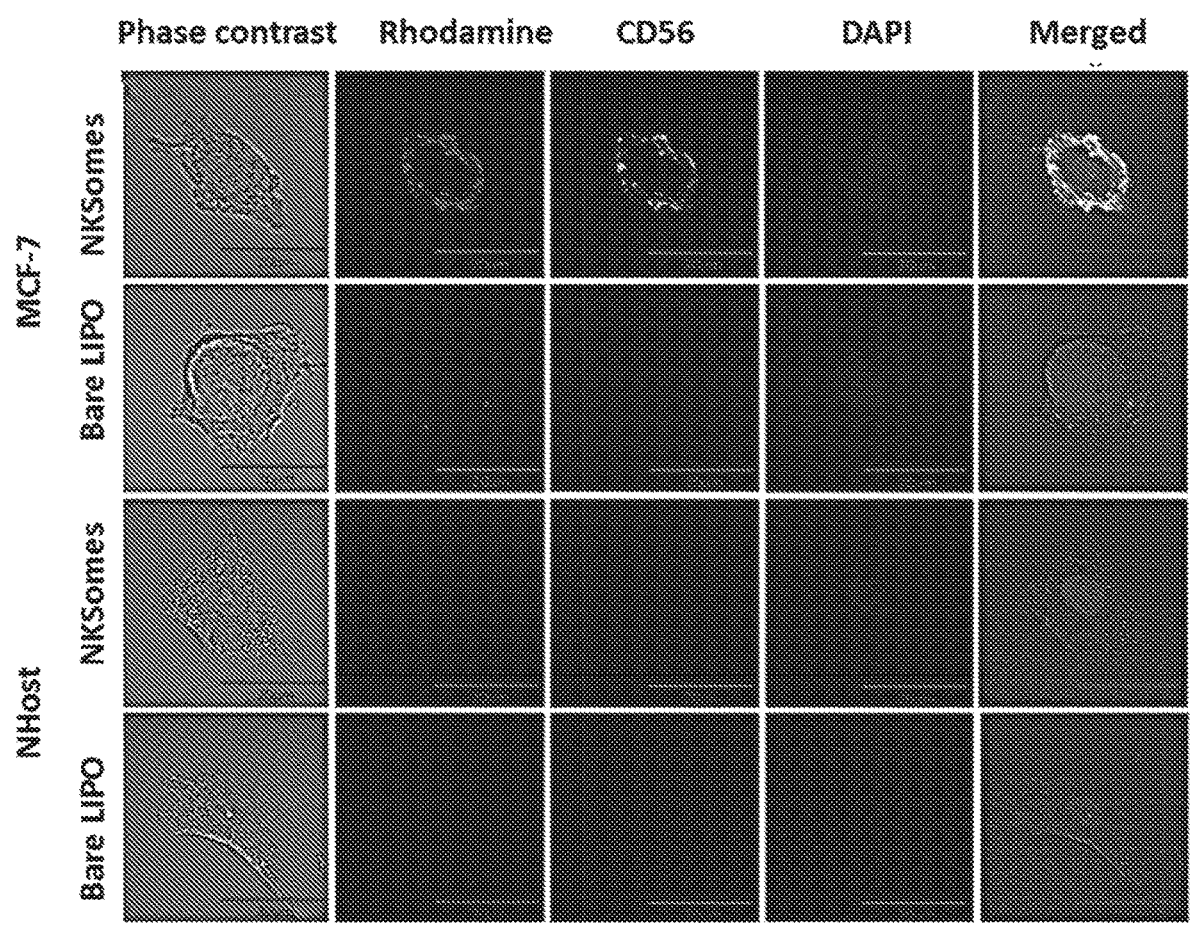
FIG. 5D. Confocal microscopic images of comparative cellular fusion of NKsomes and Bare liposomes in MCF-7 and NHost, after 2 h flow condition, immunostained for NK-cell membrane protein marker (CD56).
Figure 5E:
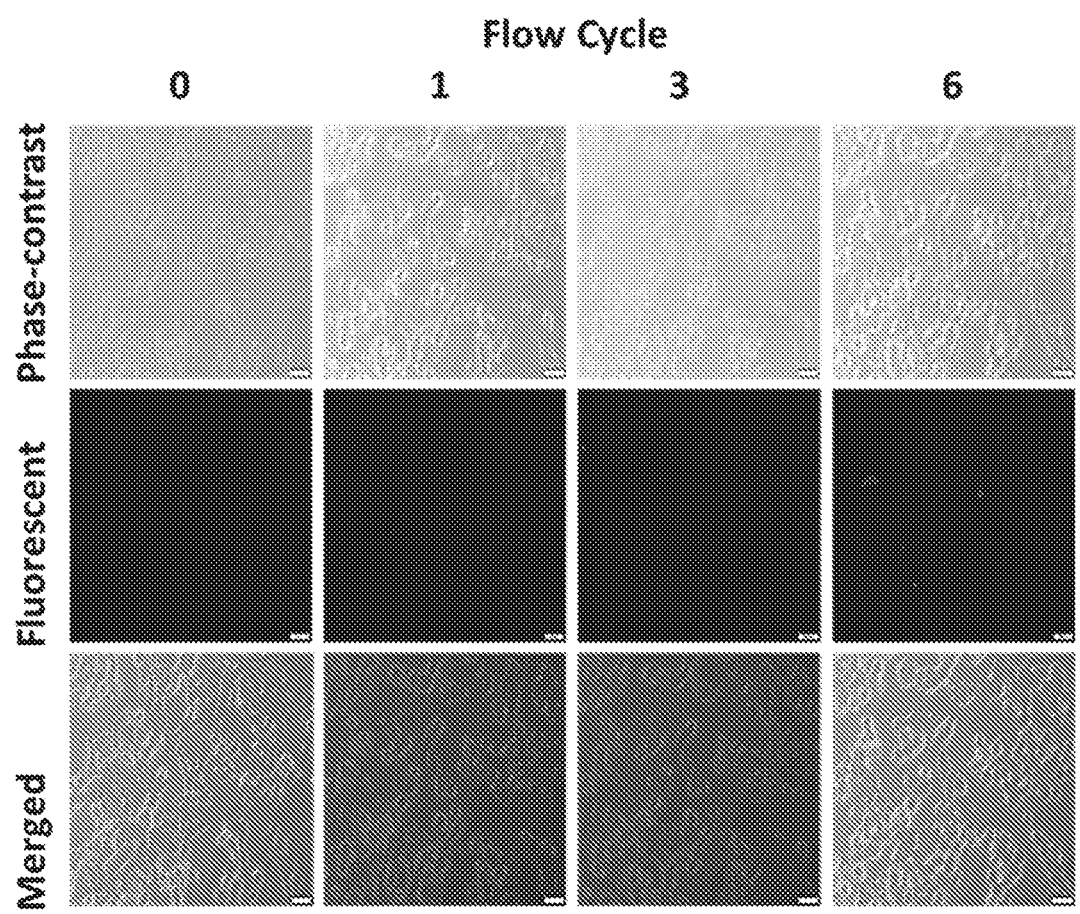
FIG. 5E. Flow passage analysis of Rh-labelled bare liposomes under flow condition with MCF-7 cells.
Figure 5F:
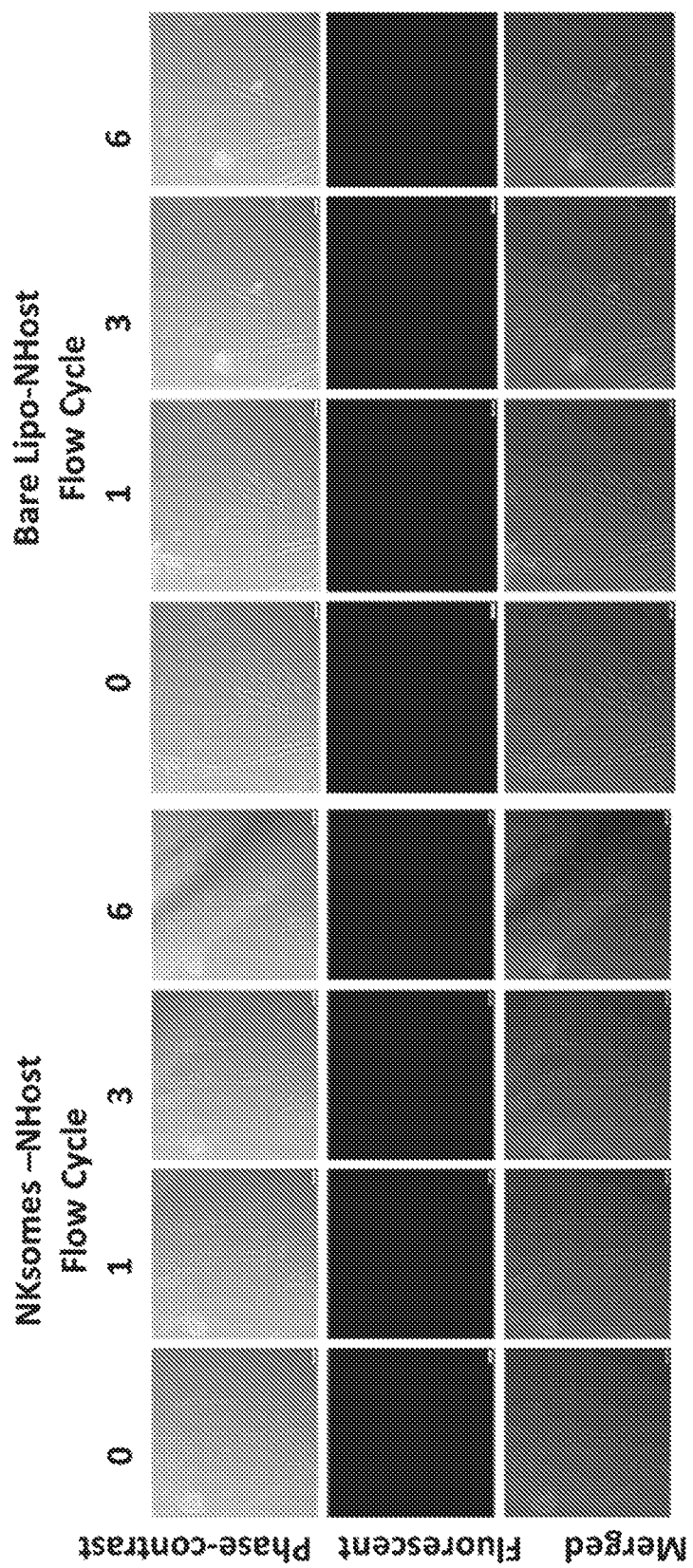
FIG. 5F. Flow passage analysis of Rh-labelled NKsomes and bare liposomes under flow condition with NHost cells.

Since NK cells are well known for its tumor targeting properties, the in vitro targeting efficacy of NKsomes were investigated using flow passage assay. In this method, tumor cells and normal cells in in vitro conditions were subjected to RhB-NKsome under flow condition at 37° C. for 2 h. The differential targeting efficacy of the NKsome with the human normal osteoblast cells (NHost) and the human breast cancer cell (MCF-7) was observed under continuous flow condition. FIG. 5A demonstrates the accumulation of RhB-NKsome in MCF-7 cells over various cycles of flow, under tested conditions. Each cycle of flow takes 20 min interval, and the accumulation of red signal in the monolayer of the cells indicates the targeting efficacy of NKsome against MCF-7. The prepared RhB-Nksomes shows concentration-dependent fluorescence in aqueous condition (FIG. 5B). In the case of NHost, no significant amount of NKsome was accumulated, indicating the differential targeting efficiency of NKsome over normal and a tumor cell. FIG. 5C shows the quantitative analysis of NKsome accumulation in MCF-7 and NHost determined by measuring the Rhodamine fluorescence using ImageJ software (NIH, USA). It was clear evidence that the accumulation of NKsome was found to be more in MCF-7 than that of NHost. With the control bare liposome, no significant difference was observed between MCF-7 and NHost (FIG. 5E and FIG. 5F). This selectivity of NKsome is attributed due to the presence of NK cells protein markers, which can recognize and binds to the receptors present in MCF-7. Further, the cells were subjected to immunofluorescence staining with anti-CD56/FITC at the end of the flow passage assay and imaged under a confocal microscope. As expected, NKsome was accumulated more in the MCF-7 as proven by the FITC signals of CD56 (FIG. 5D). In the case of the bare liposome, no significant accumulation was observed between MCF-7 and NHost under flow condition. These results confirmed the in vitro breast cancer cell targeting efficacy of NKsome.

2.6. In Vitro Immunogenicity and Therapeutic Effects of NKsomes.

Figure 6:
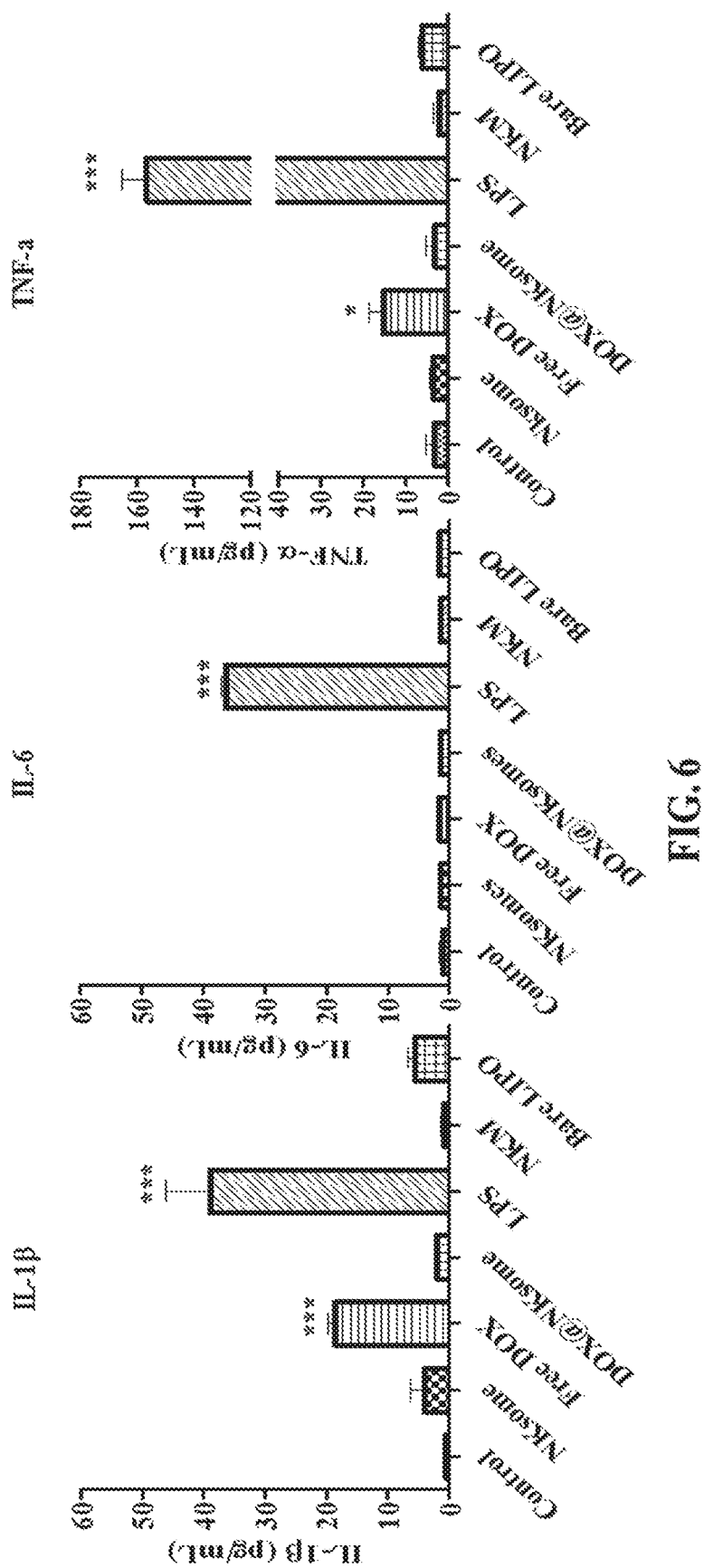
FIG. 6 In vitro immunogenicity assessment of NKsomes in THP-1 cells after 24 h incubation. The immunostimulant effect of engineered NKsomes was monitored by quantitative determination of pro-inflammatory cytokines (IL-10, IL-6, and TNF-α) in THP-1 cells. Lipopolysaccharides (3 µg/mL) were used as a positive control. Data represent Mean f Standard Deviation (n=3). ***P<0.001, *P<0.5 by compared to control cells.

The immunogenicity of the NKsomes was further investigated in human peripheral blood monocyte cells, THP-1 using human pro-inflammatory cytokines ELISA Kit (IL-10, IL-6, and TNF-α). Pro-inflammatory cytokines are vital biomarkers of immunogenicity, often screened to calculate the immunomodulatory effects of nanoformulations. FIG. 6 shows the immunogenicity assessment of NKsomes treated with THP-1 cells after 24 h incubation. The results showed that no significant immunogenicity of NKsomes was observed in THP-1 cells after 24 h incubation. In comparison with DOX@NKsomes, Bare liposomes, and NKM, only free DOX shows the little elevation of IL-10 and TNF-α levels in THP-1 cells, this is presumably due to the immunoregulatory potential of chemotherapeutic drug DOX (FIG. 6).

Figure 7A:
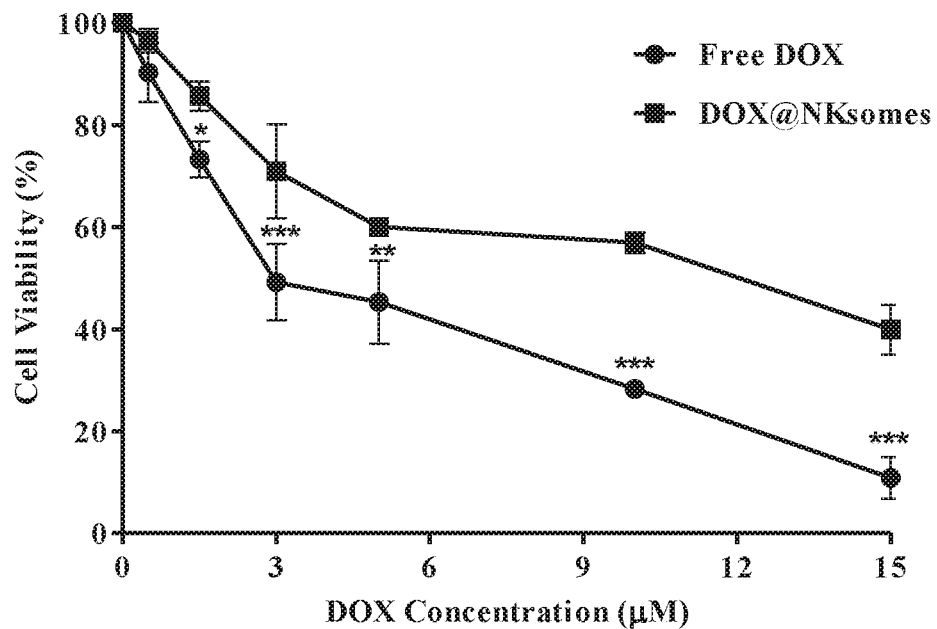
FIG. 7A. In vitro therapeutic efficacy/cytotoxicity of different concentration of DOX@NKsomes (0.5-15 µM) in MCF-7 after 24 hr incubation.
Figure 7B:
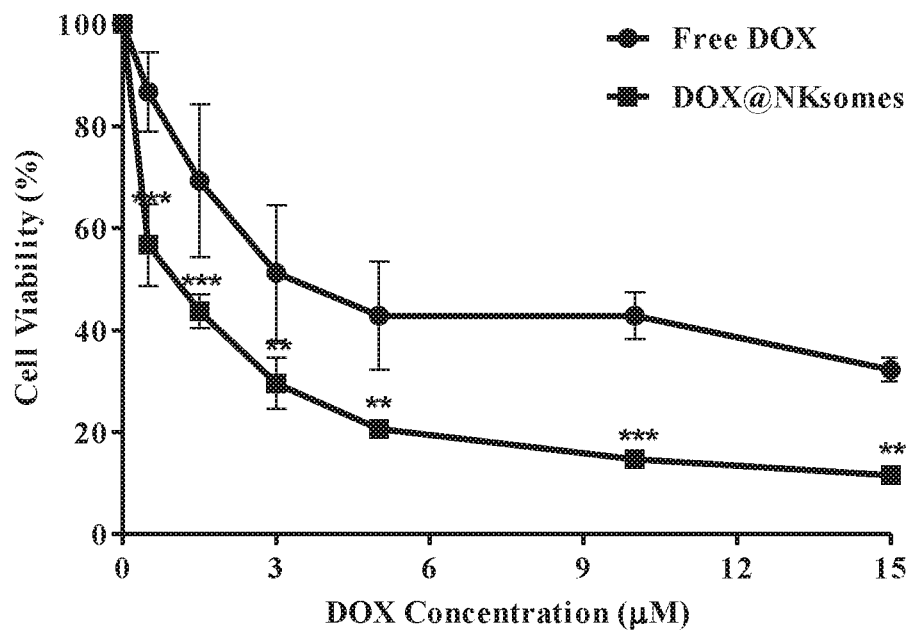
FIG. 7B. In vitro therapeutic efficacy/cytotoxicity of different concentration of DOX@NKsomes (0.5-15 µM) in NHost after 24 h incubation.
Figure 7C:
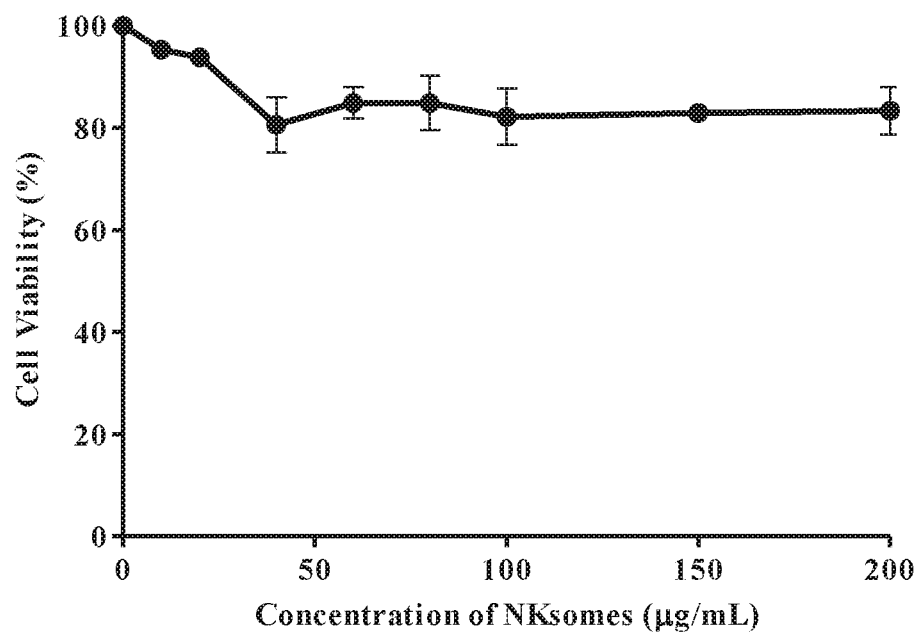
FIG. 7C. Biocompatibility of NKsomes in MCF-7 cell after 24 h incubation.
Figure 7D:
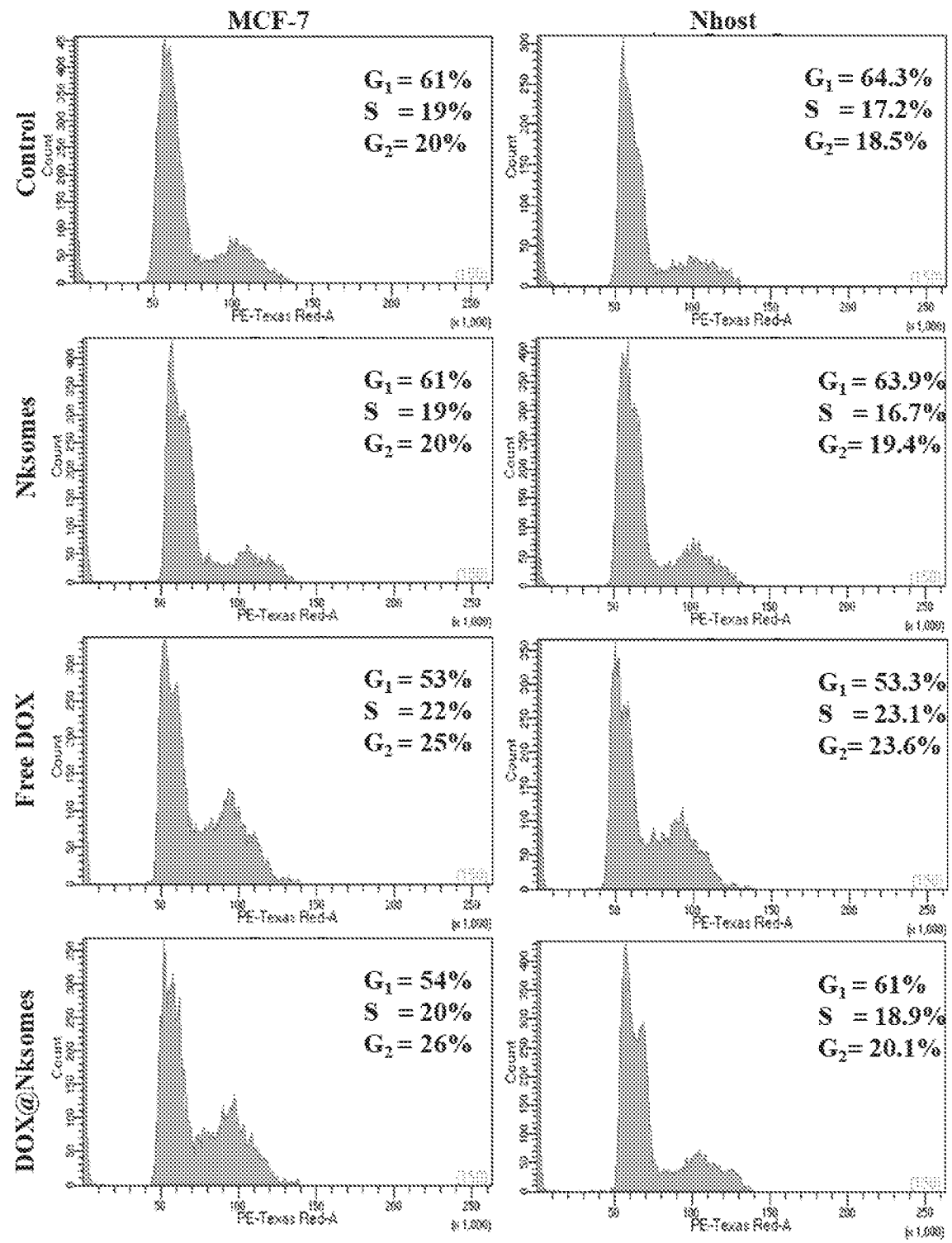
FIG. 7D. Cell cycle histogram of Free DOX and DOX@NKsomes (DOX concentration=5 µM) treated cells showing different cell cycle phase distribution.
Figure 7E:
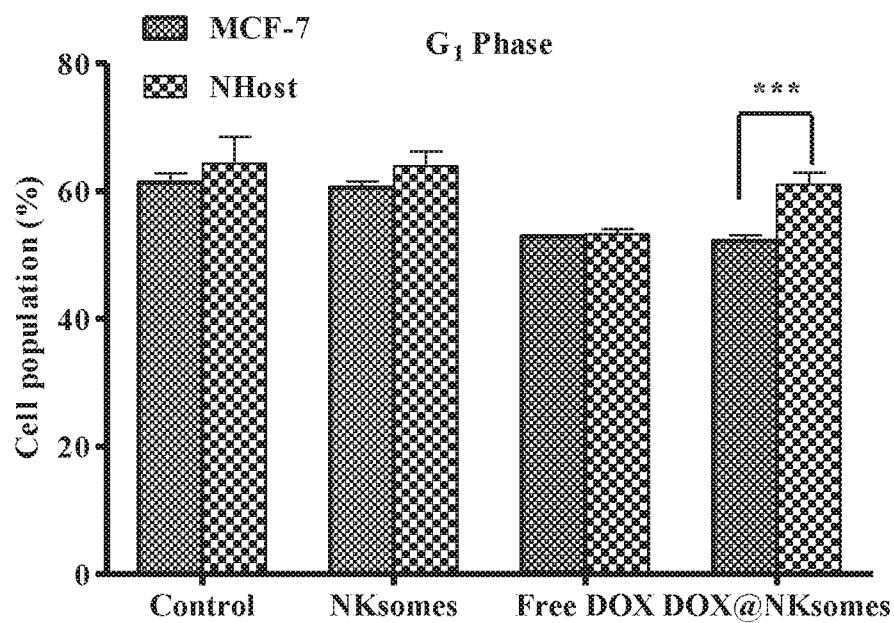
FIG. 7E. Percentage of G1 cell cycle phase distribution of MCF-7 and NHost cells treated with Free DOX and DOX@NKsomes after 12 h incubation. *P<0.001, P<0.01 compared to control cells.
Figure 7F:
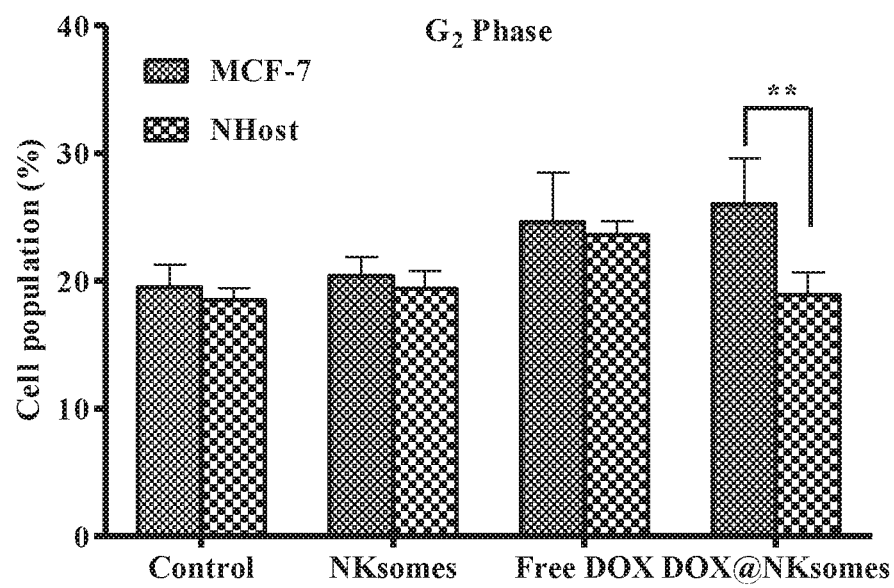
FIG. 7F. Percentage of G2 cell cycle phase distribution of MCF-7 and NHost cells treated with Free DOX and DOX@NKsomes after 12 h incubation. *P<0.001, P<0.01 compared to control cells.

The in vitro therapeutic efficacy of DOX@NKsome was compared with the equivalent amount of free DOX in MCF-7 and NHost using MTT assay and cell cycle analysis. FIGS. 7A and 7B shows the in vitro cytotoxicity with varying the concentration of DOX in NKsome and free DOX after 24 h incubation. From the results, the significant difference in cell viability was observed between free DOX and DOX@NKsomes against MCF-7 and NHost. Dose-dependent cytotoxicity was observed in both cases, whereas superior toxicity of free DOX was predominant in NHost. This is possibly due to the higher tumor targeting affinity of NKsomes with MCF-7 than that of NHost. Control cell treated with bare NKsomes shows higher biocompatibility even at the higher concentration (FIG. 7C). Further, the therapeutic response of DOX@NKsome in MCF-7 and NHost were investigated using cell cycle analysis. It has been well known that DOX cause cell cycle arrest in G0/G1 phase and induce apoptosis in cancer cells. FIG. 7D represents the cell cycle histograms of MCF-7 and NHost cells treated with Free DOX and DOX@NKsomes (Dox concentration=5 µM) for 12 h. As expected, Free DOX and DOX@NKsomes showed increased accumulation of cells in G2 phase with a decrease in G1 phase. In MCF-7, free DOX and DOX@NKsomes treated cells shows a decrease in the G1 fraction (53% and 54%, respectively) as compared to that of untreated and bare NKsome (61% and 61%, respectively) (FIG. 6 D). Also increased accumulation in G2 fraction (25 and 26%) was observed as compared to that of untreated and bare NKsome (20% and 20%) (FIG. 6 E). In NHost, free DOX and DOX@NKsomes treated cells shows a G1 fraction of 53.3% and 61%, whereas untreated and bare NKsome treated cells shows 64.3% and 63.9% (FIG. 6D). Further, increased accumulation in G2 fraction (23.6 and 20.1%) were observed, as compared to that of untreated and bare NKsomes treated cells (18.5% and 19.4%) (FIGS. 7E and 7F). Overall, no significant changes were observed between MCF-7 and NHost when treated with Free DOX for 12 h. In DOX@NKsomes, significant difference was observed in G1 and G2 phase of MCF-7 and NHost cells after 12 h incubation.

2.7. Circulation Half-Life and Bio-Distribution of NKsomes.

Figure 8A:
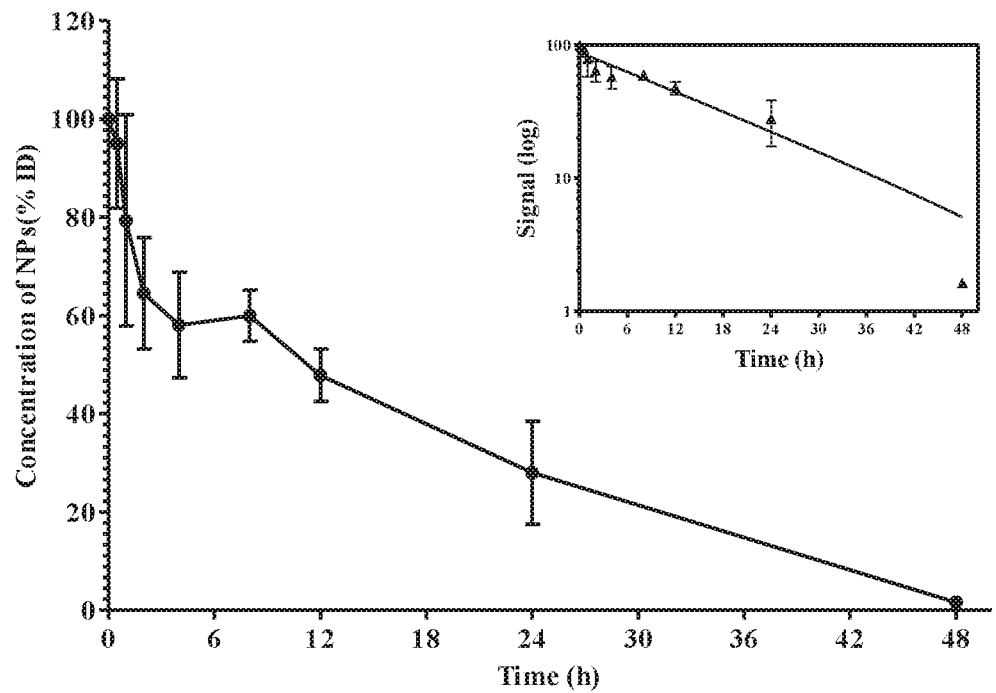
FIG. 8A. Blood retention of DiR-loaded NKsomes in MCF-7 bearing tumor mice after single intravenous injection to evaluate the circulation half-life of NKsomes through the two-compartment model. Insert shows the non-linear elimination model of NKsomes.
Figure 8B:
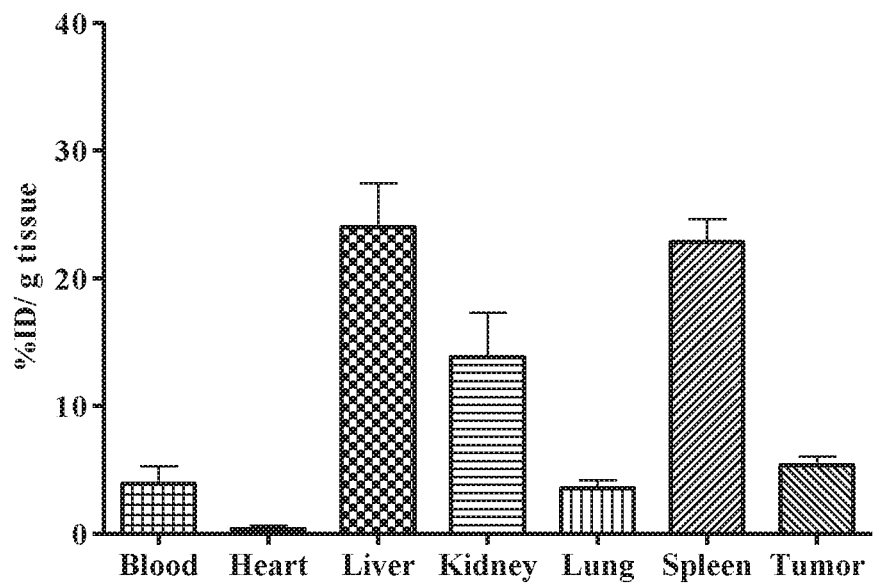
FIG. 8B. Bio-distribution of NKsomes in MCF-7 bearing tumor mice after 24 h. DiR-labelled NKsomes were injected intravenously through tail vein and after 24 h major organs and tumors were collected, homogenized, and quantified by measuring the DiR signals using NIR spectrophotometer. Data represent mean±SD, n=3.
Figure 8C:
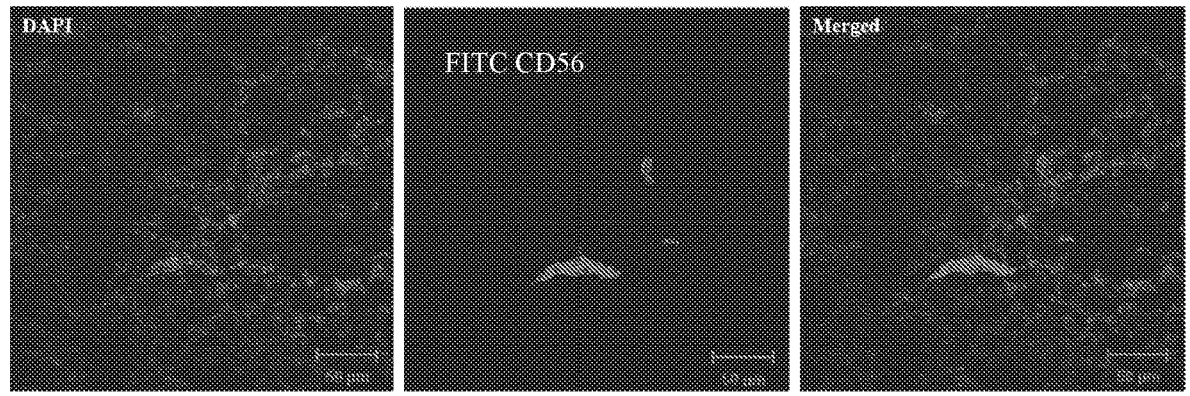
FIG. 8C. Representative immunofluorescence image of tumor tissues showing the bioaccumulation of NKsomes, as illustrated by the FITC fluorescence signals of NK-cell marker, CD-56. Nuclei were further stained with DAPI. Scale bar=50 µm.

To determine the circulation half-life and biodistribution, NKsome was incorporated with DiR (1,1'-dioctadecyl-3,3,3',3'-tetramethylindotricarbocyanine iodide) dye as a part of the liposomal building block and investigated in NU/NU mice. The formulated DiR-NKsomes were found to be more stable in physiological conditions. FIG. 8A shows the circulation half-life profile of NKsome. The concentration of NKsome in the blood was expressed as a percentage of injected dose (% ID). Higher levels of NKsome was observed in the bloodstream over 8 h post-injection (~60%), which described the distribution phase of the NKsomes. After 8 h, it reduced further with time and showed a clear trend of elimination phase. By two-compartmental pharmacokinetic model, the half-life of the NKsomes was found to be 18 h in NU/NU mice. FIG. 8A, the inset shows the semi-log plot of NKsomes pharmacokinetics which can be used to derive the circulation half-life of NKsomes from the slope of semi-log signals using one-way nonlinear elimination model. By nonlinear elimination model, the circulation half-life of the NKsomes was found to be 8 h. Irrespective of the pharmacokinetic models, the circulation half-life of the NKsome had longer circulation half-life and reduced in vivo clearance, compared to the bare liposome. It is evident that the biological membrane coatings of the nanoparticle have longer circulation half-life than the normal nanoparticles. Further, the biodistribution and tumor homing efficiency of NKsome was investigated in MCF-7 induced solid tumor in NU/NU mice. After 24 h of intravenous injection of DiR-labeled NKsome, major organs were collected and quantified (FIG. 8B). The result showed that the NKsome was distributed mainly to tumors and reticuloendothelial system organs. It is evident from the previous in vivo reports that cationic liposome of DOTAP/DOPE/DOX formulation fabricated with aptamer tends to accumulate more in liver, spleen, and kidney. About 5% of the total injected dose reached the tumor tissues, showing the tumor homing efficacy of NKsomes in NU/NU mice. It is attributed that the NK-92 cell tends to accumulate more in the tumor microenvironment, which largely depends on the overexpression of NK cell receptor ligands like NKG2-D ligands in tumor cells. Recent studies on Macrophage membrane coated liposome also shows superior targeting of metastatic lung cancer model as like of macrophage. Further, the tumor tissues were investigated through immunofluorescence for the qualitative presence of NK-92 cell membrane (NKM) by staining with FITC conjugated anti-CD-56. FIG. 8C shows the presence of NKM in MCF-7 induced solid tumor in NU/NU mice. Green fluorescence signals of FITC showed the accumulation of NKM in tumor tissues confirming the in vivo tumor homing potential of NKsome in NU/NU mice.

2.8. In Vivo Tumor Homing and Therapeutic Efficacy

Figure 9A:
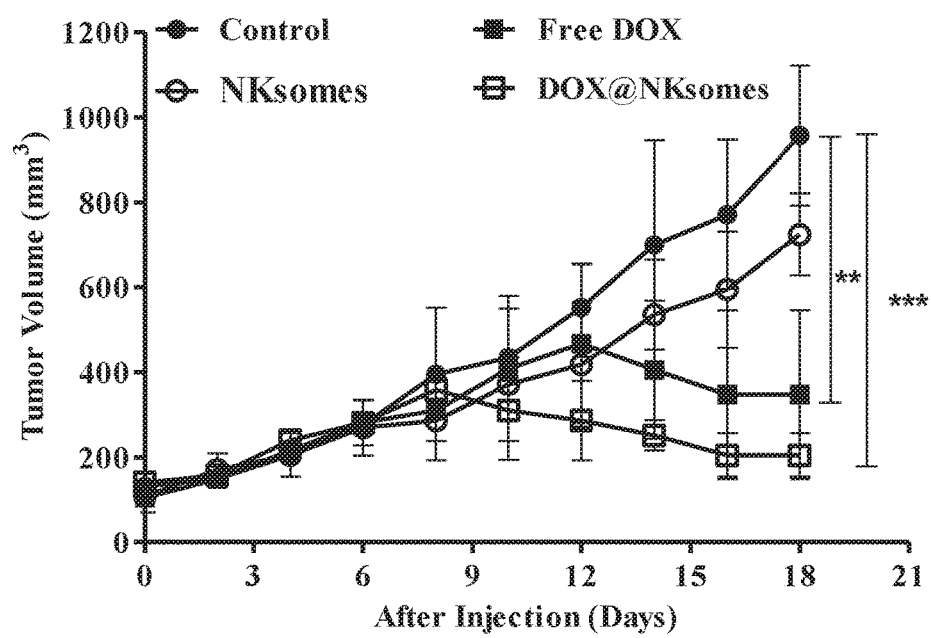
FIG. 9A. In vivo anti-tumor effect of DOX-loaded NKsomes (DOX@NKsomes) against MCF-7 derived solid tumor model in NU/NU mice. Change in tumor volume of mice treated with free DOX (5 mg/kg), DOX-loaded NKsomes (equivalent DOX concentration, 5 mg/kg) along with bare NKsomes (10 mg/kg) and untreated controls. DOX@NKsomes inhibits tumor growth in MCF-7 tumor-bearing immunodeficient NU/NU nude mice.
Figure 9B:
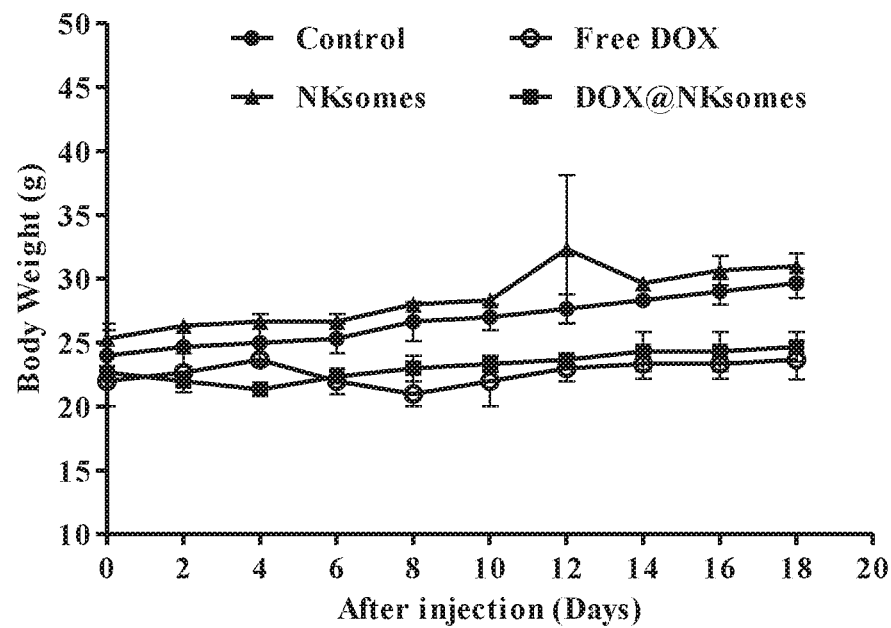
FIG. 9B. Body weight changes of tumor bearing mice treated with free DOX (5 mg/kg), DOX-loaded NKsomes (equivalent DOX concentration, 5 mg/kg) along with bare NKsomes (10 mg/kg) and untreated controls.

With the assurance of longer blood circulation half-life and efficient tumor targeting ability of NKsome, we move forward to conduct a pilot therapeutic study. The in vivo therapeutic efficacy of DOX@NKsomes was investigated against human breast cancer MCF-7 induced solid tumor in NU/NU mice. FIG. 9 shows the antitumor efficacy of DOX@NKsomes against solid tumor model in comparison with Free DOX and bare NKsome. The body weight of the tumor-bearing animals of all groups was not significantly changed during the treatment period (FIG. 9B). Control groups were also maintained without any treatment. However, tumor volume of free DOX and DOX@NKsomes, have been changed significantly in comparison with the bare NKsome and untreated control animals. Animals treated with both Free DOX and DOX@NKsomes shows a significant reduction in tumor volume at the end of treatment period, whereas bare NKsomes shows tumor proliferation (FIG. 9A). The tumor inhibition rate (IR %) of the bare NKsome, Free DOX, and DOX@NKsome treated groups were found to be 24.29, 63.69 and 78.5%, respectively (Table 2)

TABLE 2

Calculated tumor inhibition rate among different treatment groups.

| Treatment groups | Inhibition Rate (%)[#] |
|---|---|
| Bare NKsomes | 24.29 |
| Free DOX | 63.69 |
| DOX@NKsomes | 78.50 |

[#]IR % = (Control tumor weight-Treatment tumor weight)/Control tumor weight * 100

Figure 9C:
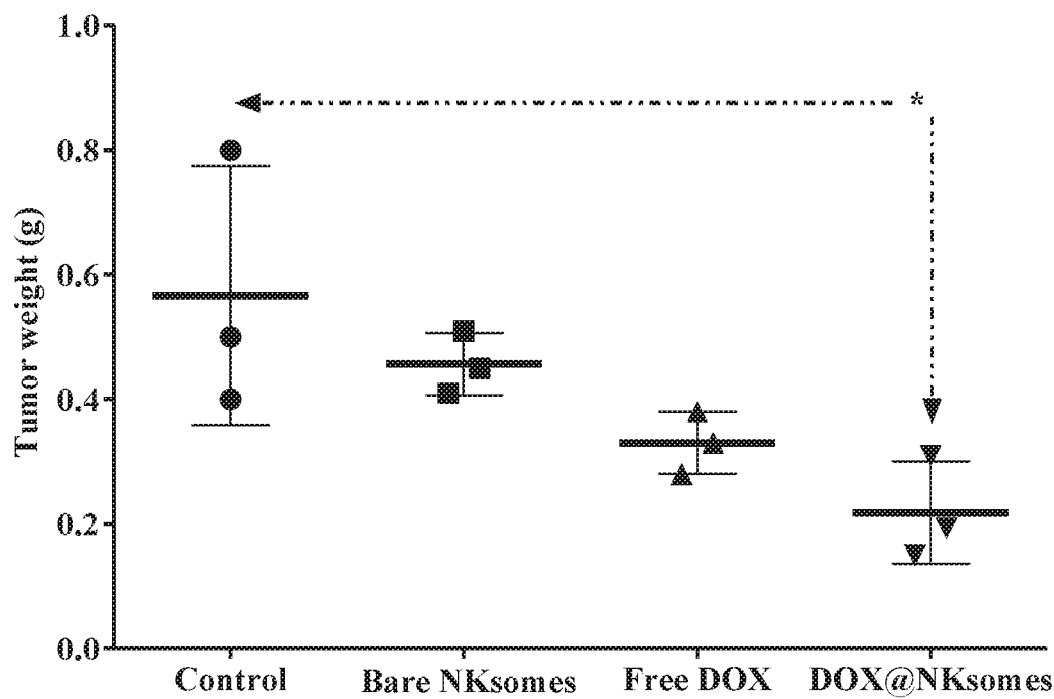
FIG. 9C. Quantified tumor weight of different treatment groups (Untreated control, Bare NKsomes, Free DOX and DOX@NKsomes) at the end of the therapeutic study. Data represent mean±SD (*P<0.05, P<0.01, *P<0.001 compared to untreated control, n=3).
Figure 9D:
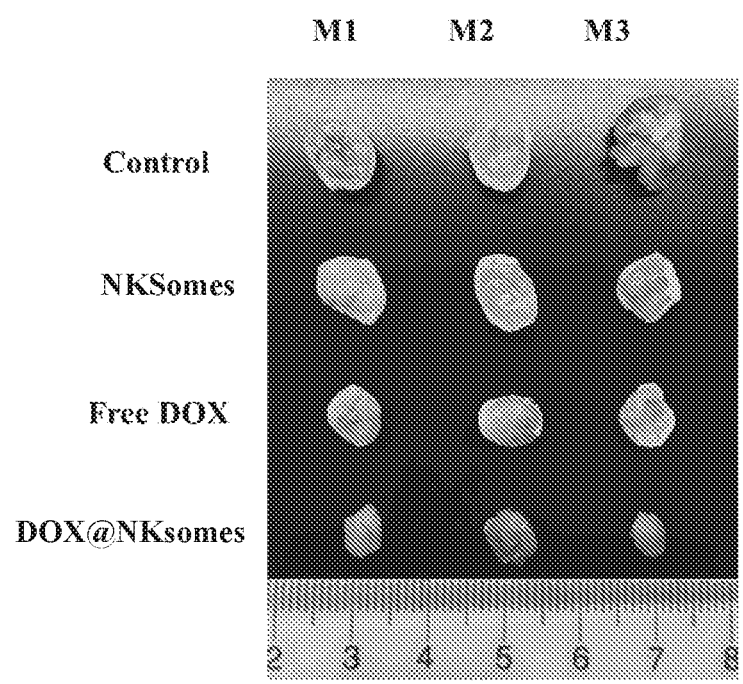
FIG. 9D. Tumor image of control, NKsomes, Free DOX and DOX@NKsomes treated animals at the end of the therapeutic study.
Figure 9E:
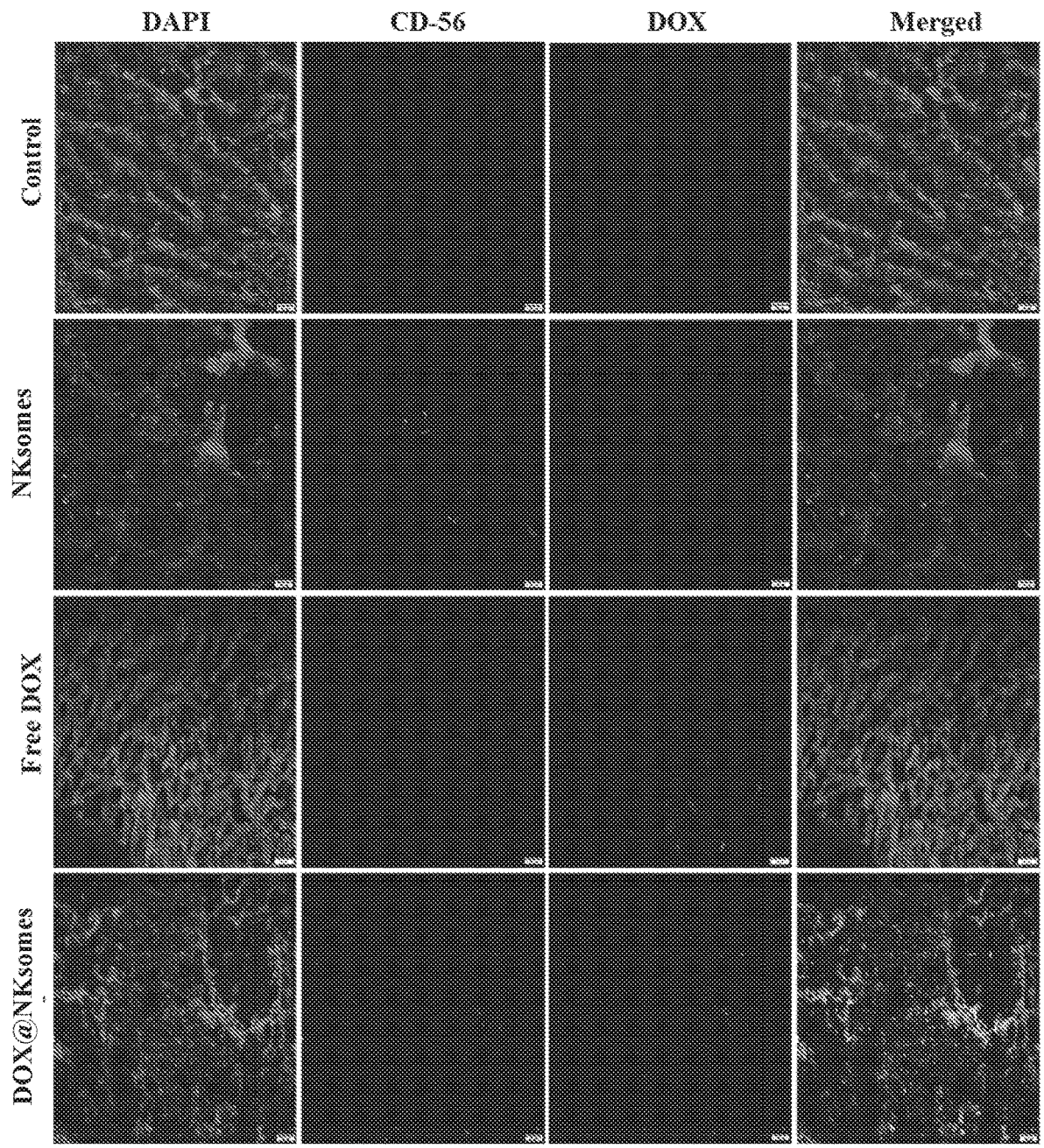
FIG. 9E. Representative tumor tissue sections of untreated, NKsomes, Free DOX, and DOX@NKsomes treated mice subjected to confocal analysis for the distribution of DOX and NKsomes. Tissues were immunostained with FITC-anti-CD-56 for CD-56, and the nucleus was stained using 4', 6-Diamidino-2-phenylindole, dihydrochloride (DAPI). Scale bar=50 µm.
Figure 9F:
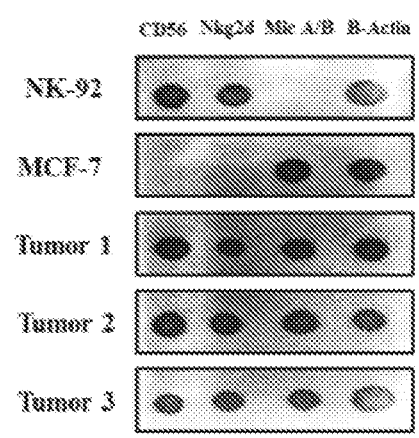
FIG. 9F. Representative dot-blot analysis of tumor tissue of DOX@NKsome treated animals for the qualitative determination of its characteristics proteins (CD 56, NKG2D, and MIC-A/B).

Compared to free DOX, DOX@NKsomes exhibits enhanced antitumor activity, augmenting its tumor targeting potential for cancer therapy (FIGS. 8C and D). The average tumor weight for the untreated control was found to be 0.6±0.19 g, whereas bare NKsome, Free DOX, and DOX@NKsomes treated animals were found to be 0.5±0.05, 0.3±0.04, and 0.2±0.07 g, respectively (FIG. 9C). Compared to control and bare NKsomes, tumor weight of free DOX and DOX@NKsomes showed reduced tumor mass. Further, the tumor tissues were sectioned, immunostained for the qualitative detection of NKsomes and DOX using confocal microscopy. FIG. 9E shows the representative immunofluorescence image of DOX@NKsomes treated tumor tissue sections, illustrating the distribution of NKsome (FITC-anti-CD 56) and DOX (red fluorescence). This further assured the tumor homing ability of NKsome for potential anti-cancer therapy. FIG. 9F shows the Representative dot-blot analysis of tumor tissue of DOX@NKsome treated animals for the qualitative determination of its characteristics proteins (CD 56, NKG2D, and MIC-A/B).

3. Conclusion

In summary, we fabricated fusogenic NKsome made up of activated natural killer membrane fused with the cationic liposome capable of targeting tumor cells more efficiently in vitro and in vivo conditions. The tumor targeting efficacy of NKsome was solely depended upon the membrane characteristics of NK-92 cell membrane receptors. The fabricated NKsome was found to be non-immunogenic, more stable under physiological conditions, and capable of loading chemotherapeutic drug, DOX, for targeted cancer therapy. Also, NKsome exhibit prolongs circulation half-life and tumor homing potential as demonstrated by biodistribution and pharmacokinetic studies. Further, the DOX@NKsomes showed excellent anti-tumor potential against human breast cancer cells, MCF-7 in vitro and in vivo. Overall, this study demonstrated the tumor homing potential of NKsome for targeted tumor therapy by exploiting the properties of the natural killer cell membrane, which could open a new door for design consideration in biomimetic nanomedicine.

Example 2

Biomimetic Natural Killer Membrane Camouflaged Polymeric Nanoparticle for Targeted Bioimaging In the present study, we designed a tumor targeting biomimetic nanoconstruct (BNc) made up of the NKM camouflaged onto the surface of carboxylate terminated polylactic-co-glycolic acid (PLGA) NP. To this BNc, phospholipid-conjugated GBCA and NIR dye was incorporated and studied their feasibilities under MRI and further supported by NIR fluorescent imaging. The NKM was isolated from the NK-92 cells and hybridized with imaging components and PLGA NP using membrane extrusion technique. This technique gives us the opportunity to tune magnetic relaxivity by varying the gadolinium-lipid concentration onto the BNc. Considering the acquired properties of NK cell, we hypothesized that the engineered BNc would have an ability to function as NK cell, which could help in maximizing the delivery of payloads, herein contrast agents, into the tumor by co-working with blood pool agents, hence enhancing the diagnostic efficiency in targeted cancer bioimaging.

Materials and Methods

Materials

Poly (D,L-lactide-co-glycolide) carboxylate end group (50:50 dL/g) was purchased from DURECT Corporation (USA). L-α-Phosphatidylethanolamine-N-(lissamine rhodamine B sulfonyl) (Ammonium Salt) and (Egg-Transphosphatidylated, Chicken) (Egg Liss Rhod-PE) were purchased from Avanti Polar Lipid Inc. (USA). Gd (III) acetate was purchased from Alfa Aesar (USA). Primary antibodies for NKG2-D, NKp30 and Pan-cadherin were procured from Santa Cruz Biotechnology. NCAM (CD56) and Secondary HRP-linked anti-mouse IgG antibody were purchased from Cell Signaling. Fluorophore-conjugated antibodies like FITC Mouse anti-Human CD56 and κ Isotype Control were purchased from BD Bioscience. All other reagents and chemicals used were of analytical grade.

Cell Lines and Tumor Models

Human NK cells, NK-92, were procured from ATCC, Manassas, USA. NK-92 cells were grown and regularly passaged in Alpha Minimum Essential Medium (α-MEM) without ribonucleosides and deoxyribonucleosides and supplemented with 1.5 g/L sodium bicarbonate, 2 mM L-glutamine, 0.1 mM 2-mercaptoethanol, 0.02 mM folic acid, 0.2 mM inositol, 200 U/ml recombinant IL-2, 12.5% (v/v) horse serum and 12.5% (v/v) fetal bovine serum. The human breast cancer cells, MCF-7, were procured from ATCC (USA). The cells were grown and maintained in Dulbecco's Modified Eagle's Medium (DMEM) supplemented with 10% (v/v) fetal bovine serum (FBS), penicillin/streptomycin (100 ug/ml) and maintained at 37° C. in 5% $CO_2$ environment.

For tumor studies, six-week-old female immunodeficient NU/NU nude mice were procured from Charles River Laboratories International, Inc. (USA). All animal experiments and protocols were approved by the Institutional Animal Care and Use Committee (IACUC) and Institutional Biosafety Committee (IBC), Kansas State University, Manhattan. For solid tumor models, $1 \times 10^6$ MCF-7 cells in saline were implanted subcutaneously into the hind rear flank region of the mice and the tumor growth were monitored periodically.

Isolation of NK Cell Membrane

Isolation of NKM were performed using sucrose gradient ultracentrifugation method as reported. In brief, nearly ~$2 \times 10^8$ NK cells, NK-92, grown in multiple T-75 culture flask were harvested and washed twice with 1×PBS. Further, the washed cell pellet was suspended in homogenization buffer (10 mM Tris-HCl, 1 mM $MgCl_2$, 1 mM KCL, 2 mM PMSF, 25 mM Sucrose, 200 μg/mL Trypsin-chymotrypsin Inhibitor, 10 μg/mL DNase and 10 μg/mL RNase) and homogenized in ice for 5 min (20 s pulse and 30 s in between pulses). The homogenized suspension was pooled over the discontinuous sucrose gradient (55%, 40% and 30% (w/v) sucrose in 0.85% saline) in polycarbonate tubes and ultra-centrifuged in a Beckman SW 27 rotor at 28,000 g for 30 min at 4° C. The NKM fraction at 30% to 40% interface was collected in a clean tube and analyzed for its protein characterization using the dot-blot technique. For purification, collected membrane fractions were diluted with twice the volume of normal saline and ultra-centrifuged in a Beckman SW 27 rotor at 28,000 g for 1 h at 4° C. The purified membranes were lyophilized, weighed, quantified for its protein content using Bradford Assay and stored at 4° C. for further use.

Preparation of Biomimetic Nanoconstruct

BNc were prepared using a nanoprecipitation method. In brief, 1 mg of PLGA dispersed in acetonitrile was added drop-wise to different concentrations of Gd-lipid (50-400 ug) dispersed in 2 ml of 4% ethanol under magnetic stirring at 60° C. After 15 min, 1 ml of Milli-Q water was added to cool down the suspension and further stirred at room temperature. After 1 h of stirring, the clear nanoparticle suspension (PLGA core) was extruded in the presence of isolated NKM (100 ug dispersed in PBS) using 100 nm pore-size Millipore membrane filter, concentrated in Amicon centrifugal filter (10 kDa), and stored at 4° C. for further use. For DiR/Rhodamine labeling, 10 μg of the dye dispersed in chloroform was dissolved in the PLGA dispersion and followed the same protocol of the preparation of BNc.

Characterization of BNc

The hydrodynamic size and zeta potential of the prepared BNc were characterized using Dynamic light scattering analysis (Malvern, Nano ZSP). The size and the shape of the prepared BNc were confirmed using transmission electron microscope (FEI Technai G2 Spirit BioTWIN). Further, the concentration of $Gd^{3+}$ in BNc were determined using an inductively coupled plasma mass spectrometry (ICP-MS, NEXion 350X, Perkin Elmer). The concentration of proteins in all samples was determined using Bradford Assay following manufacture's recommendation.

Protein Characterization of BNc

For SDS-PAGE (Sodium Dodecyl Sulphate-Polyacrylamide Gel Electrophoresis), all samples were prepared with the overall protein concentration of 50 μg/wells loaded in a 4-20% Mini-PROTEAN® TGX Protein Gels and stained with Coomassie brilliant blue. For western blot, protein samples were transferred to the PVDF membrane and treated with primary antibodies for CD-56 (Cell Signaling), NKG2-D (Santa Cruz), NKp30 (Santa Cruz) and Pan-cadherin (Santa Cruz) along with HRP-conjugated anti-mouse IgG secondary antibody (Cell Signaling). The blotted films were further developed using SignalFire™ ECL Reagent (Cell signaling) and imaged chemiluminescent signals Bio-imager (Kodak).

Stability of BNc

The physiological stability of the prepared BNc at 4° C. in PBS (pH=7) was investigated using dynamic light scattering size analysis. In brief, 50 μg/mL of BNc samples in PBS were incubated at 4° C. for two weeks and investigated their change in size by measuring the samples in DLS every day. The serum stability of the prepared BNc was carried out as reported earlier. In brief, 100 μL of 500 μg/mL of BNc were mixed with 100 μL of 90% FBS at 37° C. and record their change in absorbance with incubation time kinetically by recording at every 3 sec over a period of 3 h using Microplate reader (BioTek, Synergy H1 Hybrid reader).

$Gd^{3+}$ Release Study

The cumulative $Gd^{3+}$ release characteristics of BNc under the physiological condition at 37° C. was determined periodically. In brief, 50 μg/mL of BNc was placed in a 12-14 Kda dialysis membrane bag and dialyzed against 250 mL of PBS (pH=7). At constant agitation (70 rpm), 200 μL of the buffer samples were collected at predetermined time intervals (0-72 h) and replace with an equivalent volume of fresh PBS buffer. The amount of Gd released from the BNc is determined using ICP-MS as reported before.

In Vitro Magnetic Properties of BNc

The MRI relaxivity of Gd-loaded BNc was determined using published protocols. The longitudinal relaxation (LR) time of BNc in the presence and the absence of NKM in an equivalent $Gd^{3+}$ concentration (10 µg/mL) was determined using a RARE (Rapid Acquisition with Relaxation Enhancement) pulse sequence with variable repetition time on a 14.1 T NMR system (Bruker Avance III, 600 MHz NMR-MRI). Concentration-dependent recovery curve of BNc was also investigated using a different concentration of BNc (0.05-0.4 mM). The LR was determined from the $T_1$ relaxation time and the concentration of $Gd^{3+}$. The corresponding $T_1$ weighted magnetic resonance phantom images were also recorded using a turbo spin echo sequence (TR=1500 ms, TE=6.50 ms, and slice thickness=1 mm).

Cellular Uptake and Biocompatibility Studies

The cellular uptake efficiency of BNc in the presence and the absence of the NKM coating were investigated using FACS analysis (BD FACSCalibur™). In brief, $3\times10^6$ MCF-7 cells were grown in a T25-flask and treated with 50 µg/mL of Rhodamine-labelled BNc dispersed in DMEM media. After 6 h of incubation, cells were trypsinized, washed and analyzed in FACS for the quantitative determination of NP uptake by MCF-7 cells. For the confocal study, Rh-labelled BNc were treated in an 8-chambered micro-chamber slide seeded with the cell density of 50,000 cells/well and incubated for 3 h. After incubation, cells were washed, fixed, and immunostained with FITC-anti-CD 56. Nuclei of the cells were stained with DAPI, and the slides were observed directly in a Confocal Laser Scanning Microscope (Carl Zeiss, LSM-700). Further, the biocompatible nature of the BNc was investigated in MCF-7 cells using the [3-(4,5-Dimethylthiazol-2-yl)-2,5-Diphenyltetrazolium Bromide] (MTT) Assay. In brief, MCF-7 cells were seeded in a 96-well plate at the density of 10,000 cells/well and incubated for 24 h. After confluence, cells were treated with different concentration of BNc (10-150 µg/mL) and incubated for additional 24 h. After incubation, the medium was removed, 10 µL of MTT (5 mg/mL) dye were added and incubated further for 3 h in the dark at 37° C. After 3 h incubation, the formazan crystals were dissolved using DMSO, and the plates were read for absorbance at 590 nm using Microplate reader (BioTek, Synergy H1 Hybrid reader).

In Vitro Cytokine Release Assay

The immunogenicity of the prepared BNc along with the bare PLGA NP were tested for its immunoregulatory potential using standard cytokine release assay. In brief, $8\times10^5$ THP-1 cells were seeded in a 12-well plate and treated with bare PLGA NP (100 µg/mL), NKM (100 µg/mL), Gd-lipid (100 µg/mL) and BNc (100 µg/mL) at 37° C. for 24 h. After 24 h incubation, cell culture supernatants were collected, centrifuged, removed cell debris and stored at −20° C. as small aliquots. For cytokine assay, samples were thawed and analyzed for pro-inflammatory cytokines, IL-1β (LOD: 1.7 pg/ml), IL-6 (LOD: 1.5 pg/mL), and TNF-α (LOD: 1 pg/mL) using Magnetic Human Cytokine Multiplex Assays Kit (R&D Systems, Inc. Minneapolis, MN) in Luminex MagPix® instrument (Millipore Inc.) as per the manufacturer recommendations. For positive control, cells were dosed with 3 µg/mL of lipopolysaccharide (LPS) for 24 h.

Pharmacokinetics and Bio-Distribution of BNc

The circulation half-life and pharmacokinetic profile of the BNc were investigated using Six-week-old female NU/NU nude mice (n=3). In brief, BNc (5 mg/kg) were administered intravenously via tail vein injection, and the blood samples were collected at predetermined time intervals (0.5-48 h) through tail vein puncture. The amount of BNc in the blood samples was quantified using ICP-MS as described earlier. For the bio-distribution study, 5 mg/kg of BNc were injected i.v. into the MCF-7 tumor-bearing mice, and after 24 h of study, animals were sacrificed to collect major organs and tumor tissues. The tissue samples were weighed, digested using 2 mL of aqua regia (3:1 ratio of $HCl:HNO_3$), diluted in 2% $HNO_3$ and analyzed for the Gd concentration in ICP-MS as described earlier. Pharmacokinetic parameters were analyzed by a two-compartmental model using the MATLAB software (MathWorks, 2017b).

Mathematical Model

Pharmacokinetic models are employed to illustrate the process of nanodrug distribution in the whole body. When we follow a particular nanodrug administered with a specific route, we may study the whole body as a kinetically single unit, conventionally termed as compartment, which is homogeneous. For this purpose, we assume that the administered drug distributes uniformly in the body and that the drug equilibrates between different tissue/organ in a time-dependent fashion. However, we cannot conclude that the concentration of drug is the same in tissue or plasma. The bicompartmental model divides body into two different units or compartments. This division helps us study each tissue and its interaction with its relative components. In bicompartmental model, we assume that the administered drug enters the first compartment and then transported into the second compartment, tissue or organ.[39] The remaining drug will come back to the compartment 1 and then we have elimination of drug from first compartment.

In this study, we assumed that disposition of drug from blood to tissue follows a bicompartmental model. For the bicompartmental model, we assume that we have a first order transfer rate between two compartments, $k_{23}$ and $k_{32}$, and we consider a first order elimination rate from the second compartment, $k_{el}$, without any elimination or metabolism in the tissue.

In Vivo Bio-Imaging

For in vivo bio-imaging studies, near-infrared fluorescent dye 1,1'-Dioctadecyl-3,3,3',3'-Tetramethylindotricarbocyanine Iodide (DiR) labeled BNc (10 mg/kg) were injected intravenously into the MCF-7 tumor-bearing mice along with bare control PLGA NP and analyzed its bioaccumulation and tumor targeting efficiency using Pearl® Trilogy Small animal imaging system (LI-COR®). The fluorescent images at the near-infra-red window were taken at pre-determined time intervals (0, 3, 6, 12 and 24 h) and the images were analyzed in Image Studio® software. At the end point, mice were euthanized, and excised organs were imaged and analyzed for the quantitative determination of BNc accumulation.

Ex Vivo MRI Imaging

A pilot ex vivo MRI study was performed using NU/NU mice bearing MCF-7 tumors on a 14.1 T NMR system (Bruker Avance III, 600 MHz NMR-MRI, 14.1 T). In brief, NU/NU mice were intravenously injected with BNc (equivalent Gd concentration of 0.008 mmol/kg), and the animals were sacrificed after 2 h post-injection. Within 15 min of the sacrifice time, animals were imaged in MRI. The $T_1$-weighted MR images were recorded using a QTR 30 mm coil with a FLASH (Fast, slow angle shot) protocol at 37° C. The axial MR imaging parameters were TR=1500 ms, TE=6.5 ms, flip angle=90, image size 256×256, FOV=30× 30 and slice thickness=0.5 mm. Further, the ex vivo MR images were analyzed using DICOM software (Santesoft Ltd). All animal experiments and protocols were approved by the Institutional Animal Care and Use Committee and Institutional Biosafety Committee, Kansas State University, Manhattan.

Statistical Analysis

All experimental data represent the mean±standard deviation. Depending on the experiment parameters One-way and Two-way ANOVA were used for the statistical analysis. *P<0.001, P<0.01, *P<0.05 were considered statistically significant.

Results and Discussion

Preparation and Characterization of BNc

Figure 10A:
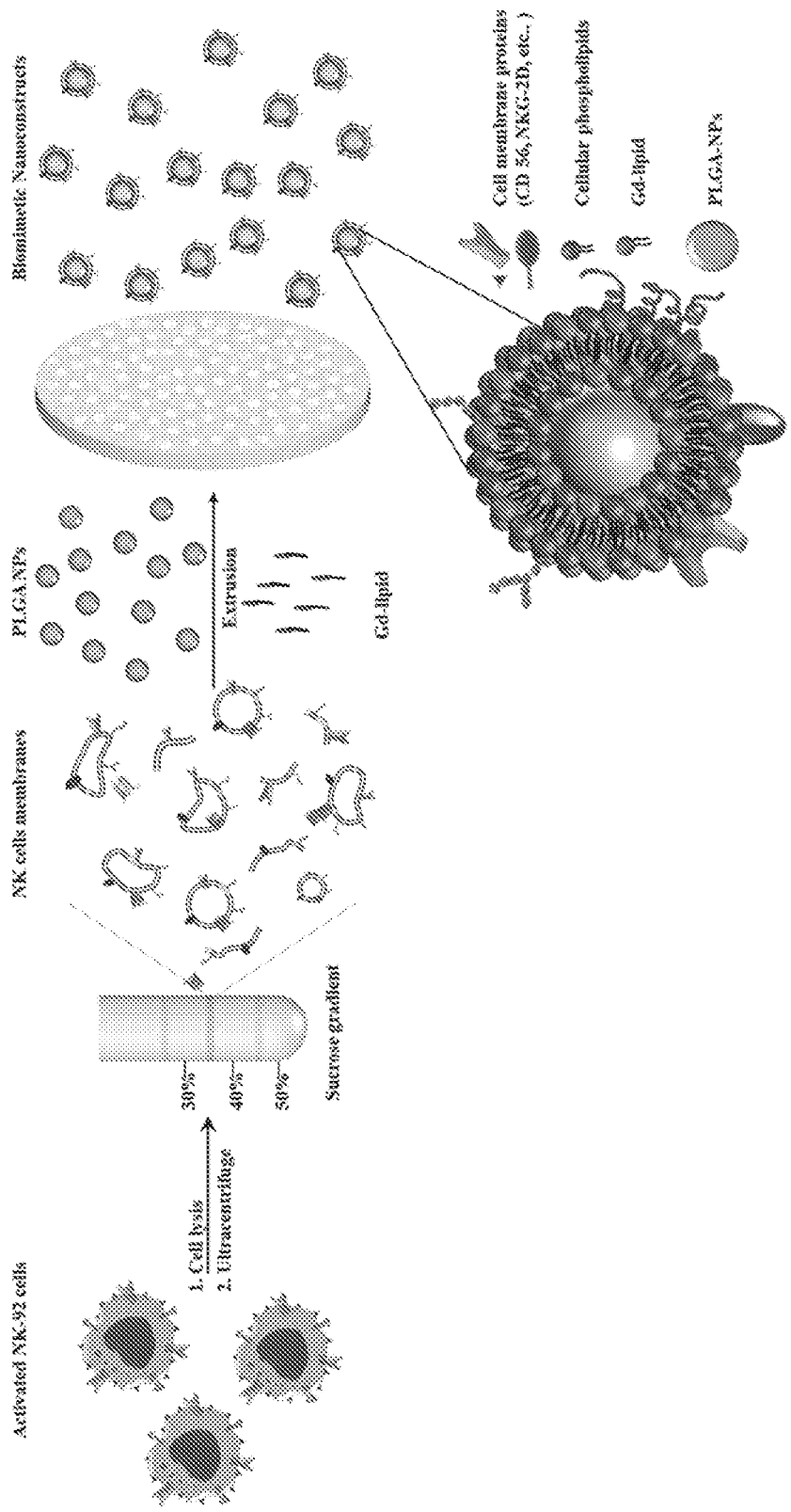
FIG. 10A. Schematic illustration of the preparation of biomimetic nanoconstructs (BNc) made up of natural killer cell membrane isolated using sucrose gradient differential centrifugation. BNc were prepared using simple extrusion technique, where PLGA nanoparticles and Gd-lipids were extruded with isolated NKM.
Figure 10B:
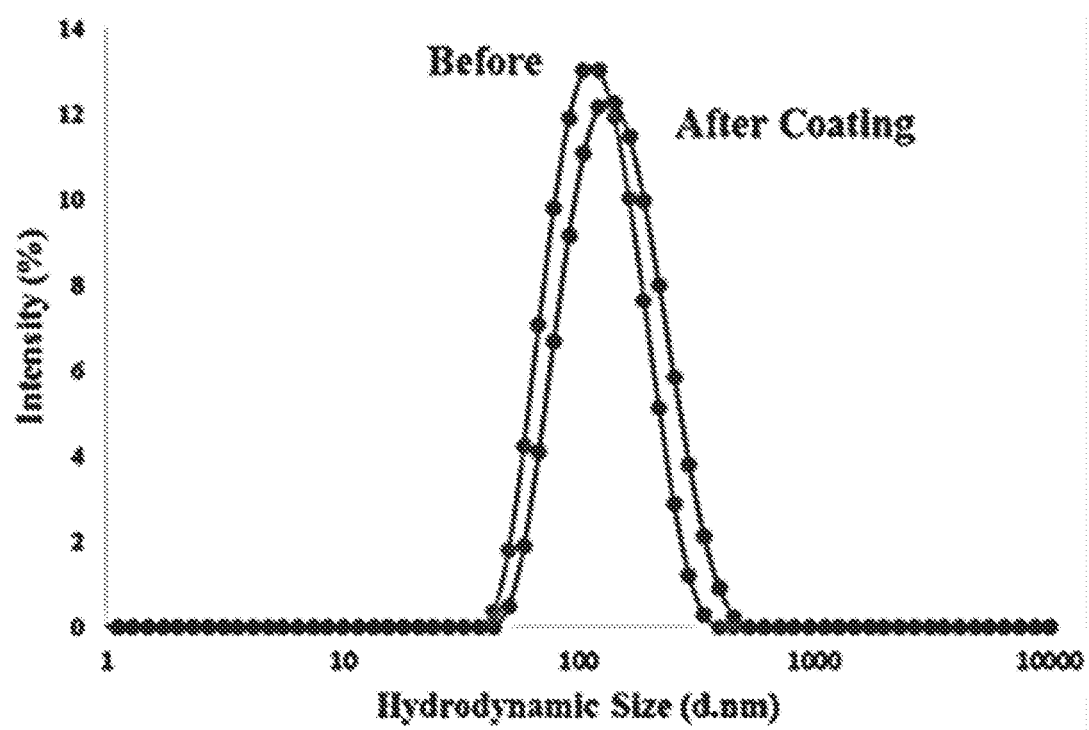
FIG. 10B. DLS size of the BNc before and after NKM coating.
Figure 10C:
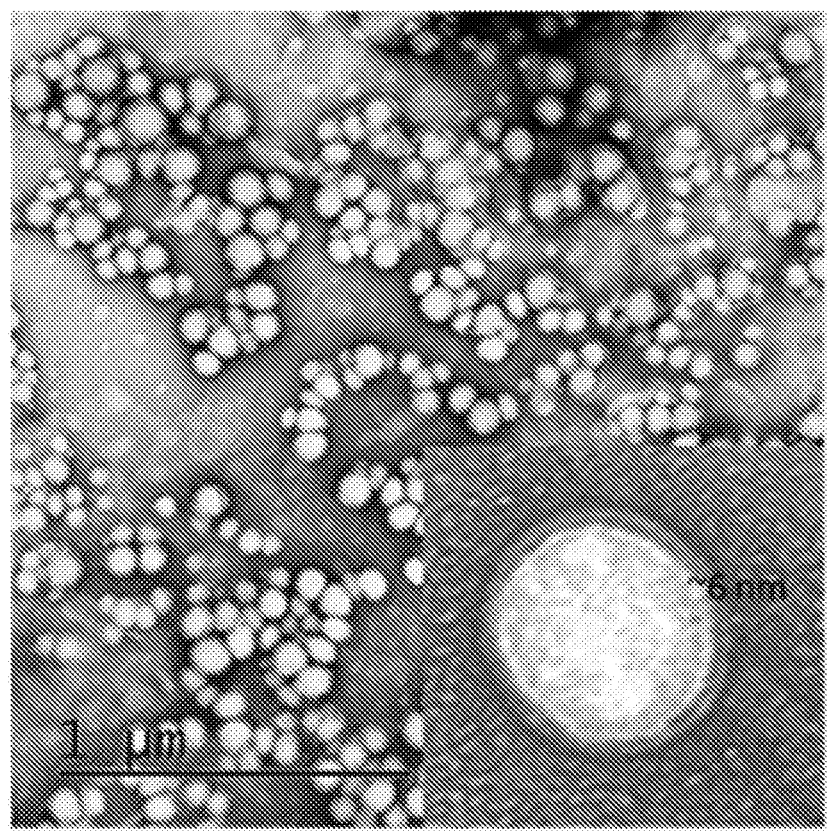
FIG. 10C. Transmission electron microscopic image of the prepared BNc, insert shows the magnified image of the BNc with distinct biomolecular corona (NKM and Gd-lipid).

BNcs were fabricated using membrane extrusion method in the manner similar to that of liposomal fabrication. The process involves the preparation of PLGA NP, extraction and isolation of NKM, and the cloaking of PLGA NP with isolated NKM, GBCA, and NIR dye. The biocompatible polymeric NP, PLGA, was prepared using nano-precipitation following our earlier reports. Further, the NKM was isolated and extracted from the NK-92 cells through sucrose gradient centrifugation. The extracted NKM was lyophilized and re-dispersed in PBS. The amount of NKM yield was quantified by measuring the protein concentration. From ~2×10$^8$ NK-92 cells, the NKM yield was found to be ~300 μg protein equivalent. Finally, the BNc were fabricated by extruding PLGA NP and Gd-lipid with isolated NKM [with the weight ratio of (5:1:1)] through 200 nm pore sized polycarbonate membrane. For NIR dye labeling, constant 1.0 wt % of dye with respect to the 1 mg of PLGA was used in all cases. Gd$^{3+}$ conjugated phospholipid (Gd-lipid) was synthesized via simple convenient coupling chemistry as described in earlier reports. FIG. 10A illustrates the schematic representation of the process of BNc fabrication. The hydrodynamic size of the bare PLGA NP was found to be 109±2.8 nm, whereas the BNc were found to be in the range of 110±20 nm, respectively (FIG. 10B). The transmission electron microscopic images of the BNc show clear coating materials onto the surface of the PLGA NP (FIG. 10C). Further, to investigate its fabrication efficiency, three different formulations of BNc were fabricated as represented in Table 3 as follows: BNc-A=(1000 μg PLGA):(200 μg Gd-lipid):(20 μg NKM); BNc-B=(1000 μg PLGA):(200 ug Gd-lipid):(100 ug NKM); BNc C=(1000 ug PLGA):(200 ug Gd-lipid):(200 ug NKM).

TABLE 3

Physicochemical characteristics of BNc.

| Nanoparticles | Hydrodynamic Size (d · nm) | PDI | Zeta Potential (mV) |
|---|---|---|---|
| BNc A (5:1:0.1) * | 111 ± 2.1 | 0.16 ± 0.02 | −20.7 ± 0.76 |
| BNc B (5:1:0.5) * | 128 ± 1.6 | 0.19 ± 0.01 | −36.9 ± 4.07 |
| BNc C (5:1:1) * | 134 ± 4.4 | 0.28 ± 0.04 | −41.1 ± 0.59 |
| Bare PLGA NPs (5:1) * | 109 ± 2.8 | 0.14 ± .001 | −20.1 ± 0.82 |
| NKM | NA | NA | −26 ± 0.21 |

* Ratios indicate in BNc corresponding to PLGA:GD-lipid:NKM protein ratio (by weight)
NA sample not measured.

Figure 11:
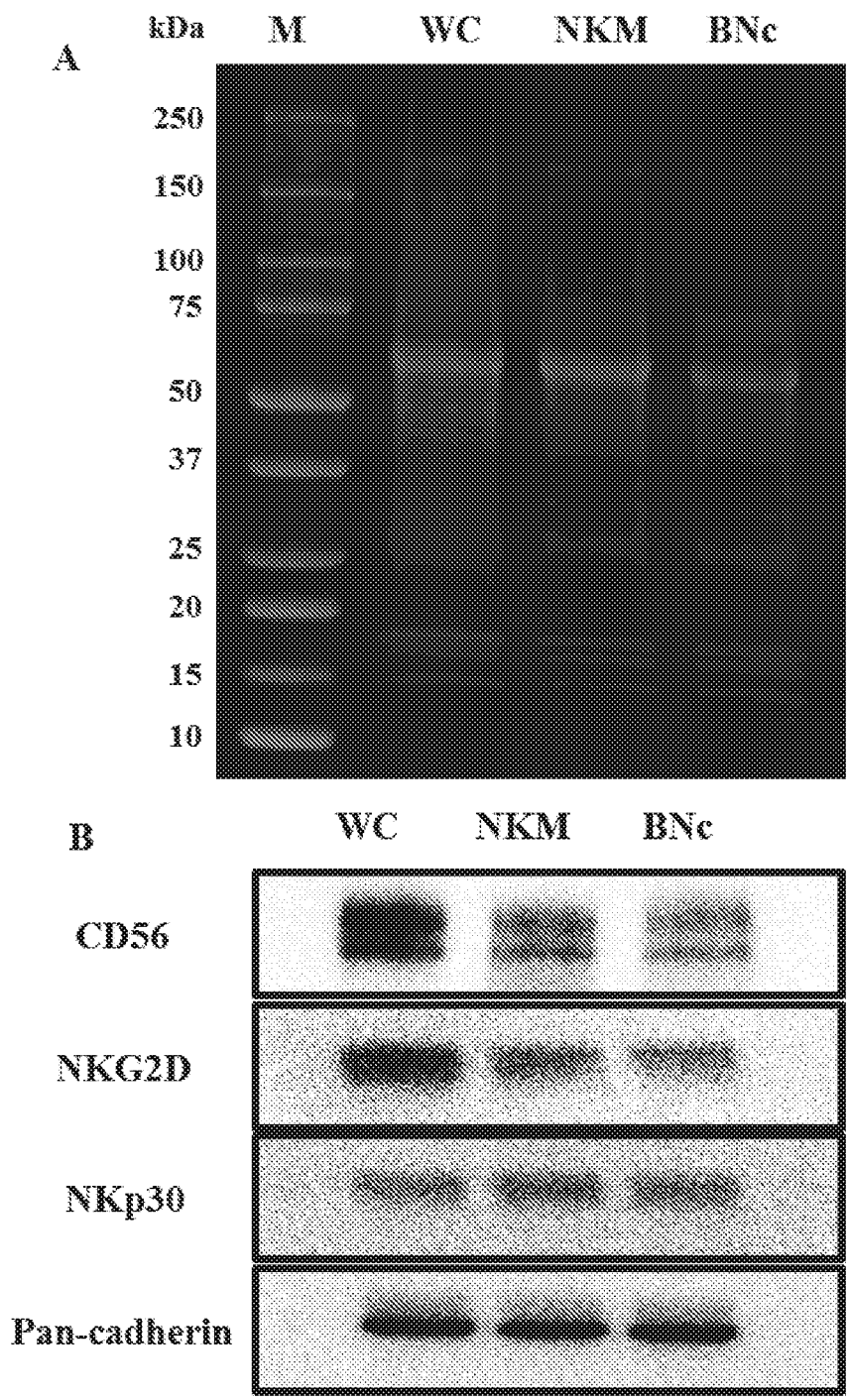
FIG. 11. Protein characterization of BNc. (A) SDS-PAGE analysis of protein bands in NK-92 cell extract, isolated NKM, and the BNc. (B) Western blot analysis of BNc for its characteristic protein, CD 56, NKG-2D, and NKp30.

The results from hydrodynamic size analysis indicated that the size of the BNc slightly increases with the increase in the concentration of NKM, which is presumably due to the presence of a larger amount of NKM that becomes hydrated in an aqueous environment. Further, the zeta potentials of each construct demonstrate that the coating of NKM changes its zeta potential value more negative among different formulations, which is attributed to the negative zeta potential of the cell membrane that was organized onto the negatively charged PLGA NP. Based on physicochemical characteristics, more stable BNc-C (5:1:1) were chosen for further characterization studies. Hereafter, BNc represents BNc-C. Next, we identified signature proteins in the BNc using SDS-PAGE and western blot analysis. FIGS. 11A and 11B represent the SDS-PAGE and western blot of the isolated NKM along with the engineered BNc. SDS-PAGE analysis revealed that the proteins from the NKM were successfully retained in the BNc. Among the proteins, the characteristic signature proteins such as CD56, NKG-2D, and NKp30 were identified from the western blot analysis along with the control pan-cadherin (FIG. 11B). NKG-2D and NKp30 are activating receptors found on the NK-cells for effective cytolytic functions on the tumor cell, which overexpress their ligands. NK cells recognize tumor cells and stressed cells through these ligands. Thus, the presence of these signature proteins would facilitate the tumor targeting, thereby delivering maximum contrast agents to help distinguish tissue contrast.

Figure 12A:
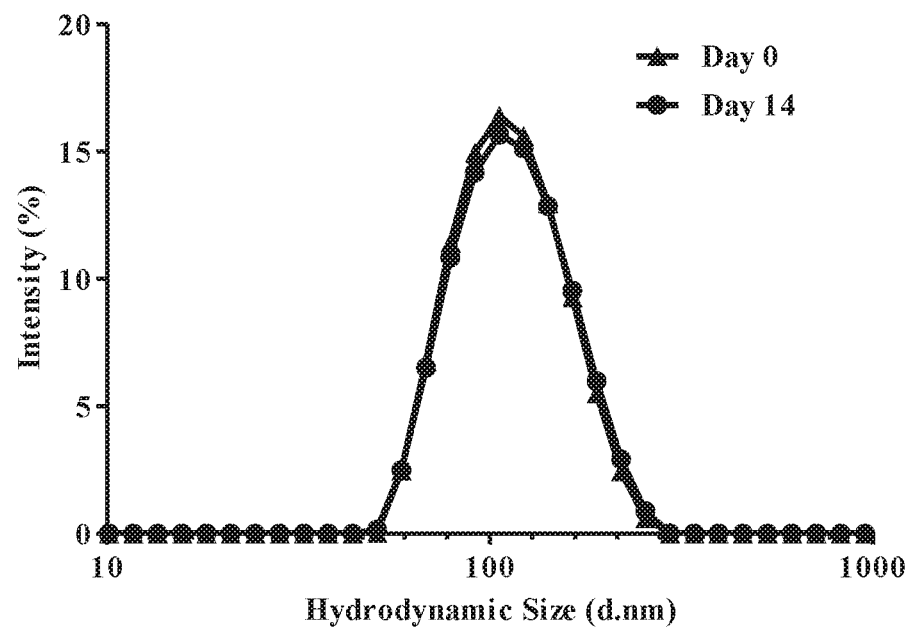
FIG. 12A. Stability of BNc in PBS (pH=7.4) at 4° C.
Figure 12B:
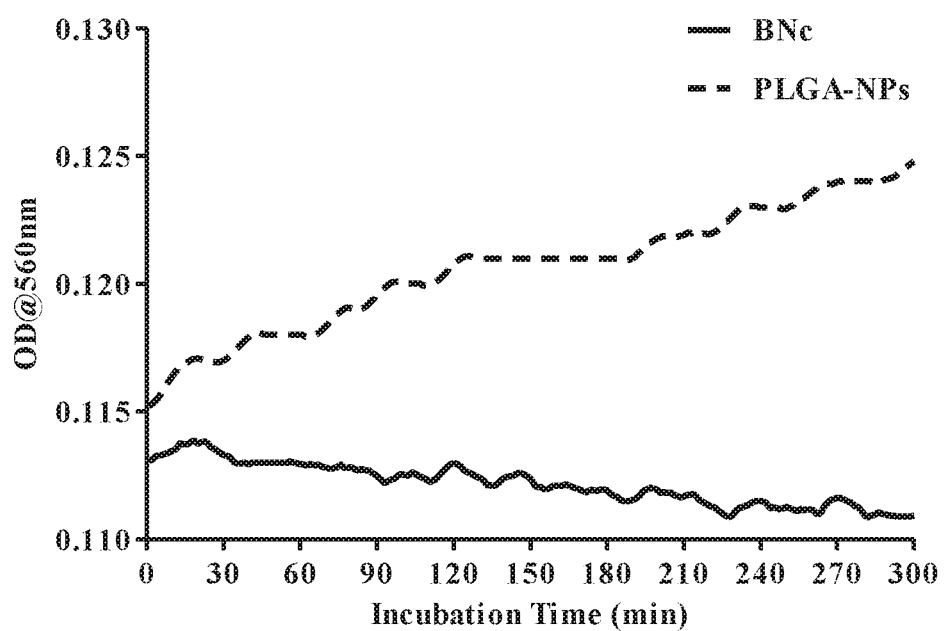
FIG. 12B. Serum stability of BNc and bare PLGA-NP in 90% FBS at 37° C.

The stability of BNc in in vivo serum/plasma conditions was investigated by storing the BNc in PBS at 4° C. and measuring the variation in hydrodynamic size for 14 days. FIG. 12A shows the stability of BNc after 14 days in PBS. No significant change in its size was observed over 14 days of study. Further, the serum stability of the BNc was investigated by incubating the BNc with 90% FBS, FIG. 12B. Compared to bare PLGA NP, BNc show higher stability in serum conditions as evident from the no change in its optical density over the period at 560 nm. This optical measurement records the change in absorbance due to particle aggregation.

Figure 12C:
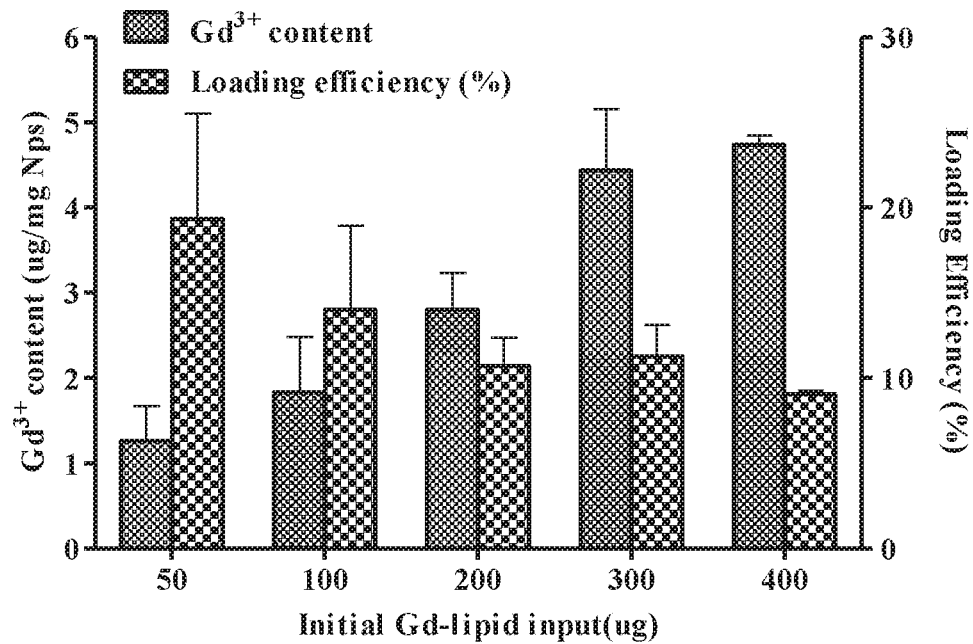
FIG. 12C. $Gd^{3+}$ loading efficiency of BNc with different initial input concentrations of Gd-lipid (50-400 µg).
Figure 12D:
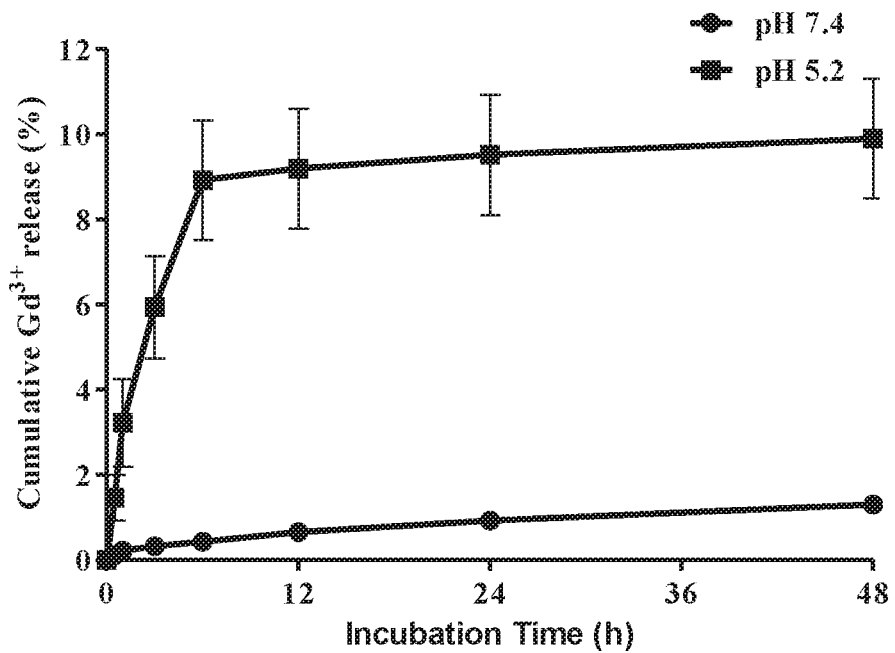
FIG. 12D. $Gd^{3+}$ release characteristics of BNc in PBS (pH=7.4) at 37° C.

The Gd$^{3+}$ loading in BNc was further investigated in detail by increasing the concentration of Gd-lipid input during BNc fabrication. With the fixed concentration of PLGA and NKM (5:1), the concentration of Gd-lipid was varied between 50 and 400 ug/mg of PLGA (FIG. 12C). The maximum Gd loading efficiency of BNc was found to be ~19%, and the Gd loading content was found to be 4.5±0.1 μg/mg of PLGA. However, we observed that the higher loading of Gd$^{3+}$ results in instability of BNc in physiological pH. For further studies, BNc with the Gd$^{3+}$ content of 3±0.4 μg with the loading efficiency of 11% were used for all other experiments (BNc). Further, the Gd$^{3+}$ release characteristics of BNc were investigated at pH=7.4 in PBS as well as at pH=5 in acetate buffer in order to map the Gd$^{3+}$ stability in BNc which is directly related to toxicity. We further assumed that by stabilizing Gd$^{3+}$ in BNc, Gd$^{3+}$ associated toxicity would be reduced as its ionic form is toxic. A cumulative Gd$^{3+}$ release from the BNc was performed by dialyzing the samples using 500 Da dialysis bag, which gives easy passage to release free Gd$^{3+}$ (Mw 157.25 Da) to the dialysis reservoir. The cumulative release percentage of Gd$^{3+}$ from BNc at pH=5, 7.4, and 5.2 was found to be around 2% and 10% after 48 h (FIG. 12D). This further confirms the stability of Gd$^{3+}$ in the fabricated BNc.

Figure 13A:
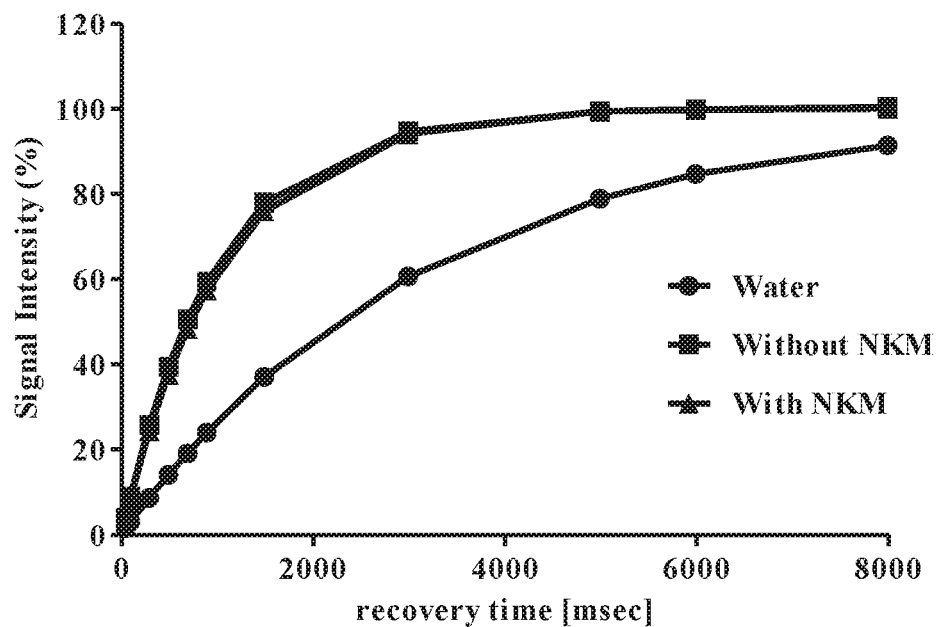
FIG. 13A. $T_1$ recovery curve of BNc in the presence and the absence of NKM, showing r1=5.0 mM−1s−1.
Figure 13B:
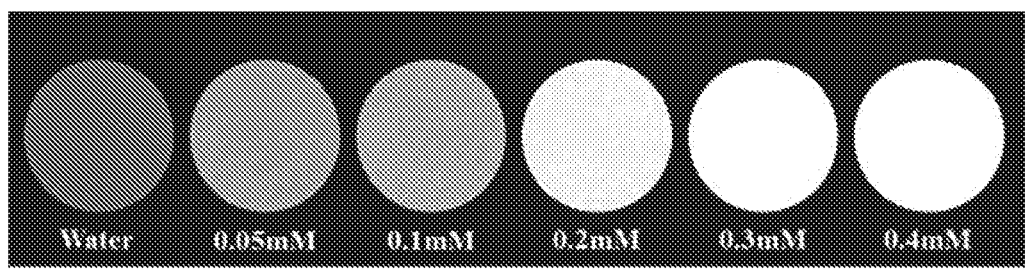
FIG. 13B. $T_1$ contrast phantoms of different concentration of BNc (0.05 mM-0.4 mM).

FIG. 13 shows the magnetic resonance properties of BNc dispersed in water. The $r_1$ relaxivity of the BNc in the presence and the absence of NKM was found to be 4.8±0.6 mM$^{-1}$s$^{-1}$ and 5.0±0.5 mM$^{-1}$s$^{-1}$, respectively (FIG. 13 A). We did not observe significant differences in the $r_1$ relaxivity, which further assures us that the distribution of Gd-lipid in the BNc is not affected by the NKM coating. This is in agreement with the earlier report where authors discussed alternation in $r_1$ relaxivity due to the distance induced confinement of Gd$^{3+}$. In the present case, if NMK has inserted in between Gd-lipids instead of surface coating, this would increase the distance between Gd-lipids, and we should experience a significant change in relaxivity. FIG.

Figure 13C:
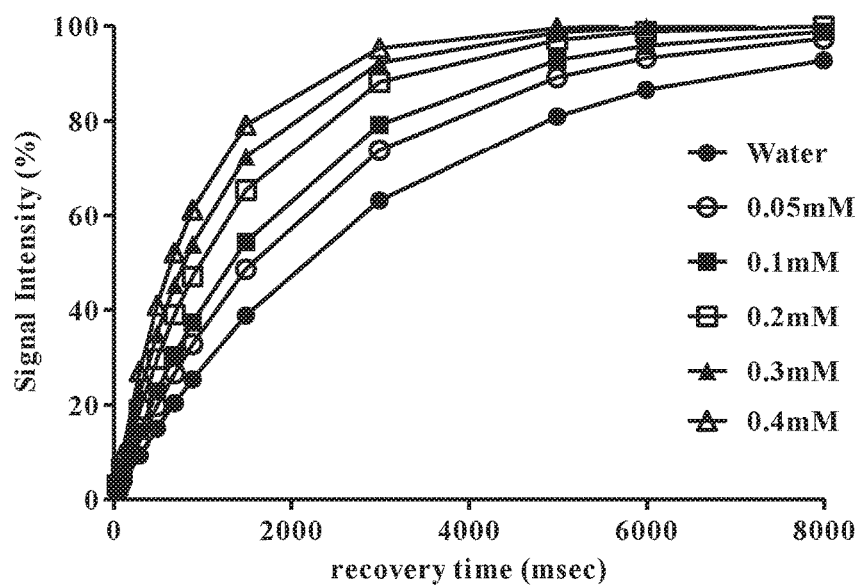
FIG. 13C. $T_1$ recovery curve of different concentrations of BNc (0.05 mM-0.4 mM) acquired at 14.1 T.

13B shows the MR phantom images of different concentrations of BNc acquired at 14.1 T. The phantom images show brighter contrast as the concentration increases to 0.4 mM, this was further confirmed by the corresponding $T_1$ curve (FIG. 13C).

Figure 14A:
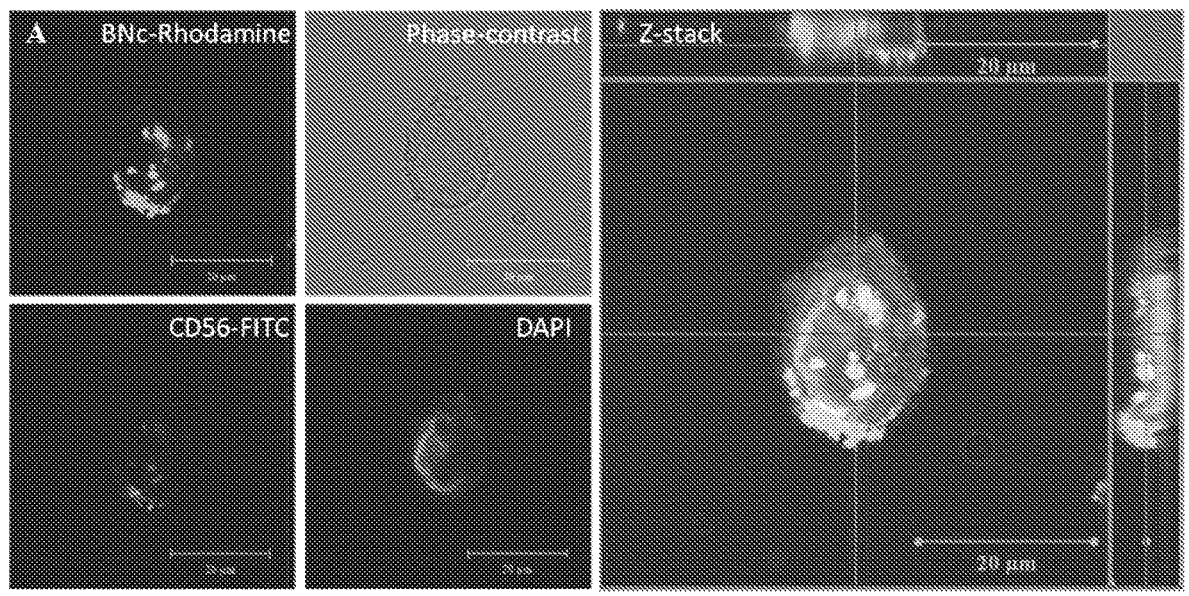
FIG. 14A. Confocal laser scanning z-stack micrograph of cellular uptake of BNc in MCF-7 cells after 3 h of incubation, immunostained with FITC-anti-CD 56.
Figure 14B:
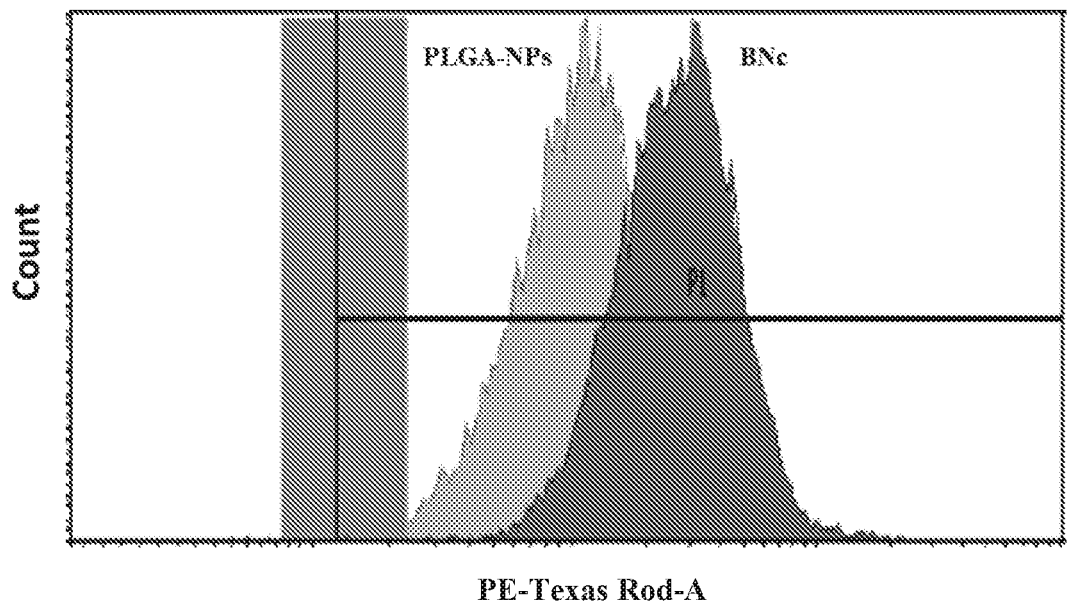
FIG. 14B. FACS analysis of quantitative cellular uptake of BNc in comparison with bare PLGA-NP after 6 h incubation.
Figure 14C:
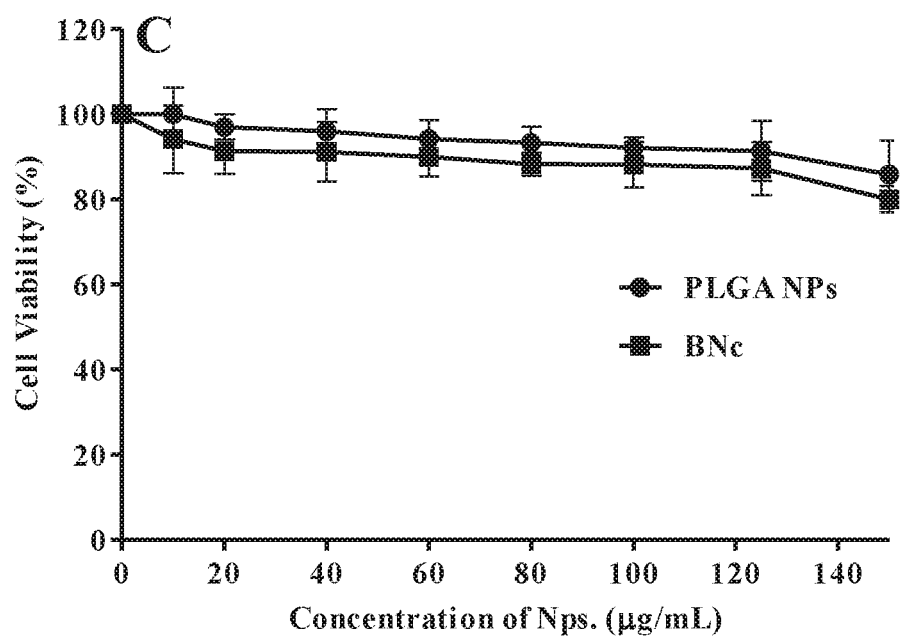
FIG. 14C. Biocompatibility of different concentration of BNc (10-150 µg) in MCF-7 cells after 24 h incubation FIG. 15. Confocal laser scanning micrograph of cellular uptake of BNc in MCF-7 cells after 3 h of incubation, immunostained with FITC-anti-CD 56.
Figure 15:
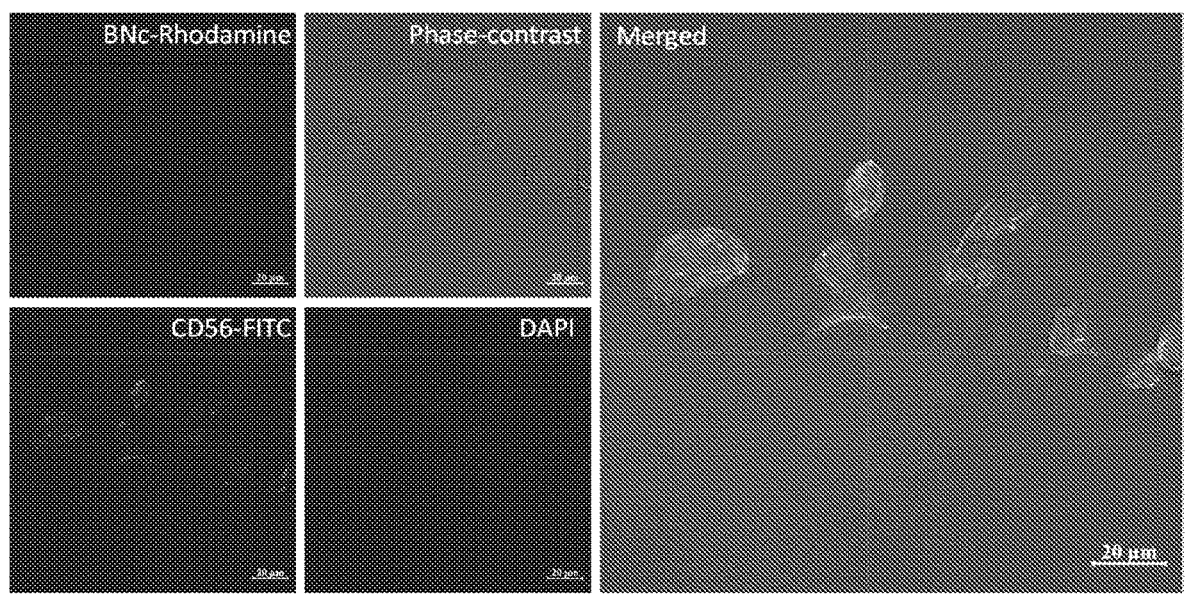

The cellular uptake and intracellular distribution of the Rhodamine labeled BNc were investigated in MCF-7 cells using confocal laser scanning microscope and flow cytometry (FIG. 14). MCF-7 cells treated with BNc show rapid uptake of the BNc within 3 h of incubation. The uptaken BNc were found intact in the cells as evident from the bioaccumulation of immunostained FITC-anti-CD56 and Rhodamine signals inside the cells (FIG. 15). The nuclei of the cells were further stained with DAPI, and this shows BNc were distributed in perinuclear regions. Z-stack images of MCF-7 show clear evidence of intracellular distribution of BNc (FIG. 14A). Further, the selective targeting of the BNc in MCF-7 cells was compared with the bare PLGA NP labeled with Rhodamine dye. Flow cytometry analysis was conducted to assess the cellular uptake efficiency. The results indicate that cellular uptake of BNc was more predominant than the bare PLGA NP illustrating the targeting potential of BNc towards cancer cells (FIG. 14B). The biocompatibility of the BNc and bare PLGA NP was investigated in MCF-7 cells through MTT assay. 24 h incubation results show that even at higher concentration (150 µg/mL) BNc were not cytotoxic (FIG. 14C). This clearly demonstrated the biocompatible nature of BNc, which can be used for bioimaging applications in vivo.

Figure 16:
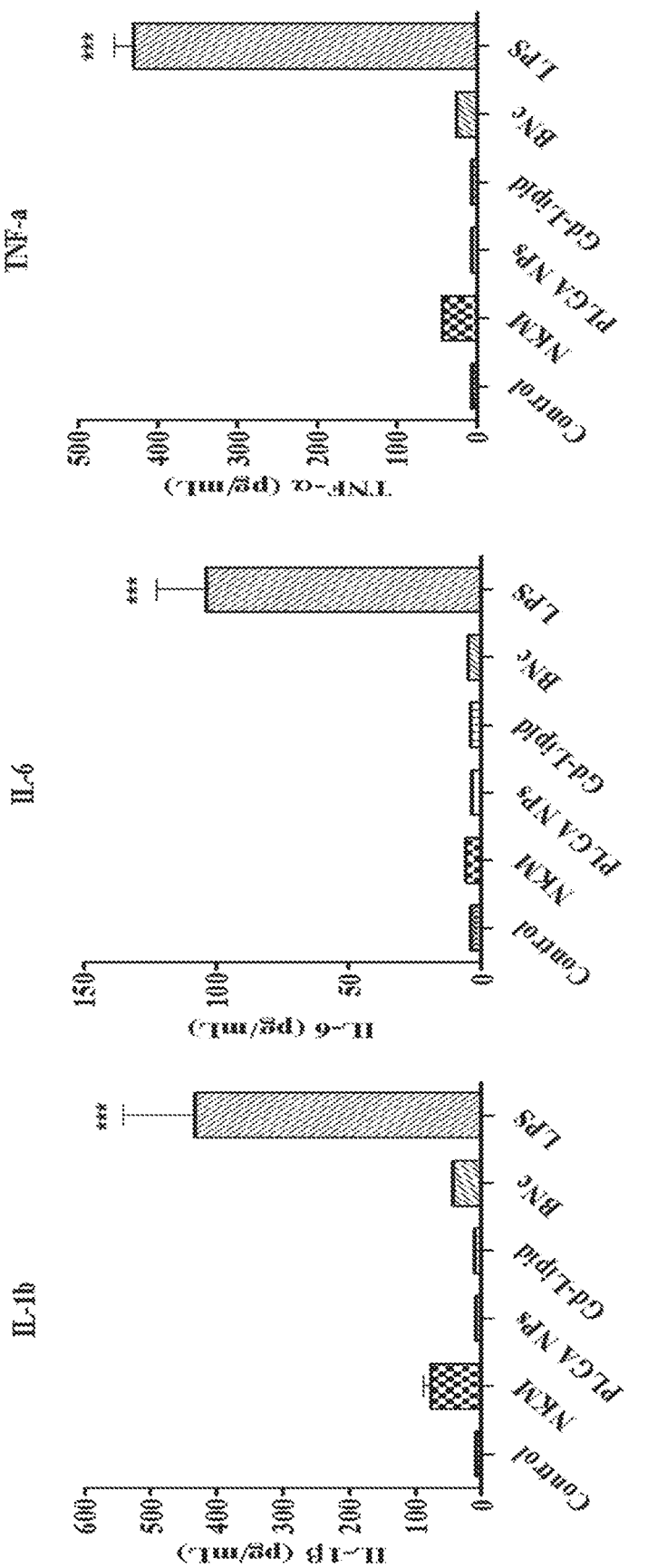
FIG. 16. In vitro immunogenicity of BNc in THP-1 cells assessed by evaluating the pro-inflammatory cytokines (IL-1β, IL-6, and TNF-α) release after 24 h incubation.

Further, the immunogenicity of the NKM derived BNc was investigated in human peripheral blood monocytes, THP-1, using pro-inflammatory cytokine release assay (FIG. 16). Pro-inflammatory cytokines (IL-10, IL-6, and TNF-α) are important biomarkers to identify the immunoregulatory potential of nanoformulations. As documented in FIG. 16, engineered BNcs are non-immunogenic as they exhibit minor response against IL-1β, IL-6, and TNF-α in comparison with the control cells and positive control (FIG. 16). No significant levels of immunogenicity were observed for isolated NKM, bare PLGA NP, Gd-lipid in comparisons with the control cytokine levels (FIG. 16). Only the positive control, LPS (3 µg/mL), shows the elevated levels of IL-1β, IL-6, and TNF-α in the tested cells. This clearly confirms the immuno-compatibility of BNc for further in vivo imaging studies.

Figure 17A:
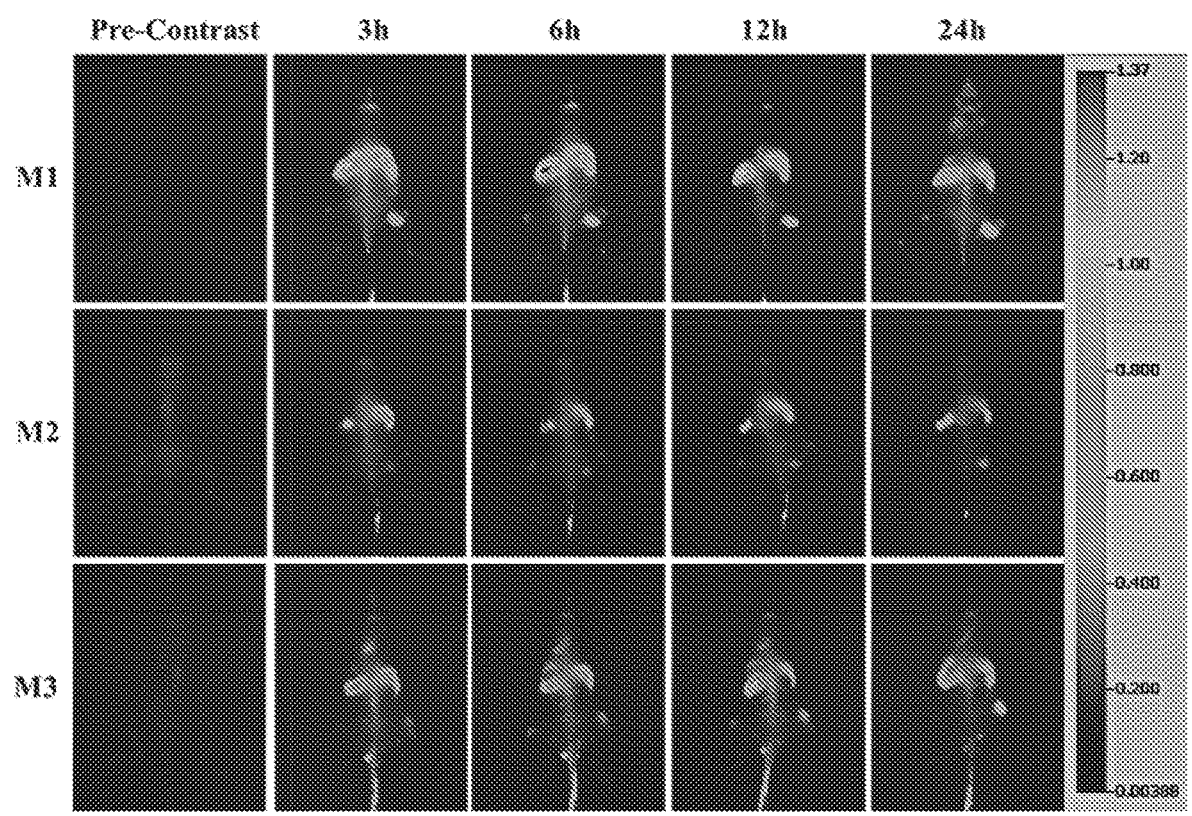
FIG. 17A. Time dependent live animal imaging of MCF-7 tumor bearing NU/NU mice after intravenous injection of DiR-labelled BNc (10 mg/kg). Images were recorded prior to injection and after 3 h, 6 h, 12 h and 24 h, respectively.
Figure 17B:
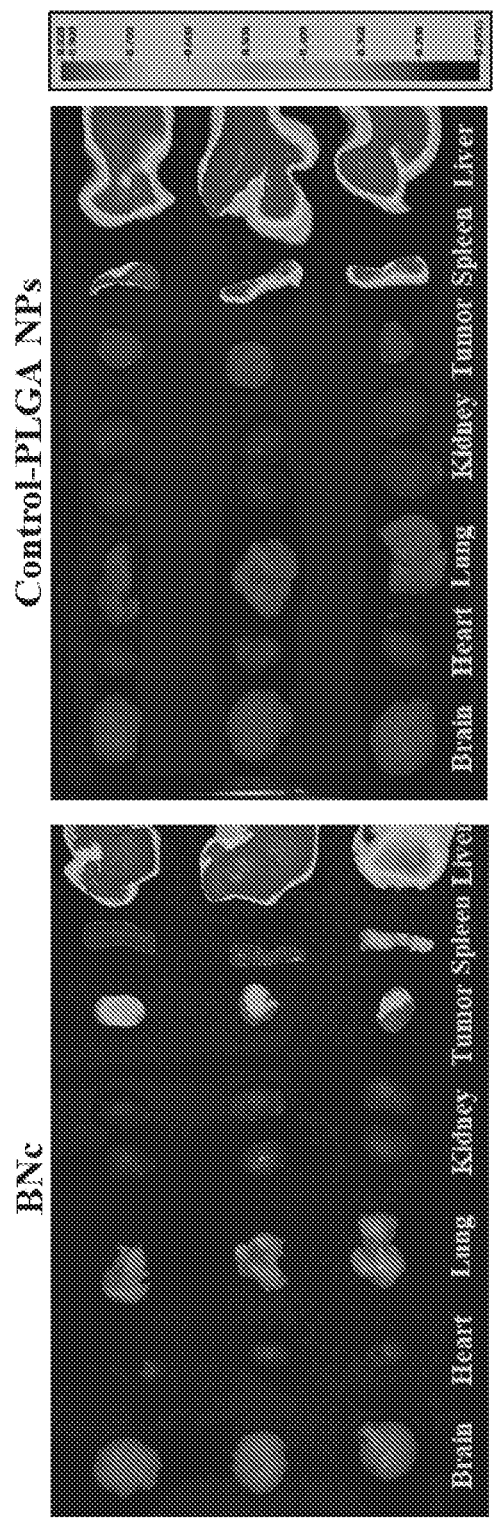
FIG. 17B. Bio-accumulation of BNc and control PLGA nanoparticles in tumor bearing mice after 24 h post-injection.
Figure 17C:
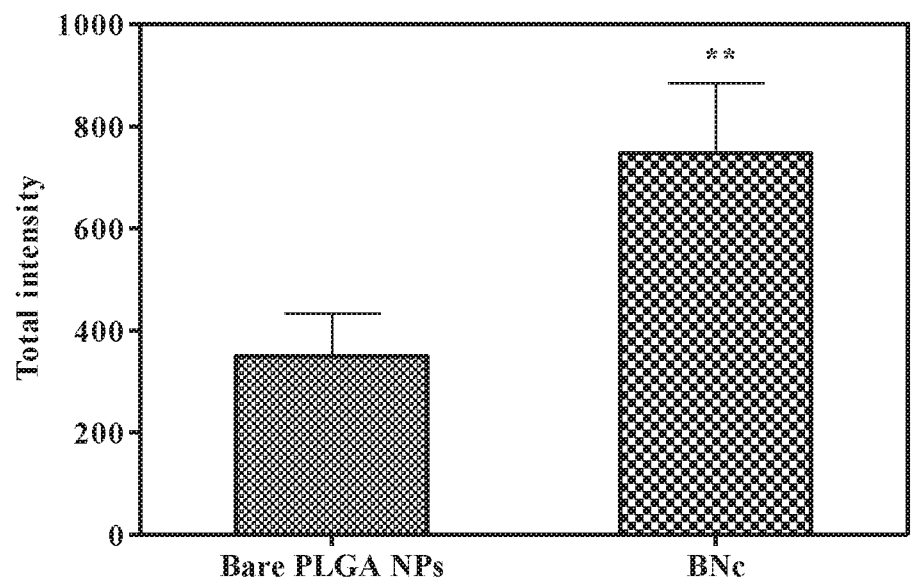
FIG. 17C. Comparative tumor accumulation of BNc and Bare PLGA nanoparticles in MCF-7 tumor bearing NU/NU mice after 24 h post-injection.

With the assurance of BNc colloidal stability, in vitro cancer targeting, and biocompatibility, we moved forward to understand their in vivo targeting ability in immunodeficient NU/NU nude mice bearing an MCF-7 tumor. As shown in FIG. 17A, DiR labeled BNc (10 mg/kg) were injected via tail vein, and the distribution of particles was studied under live animal imaging over a period of 24 h. Distinguishable kinetics of BNc accumulation in the tumor from 3, 6, 12, and 24 h, as shown by the increase in fluorescent intensity in the tumor, further suggests the tumor targeting ability of BNc. Accumulation of BNc over the 24 h period also suggests us the blood availability of BNc, thereby providing us a key to its long circulating properties. After 24 h of the imaging session, mice were euthanized, and the major organs were collected. These collected organs were washed with PBS and subjected to ex vivo fluorescent imaging (FIG. 17B). E vivo imaging proves the overall tissue distribution of BNc with major accumulation in tumor and RES organs like liver and spleen. Compared to the control group (bare PLGA NP), BNc show significant accumulation in the tumor which is twice as much as that of bare PLGA NP (FIG. 17C).

Figure 18A:
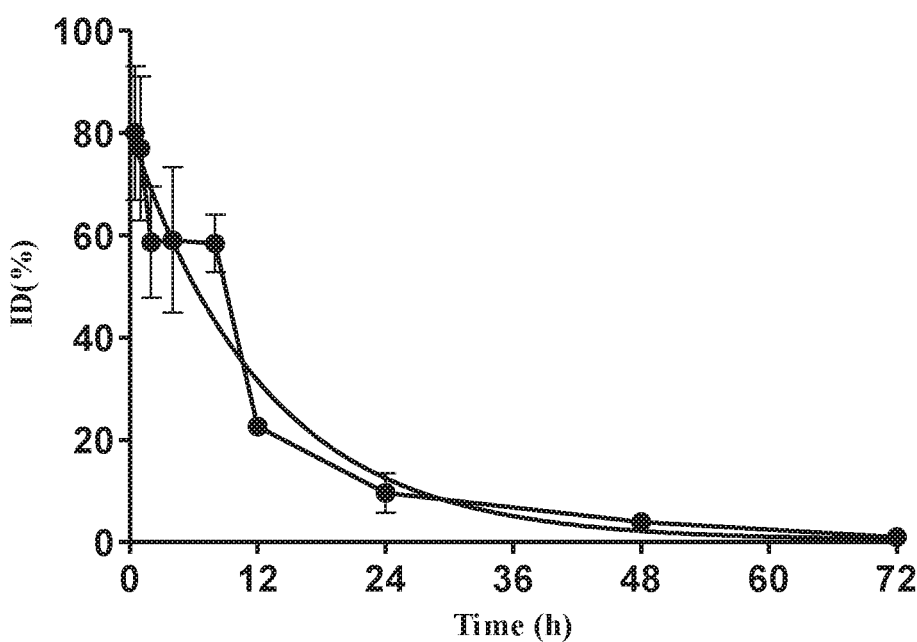
FIG. 18A. Circulation half-life of BNc in MCF-7 tumor bearing NU/NU mice over 72 h time.
Figure 18B:
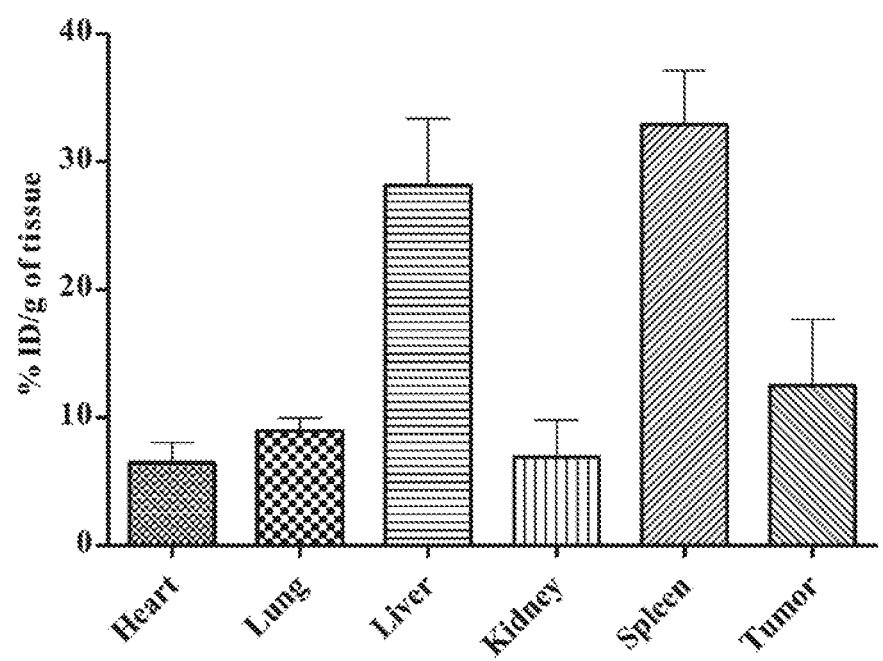
FIG. 18B. Bio-distribution profile of BNc after single intravenous tail-vein injection in MCF-7 tumor-bearing NU/NU mice.

Next, in vivo pharmacokinetics of BNc was investigated after a single intravenous injection of 5 mg/kg of NP in MCF-7 tumor-bearing immunodeficient NU/NU nude mice. We used $Gd^{3+}$ as a handle using ICP-MS to assess the pharmacokinetics and additional biodistribution studies. For this purpose, BNc were concentrated using Amicon Ultra centrifuge unit (3000 Da molecular weight cutoff) and characterized for its hydrodynamic size and weight yield after lyophilization. Both size and weight of BNc were found to be consistent in a number of experiments conducted blindly by a research technician. FIG. 18A shows the blood clearance of BNc after 72 h. The blood retention of BNc was found be high (60%) in the first 10 h and it gradually reduced with time. The amount of BNc in the blood was determined using ICP-MS analysis. The biodistribution efficiency of BNc was investigated after a single intravenous administration of BNc (5 mg/kg). After 24 h, animals were euthanized, and the major organs were investigated for the presence of BNc by estimating organ content of Gd using ICP-MS. The percentage of BNc in the liver and the spleen was found to be high, as they are the principal reticuloendothelial system that clears NP from the body. The percentage of BNc in the tumor tissue was found to be 10±3% of the injected dose (FIG. 18B). This further confirms the tumor affinity of NKM fabricated BNc for targeted bioimaging applications and supports our results for NIR imaging session. The pharmacokinetic parameters of the BNc were obtained by fitting the concentration of BNc in blood and tissues with respect to time intervals and dosage using a two-compartmental model (MATLAB 2017b). Table 4 shows the pharmacokinetic parameters of BNc in MCF-7 tumor-bearing NU/NU mice.

TABLE 4

Pharmacokinetic parameters of BNc injected NU/NU mice by two-compartmental analysis.

| PK parameters | Biomimetic Nanoconstruct (BNc) |
|---|---|
| $t_{1/2}$ (h) | 9.51 ± 5.74 |
| AUC (% ID · h/mL) | 1068.8 ± 507.27 |
| Vd (mL) | 3.85 ± 1.16 |
| CL (mL/h) | 0.28 ± 0.14 |
| MRT (h) | 13.6 ± 1.38 |

Figure 18C:
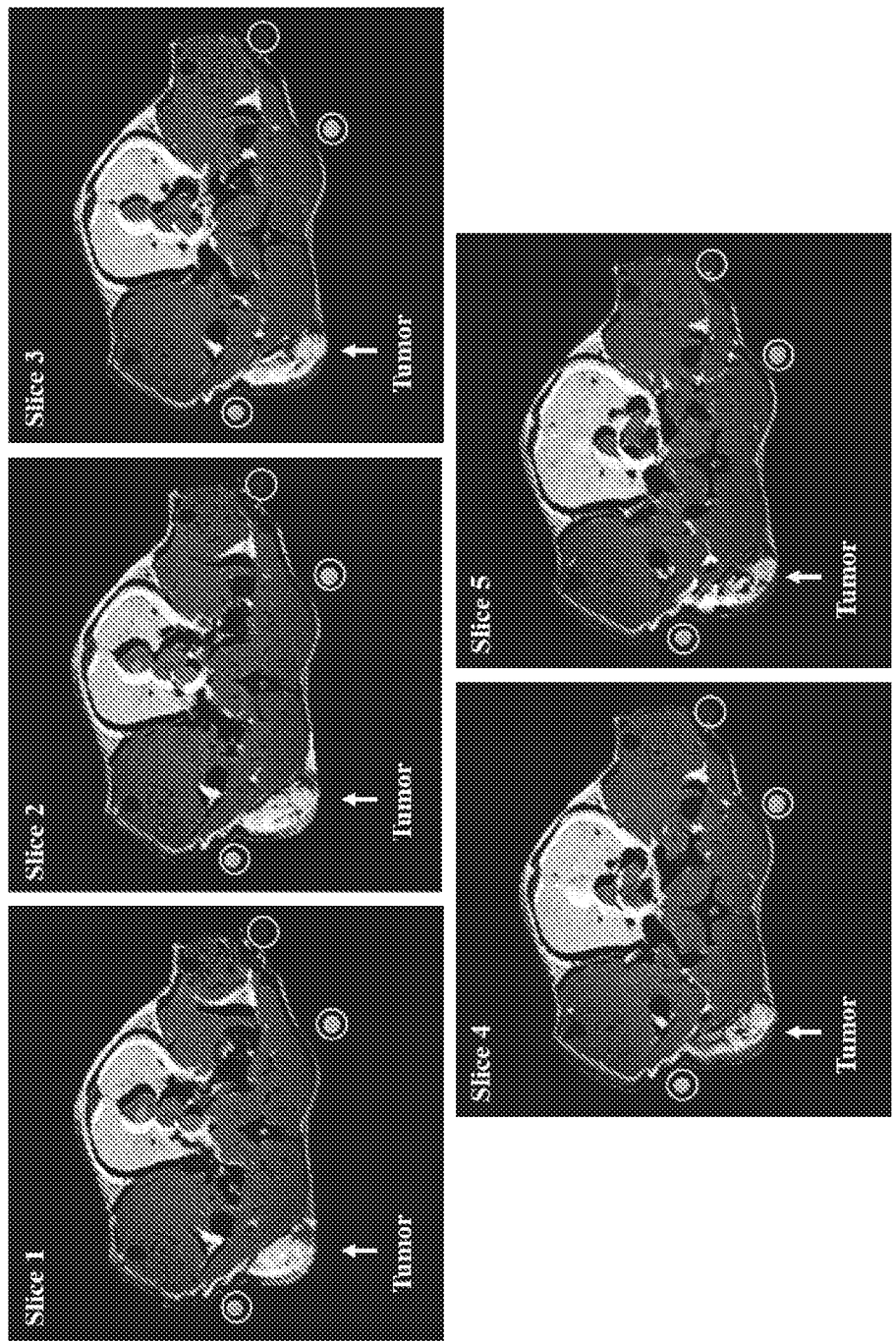
FIG. 18C. Ex vivo $T_1$ weighted magnetic resonance image slices of NU/NU mice bearing MCF-7 tumor after 2 h post-injection. Slice thickness: 0.5 mm. Color circles indicate the standard controls; red: water, yellow: 18 µM Magnevist®, blue: 37 µM Magnevist®.
Figure 19:
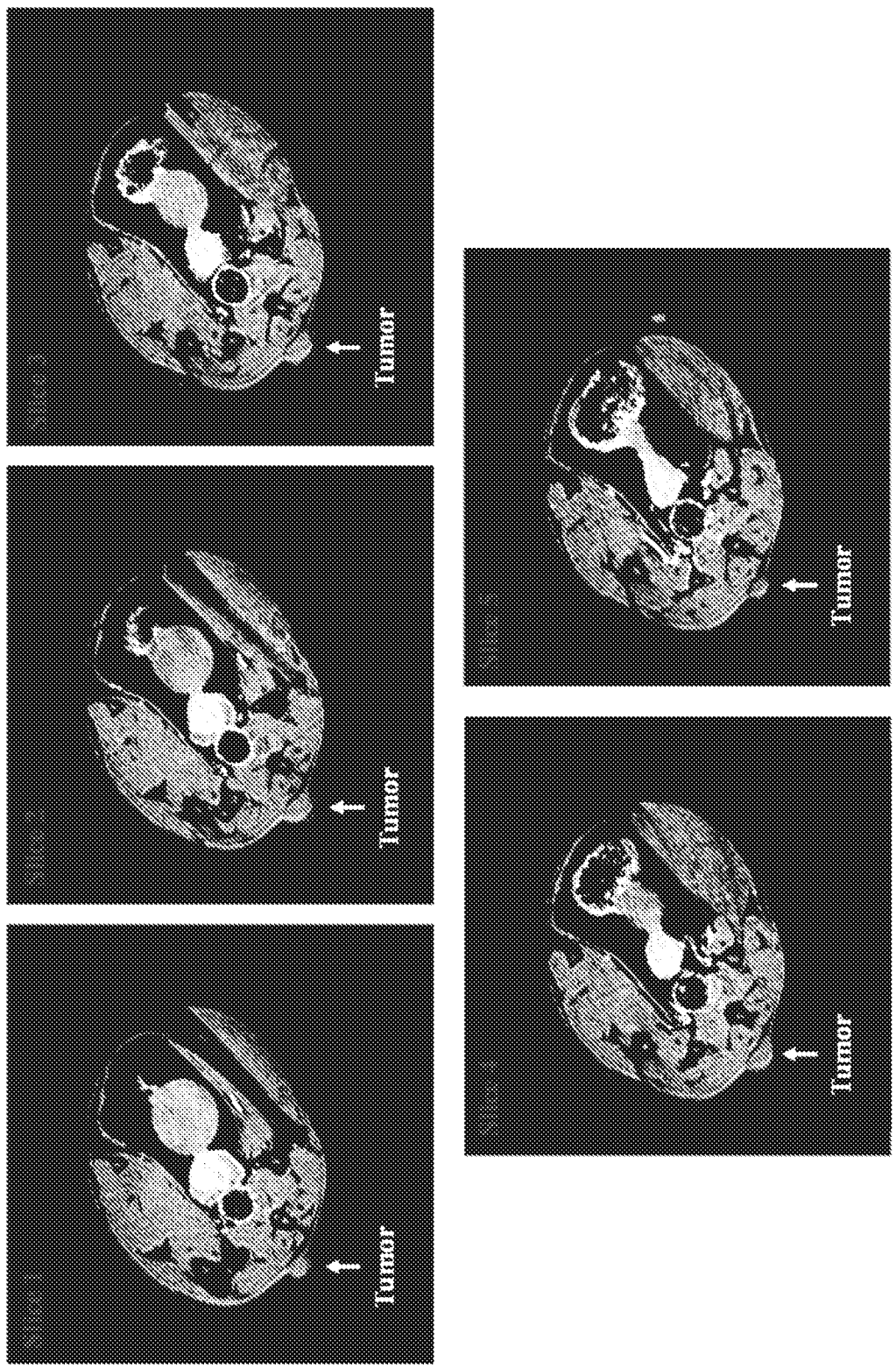
FIG. 19. Ex vivo MRI images of MCF-7 tumor bearing mouse.

$t_{1/2}$: half-life,
AUC: Area under curve,
Vd: Volume of distribution,
CL: Clearance,
MRT: Mean residence time Finally, the advantage of NKM coated BNc in MR imaging of tumors were demonstrated using 14.1 T NMR system (Bruker Avance III, 600 MHz NMR-MRI). For ex vivo MR imaging, following our approved IACUC protocol, tumor animals were intravenously injected with BNc (equivalent Gd concentration of 0.008 mmol/kg) and euthanized after 2 h. Animals were euthanized and then, following our approved protocol for MRI, rapidly imaged for $T_1$-weighted MR image contrast, recorded using a QTR 30 mm coil with a FLASH protocol at 37° C. FIG. 18C shows the $T_1$-weighted MR images slice of NU/NU mice treated with BNc (negative control MRI in FIG. 19). Compared with different image contrast of Gd standards, illustrated in different color circles (red: water, yellow: 18 µM Magnevist®, blue: 37 µM Magnevist®), BNc shows distinctive brighter image contrast in tumor tissues. Along the various MRI slices (slice thickness of 500 µm), it is clearly evident that the BNc were deeply penetrated into the tumor tissues and shown enhanced MR image contrasts to evaluate tumor as compared to that of surrounding soft tissue contrast. Comparing the data from MRI ex vivo imaging and data from in vivo NIR bioimaging, the engineered BNc show promises in targeting MCF-7 tumor.

Conclusion

Herein, we described a biomimetic approach to fabricate a multifunctional NP system that has acquired properties from NK cells and studied its potential for tumor targeting and imaging. This hybrid platform technology, where synthetic and biological components were merged to exhibit unique properties, and consisting of both hydrophilic and hydrophobic assembly, shows versatile properties and feasibilities in surface functionalization and have a vacancy in the hydrophobic core for cargo encapsulation. Moreover, the existence of BNc in the cancer cells and the tumor as compared to that of bare particle suggested the dependence of targeting due to the acquired properties from the NK-92 cells. Considering the fact that successful cancer therapy requires drugs being precisely delivered to the tumors, the engineered BNc would have promises in drug delivery and monitor the therapeutic response in a single session.

Example 3

Method of the Double Emulsion to Load Water-Soluble Drug

Water soluble drugs can be encapsulated into NK-PLGA by a water-in-oil-in-water double-emulsion solvent evaporation technique. First, an aqueous solution containing water-soluble drug was emulsified with a solution of the polymer in chloroform. The resulting water-in-oil first emulsion is the droplet of drug enclosed in the polymer mixture. Immediately, the first emulsion was further emulsified with an aqueous solution of the Natural killer cell membrane to form an oil-in-water second emulsion. Under these water-in-oil-in-water circumstances, NPs that formed were stabilized by NK membrane phospholipid and protein. The interior of the particle contains the water-soluble drug. The synthesis protocol was optimized to obtain homogeneous and well dispersed spherical NPs. In a typical experiment, the first emulsion (water-in-oil) was prepared by probe sonication of a mixture of 1 mg of water-soluble drug in 1 mL water with 10 mg PLGA in mL of chloroform. Immediately after the formation of the first emulsion, it was further emulsified with a mixture containing 2 mg NK membrane protein in 10 mL of water (oil-in-water) under probe sonication for 5 min resulting in the formation of water-in-oil-in-water double emulsion. This mixture was kept under stirring overnight to evaporate chloroform from the emulsion. After complete evaporation of chloroform, NPs formed were washed with deionized water using Amicon ultra centrifugal filter (Mw cut off=10 kDa) to remove un-encapsulated drug.

Example 4

Method to Coat Natural Killer Membrane onto Metallic Nanoparticle

The NK-92 membrane was collected using aforementioned protocol. The NK-92 membrane coated metallic nanoparticles can be achieved by bath sonication or by extrusion as discussed above. Examples include but are not limited to 15 nm gold nanoparticles (AuNPs).

Method

Figure 20:
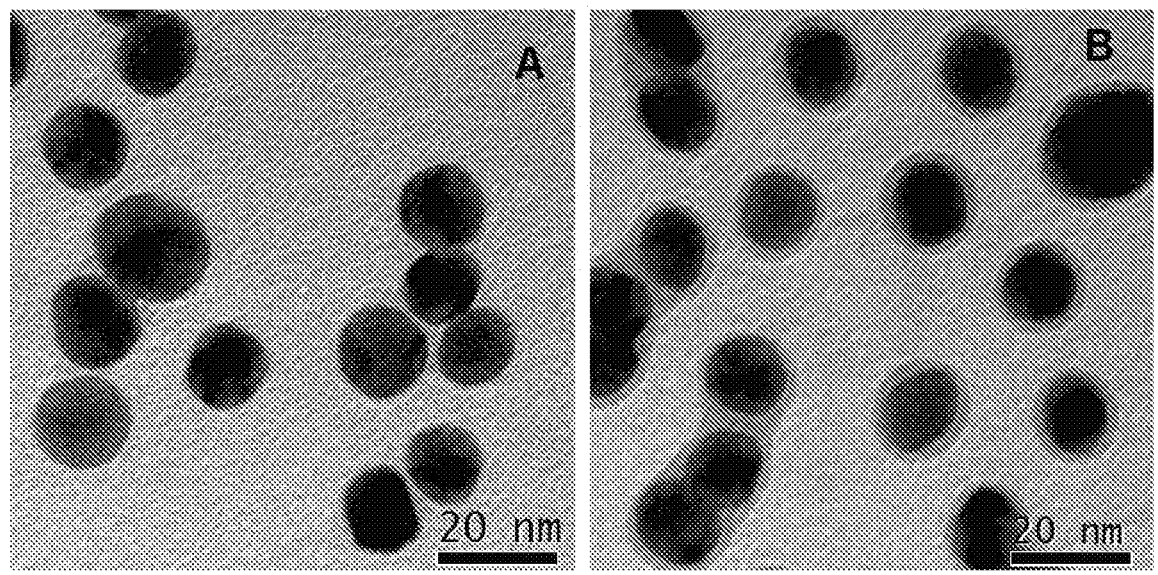
FIG. 20. Transmission electron microscopic images of: (A) citrate gold Nanoparticles (AuNPs) and (B) Natural Killer cell membrane (NKM) coated AuNPs.

Synthesis of 15 nm AuNPs: 15 nm AuNPs were synthesized by a modified Turkevich method. Briefly, 25 mL of 1 mM of gold(III) chloride hydrate ($HAuCl_4$) solution was heated to reflux at 190° C. To the boiled $HAuCl_4$ solution, 2.5 of 40 mM sodium citrate tribasic hydrate solution was added. The mixture was allowed to stir and reflux for 30 minutes. The solution should slowly turn to ruby red colored indicating the formation of 15 nm AuNPs. After 30 minutes, the heating was stopped and mixture was left to stir for 2 hrs. The size of AuNPs can be tuned from 5 nm to 100 nm by varying the types and amount of reducing agents (sodium citrate, sodium borohydride) and amount of gold seeds. FIG. 20A shows the prepared citrate gold nanoparticles.

AuNPs, larger in size and/or shape than 15 nm can be prepared by using 15 nm AuNPs as a seed using seed mediated growth mechanism.

NK-92 membrane coated AuNPs: NK-92 membrane coated AuNPs can be achieved using bath sonication technique. In brief, as prepared AuNPs solution was centrifuged at 3000 g for 15 minutes to concentrate to 6 mL and removed excess amount of sodium citrate. Thereafter, 1 mL of purified AuNPs was sonicated with 60 µg NK-92 membrane for 10 minutes at 50% power. The result NK-AuNPs was centrifuge at 5000 rpm for 5 minutes to remove uncoated membrane. FIG. 20B shows TEM images of the NK-AuNPs.

Figure 21:
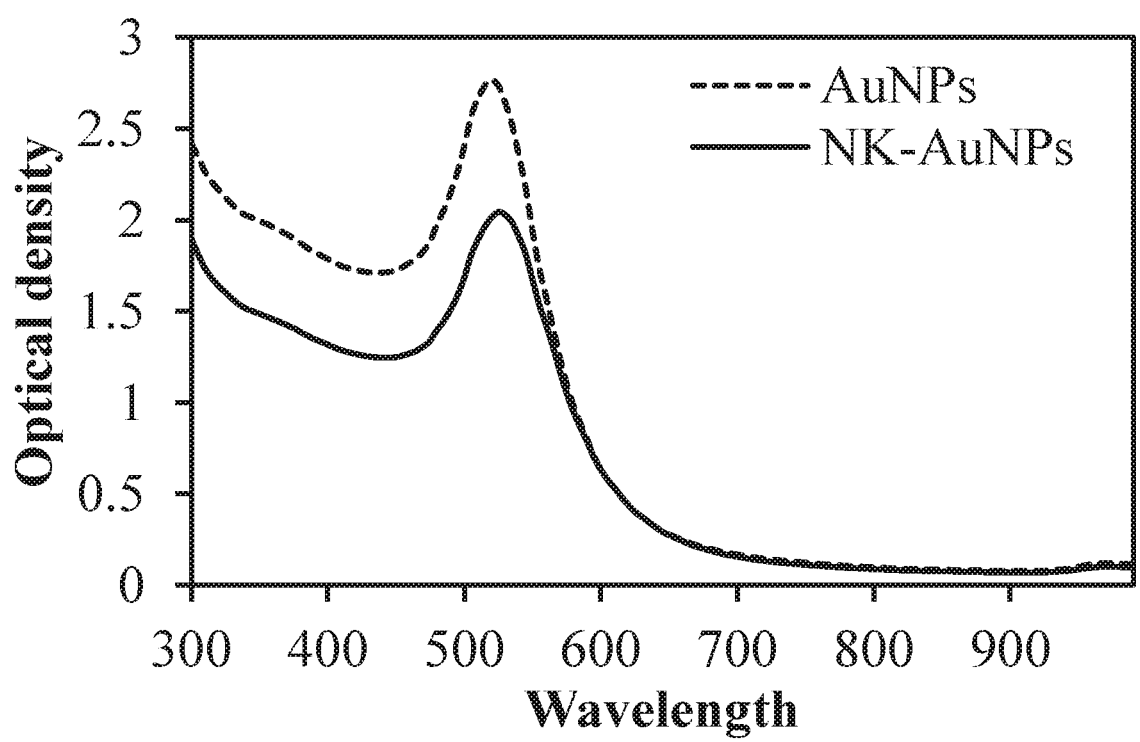
FIG. 21. Spectrophotometric characterization of AuNPs before and after NKM coating showing surface plasmon resonance (SPR) band at 525 nm. Stable SPR band at 525 nm further suggest stabile and intact size properties after coating.
Figure 22:
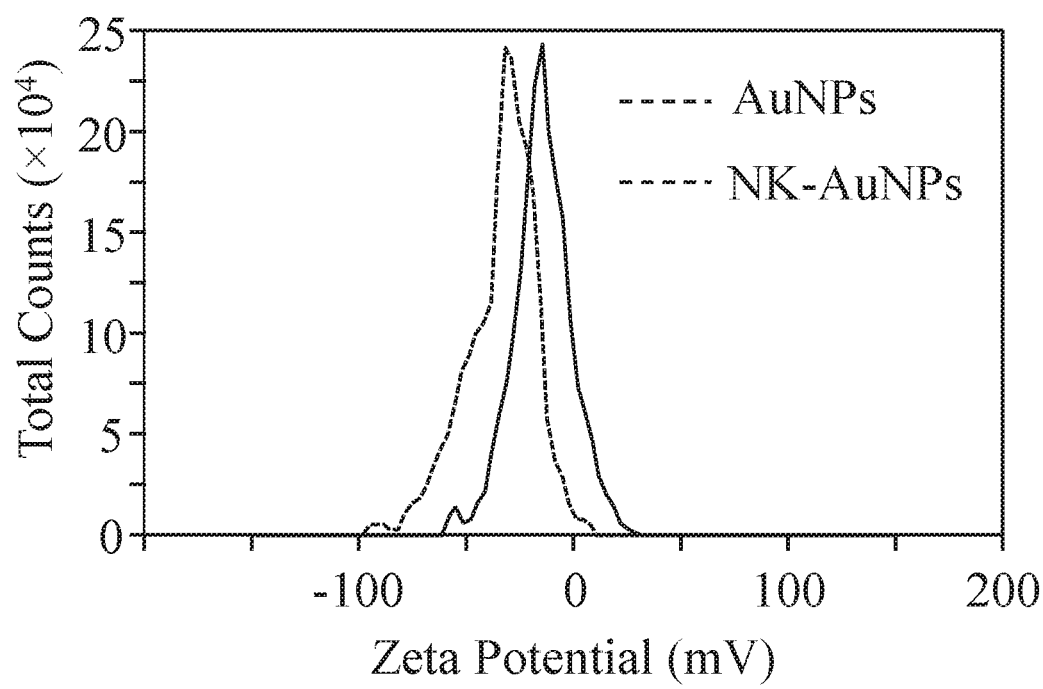
FIG. 22. Zeta potential measurement. Citrate stabilized AuNPs are negatively charged (−40 mV) where are NKM coated NPs are −18 mV. This change is surface charge reveled the formation of NKM coating over AuNPs, which is similar to that of cell surface.
Figure 23:
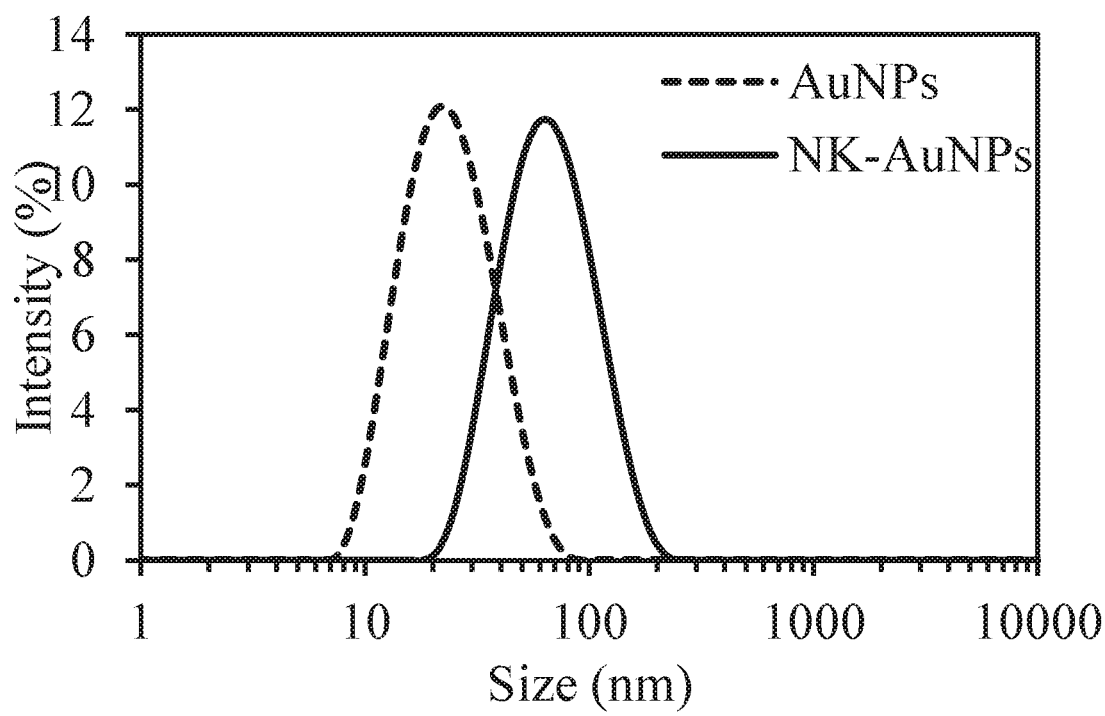
FIG. 23. Hydrodynamic size of AuNPs before and after coating with NKM determined by dynamic light scattering. After coating hydrodynamic size increased from 30 nm to 70 nm, which is due to hydration layer and larger cellular protein molecules on the surface.
Figure 24A:
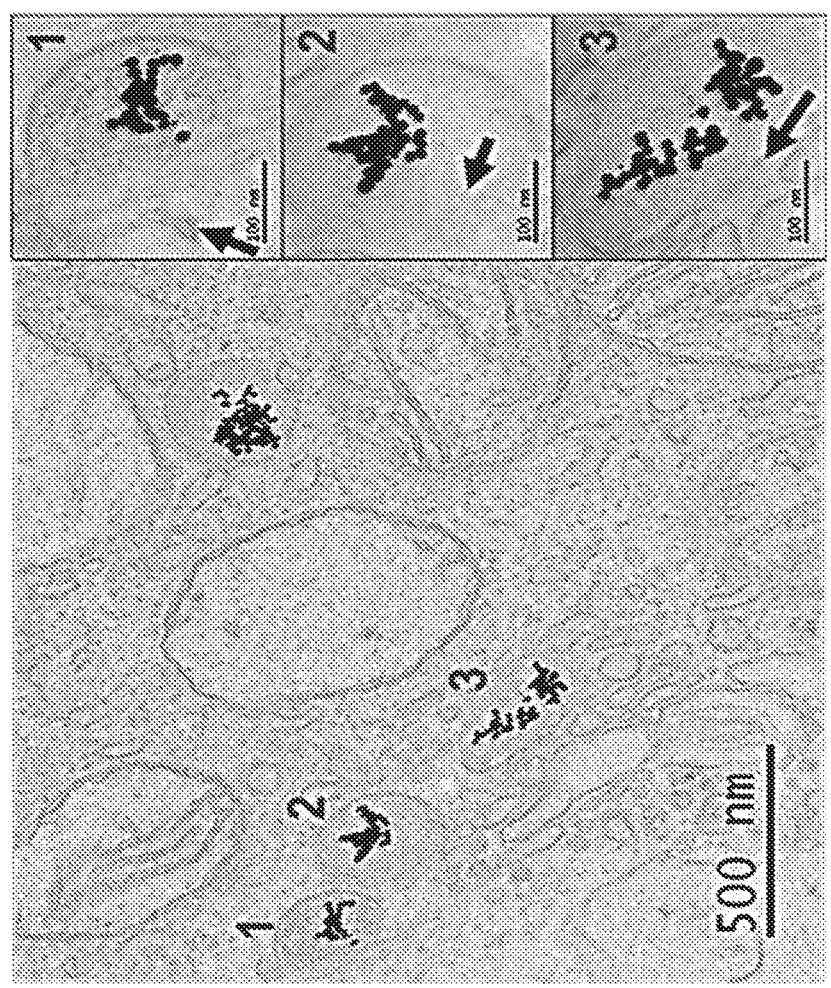
FIG. 24A. NKM coated AuNPs internalization in MCF-7 cells. Black arrow in inset 1, 2, and 3 (in red) shows endosomal membrane rupture.
Figure 24A:
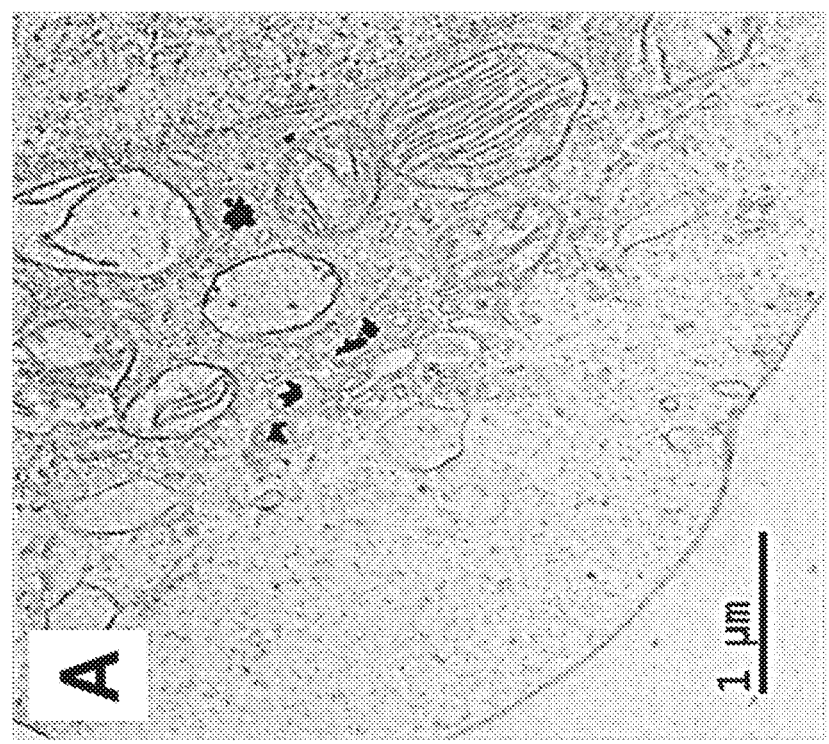
Figure 24B:
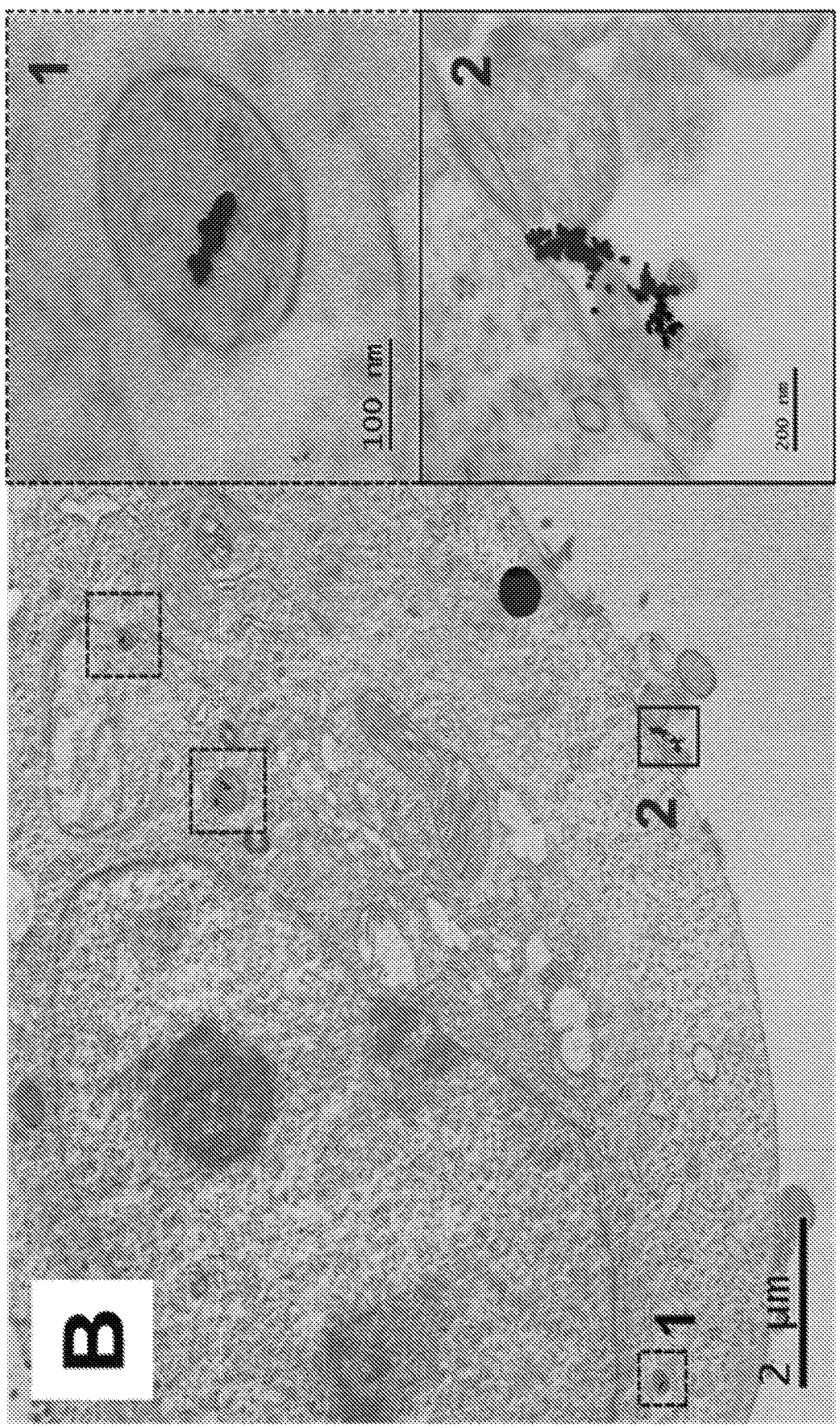
FIG. 24B. Citrated stabilized AuNPs internalization. Inset 1 and 2 (in black) shows intact endosomal membrane and NP cell membrane interaction, respectively.

Characterization: The NK-AuNPs was subjected to dynamic light scattering, zeta potential, stability, and TEM studies to understand the physiochemical properties. FIG. 21 shows a graph of the spectrophotometric characterization of the metal nanoparticles before and after NKM coating. FIG. 22 shows a graph of the zeta potential measurement of the coated and uncoated metal nanoparticles. FIG. 23 shows a graph comparing the dynamic light scattering analysis of coated and uncoated metal nanoparticles. FIGS. 24A and 24B shows the TEM analysis of the NK-AuNPs.

Cellular interaction: The interaction between uncoated and NK-coated AuNPs with breast cancer cell (MCF-7) was investigated using TEM. In brief, cells were seeded in a T75 and maintained under cell culture condition. When cells reach to 80% confluence, AuNPs or NK-AuNP were added into cell media to get final concentration of 30 µg/mL. After 24 h of incubation, cells were washed 3 times with PBS, trypsinized, and fixed in Trump fixative reagent.

The invention claimed is:

1. A synthetic nanocarrier construct comprising a lipid-based bilayer membrane infused with one or more cell membrane proteins isolated from an NK-92 cell.

2. The nanocarrier construct of claim 1, wherein said cell membrane proteins isolated from an NK-92 cell are surface protein receptors.

3. The nanocarrier construct of claim 2, wherein said surface protein receptors are CD56, NKG2-D, NKp30, NKp44, CD16, or a combination thereof.

4. The nanocarrier construct of claim 1, said lipid-based bilayer membrane comprising a mixture of lipids and NK-92 cell membrane phospholipids.

5. The nanocarrier construct of claim 4, wherein said lipids are selected from the group consisting of phosphoethanolamines, phosphatidylcholines, phosphoglycerols, phosphatidic acids, Sphingolipids, Sphingomyelin, and combinations thereof.

6. The nanocarrier construct of claim 4, wherein said membrane comprises at least two different types of lipids.

7. The nanocarrier construct of claim 4, further comprising cholesterol and/or oleic acid.

8. The nanocarrier construct of claim 1, wherein said cell membrane proteins isolated from an NK-92 cell are located at the exterior surface of the lipid bilayer, in the core of the lipid bilayer, and/or at the interior surface the lipid bilayer.

9. The nanocarrier construct of claim 1, wherein said membrane encapsulates a liquid-receiving interior space.

10. The nanocarrier construct of claim 9, further comprising one or more active agents dispersed in said liquid-receiving interior space.

11. The nanocarrier construct of claim 1, wherein said membrane coats at least a portion of a solid core.

12. The nanocarrier construct of claim 11, wherein said solid core is a polymeric or metal nanoparticle.

13. The nanocarrier construct of claim 1, said membrane having an exterior surface comprising one or more imaging agents or detectable moieties.

14. The nanocarrier construct of claim 12, wherein said membrane comprises an active agent incorporated therein.

15. A method of targeted delivery of an active and/or diagnostic and/or imaging agent to a specific cell type or a region of a patient, said method comprising administering a plurality of nanocarrier constructs of claim 1 to said patient.

16. The method of claim 15, wherein said nanocarrier constructs accumulate in and near an area of infection, inflammation, and/or cancerous tissue in said patient.

17. The method of claim 15, wherein said nanocarrier constructs fuse with said specific cell type to yield a fused cell and release an active agent directly into the fused cell.

18. The method of claim 15, wherein said patient has is or suspected of having cancerous or precancerous tissue or cancer cells, wherein said nanocarrier constructs accumulate in said cancerous or precancerous tissue or cancer cells.

19. A diagnostic and/or therapeutic composition comprising a plurality of nanocarrier constructs according to claim 1, optionally dispersed in a pharmaceutically-acceptable carrier or excipient.

20. An MRI imaging method for detecting cancerous or precancerous tissue or cancer cells in a mammal comprising:
(a) administering to the mammal a plurality of nanocarrier constructs according to claim 1, said nanocarrier construct comprising at least one imaging contrast agent, wherein said nanocarrier constructs accumulate in cancerous or precancerous tissue or cancer cells in said mammal;
(b) locating said nanocarrier constructs in a region of interest in the mammal suspected of having said cancerous or precancerous tissue or cancer cells;
(c) transmitting radio frequency pulses to said region of interest; and
(d) acquiring MR image data of the region of interest, said MR image data comprising $T_1$ data.

* * * * *